(12) United States Patent
Sherwood, Jr.

(10) Patent No.: US 12,223,362 B2
(45) Date of Patent: Feb. 11, 2025

(54) MACHINE-LEARNING-BASED LOAD BALANCING FOR CLOUD-BASED DISASTER RECOVERY APPARATUSES, PROCESSES AND SYSTEMS

(71) Applicant: Datto, Inc., Norwalk, CT (US)

(72) Inventor: William J. Sherwood, Jr., Rochester, NY (US)

(73) Assignee: DATTO, INC., Norwalk, CT (US)

( * ) Notice: Subject to any disclaimer, the term of this patent is extended or adjusted under 35 U.S.C. 154(b) by 437 days.

(21) Appl. No.: 17/399,008

(22) Filed: Aug. 10, 2021

(65) Prior Publication Data
US 2023/0069593 A1    Mar. 2, 2023

(51) Int. Cl.
G06F 9/46    (2006.01)
G06F 9/50    (2006.01)
G06N 20/00   (2019.01)

(52) U.S. Cl.
CPC ............ *G06F 9/505* (2013.01); *G06F 9/5016* (2013.01); *G06F 9/5077* (2013.01); *G06N 20/00* (2019.01)

(58) Field of Classification Search
CPC ....... G06F 9/505; G06F 9/5016; G06F 9/5077
See application file for complete search history.

(56) References Cited

U.S. PATENT DOCUMENTS

| | | |
|---|---|---|
| 2014/0082614 A1 | 3/2014 | Klein et al. |
| 2016/0323161 A1 | 11/2016 | Cuervo et al. |
| 2018/0219899 A1* | 8/2018 | Joy ..................... G06F 11/3433 |
| 2021/0294667 A1* | 9/2021 | Chaganti ............... G06F 9/5083 |

OTHER PUBLICATIONS

Lilhore et al., An Efficient Load Balancing Method by Using Machine Learning-Based MV Distribution and Dynamic Resource Mapping, 2020, Journal of Computational and Theoretical Nanoscience, vol. 17, No. 6, pp. 2545-2551. (Year: 2020).*
Shahid et al., A Comprehensive Study of Load Balancing Approaches in the Cloud Computing Environment and Novel Fault Tolerance Approach, Digital Object Identifier 10.1109/ACCESS.2020.3009184, Jul. 27, 2020, pp. 130500-130526. (Year: 2020).*
International Search Report and Written Opinion mailed Nov. 11, 2022 in PCT Application No. PCT/US2022/074779.

* cited by examiner

*Primary Examiner* — Diem K Cao
(74) *Attorney, Agent, or Firm* — MASCHOFF BRENNAN

(57) ABSTRACT

The Machine-Learning-Based Load Balancing for Cloud-Based Disaster Recovery Apparatuses, Processes and Systems ("MLLB") transforms workload agent installation request, AWCD training request, NWCD training request, asset workload classification request, node workload classification request, asset virtualization request inputs via MLLB components into workload agent installation response, AWCD training response, NWCD training response, asset workload classification response, node workload classification response, asset virtualization response outputs. An asset virtualization request datastructure is obtained. A set of asset workload classification labels for the asset determined using an asset workload classification datastructure is retrieved. A set of node workload classification labels for each node in a set of available compute nodes determined using a node workload classification datastructure is retrieved. A set of compatible candidate compute nodes is determined using a set of capacity threshold rules. A virtual machine corresponding to the asset is instantiated on a selected candidate compute node.

18 Claims, 33 Drawing Sheets

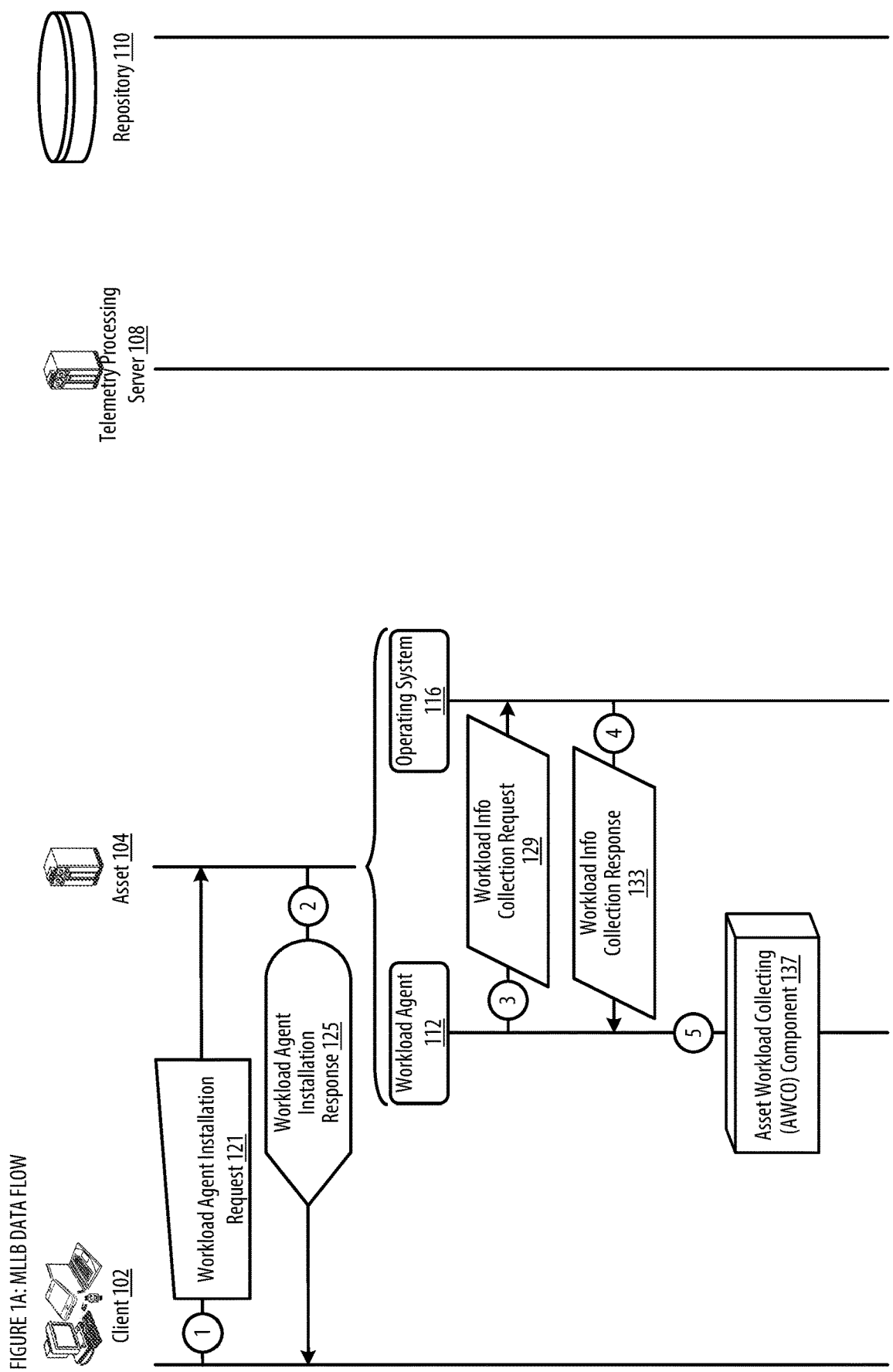

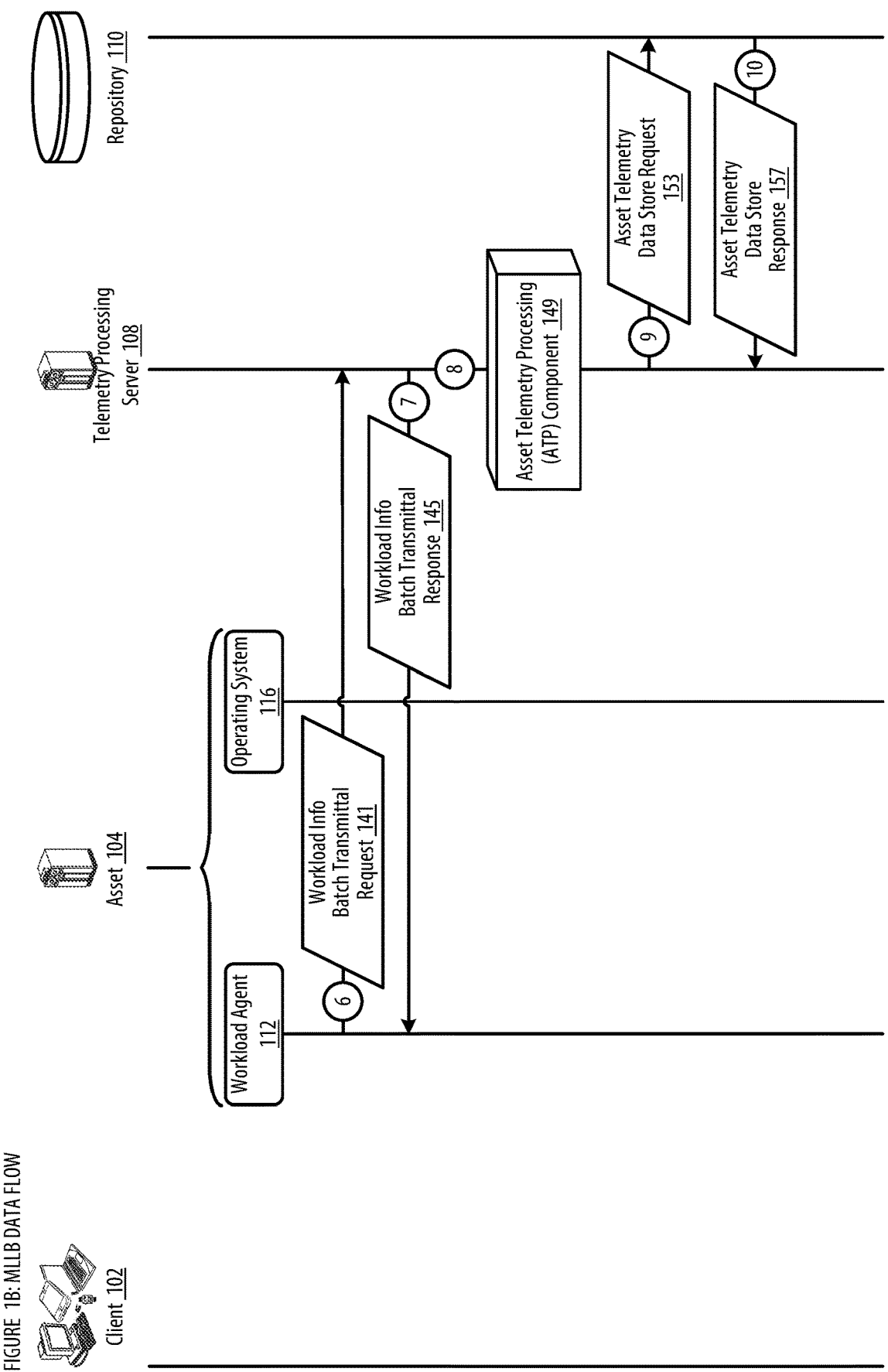

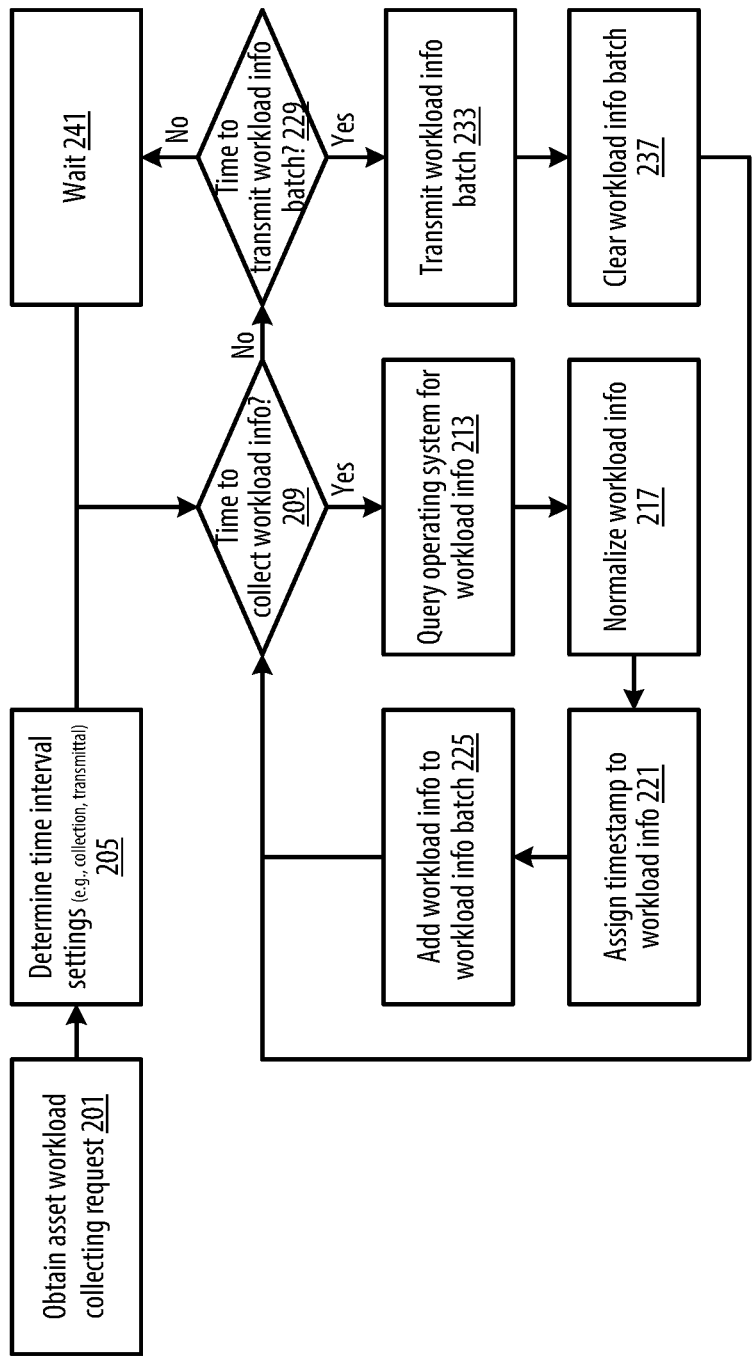
FIGURE 2: MLLB AWCO COMPONENT

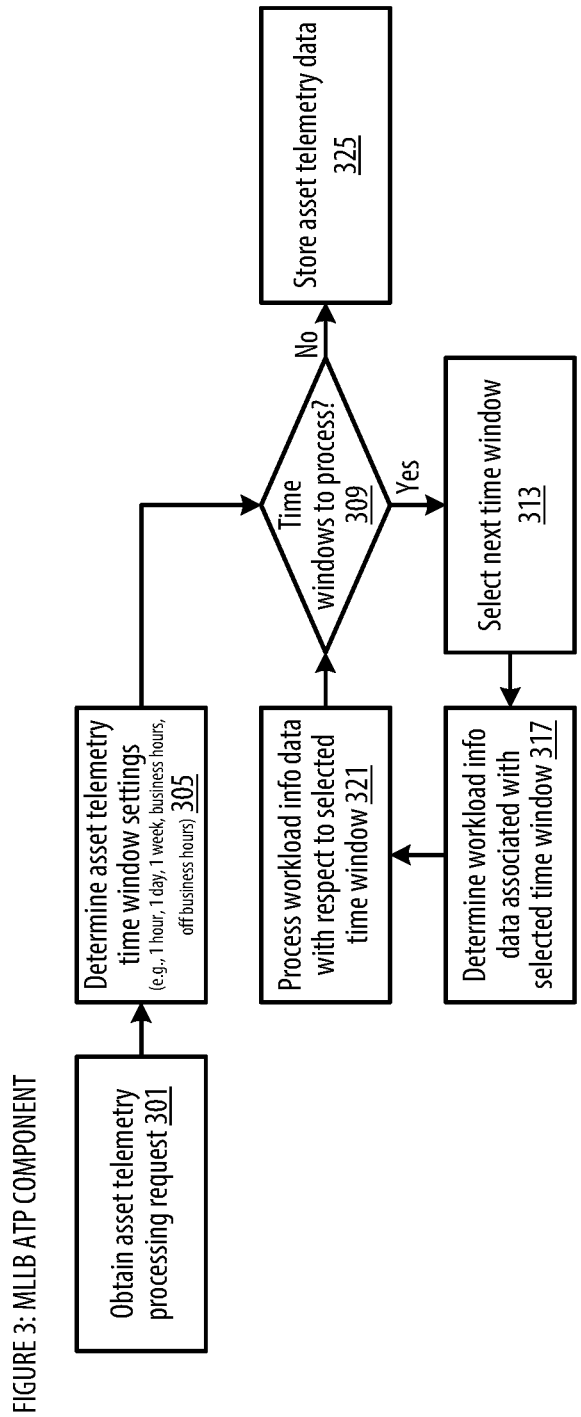

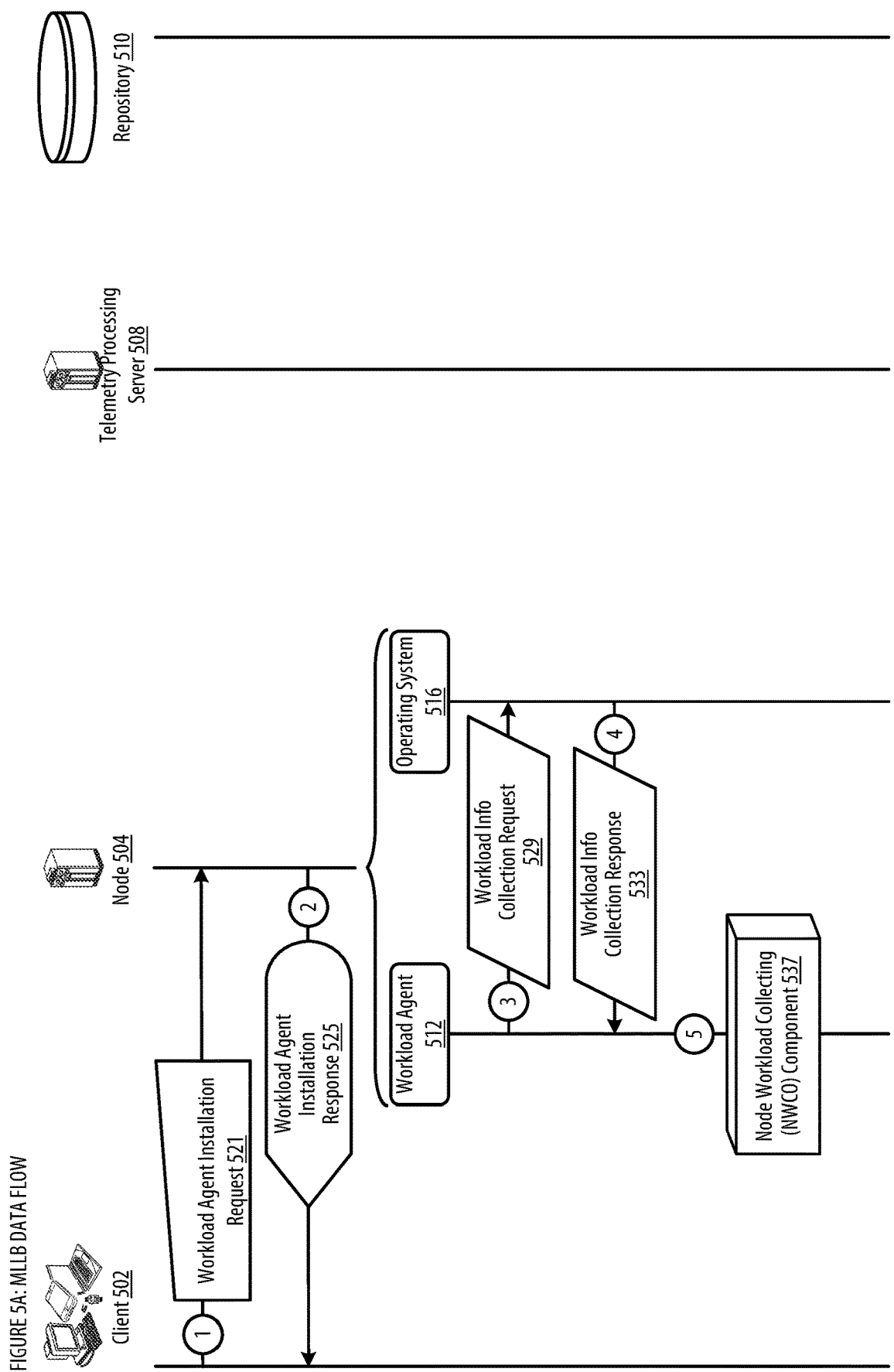

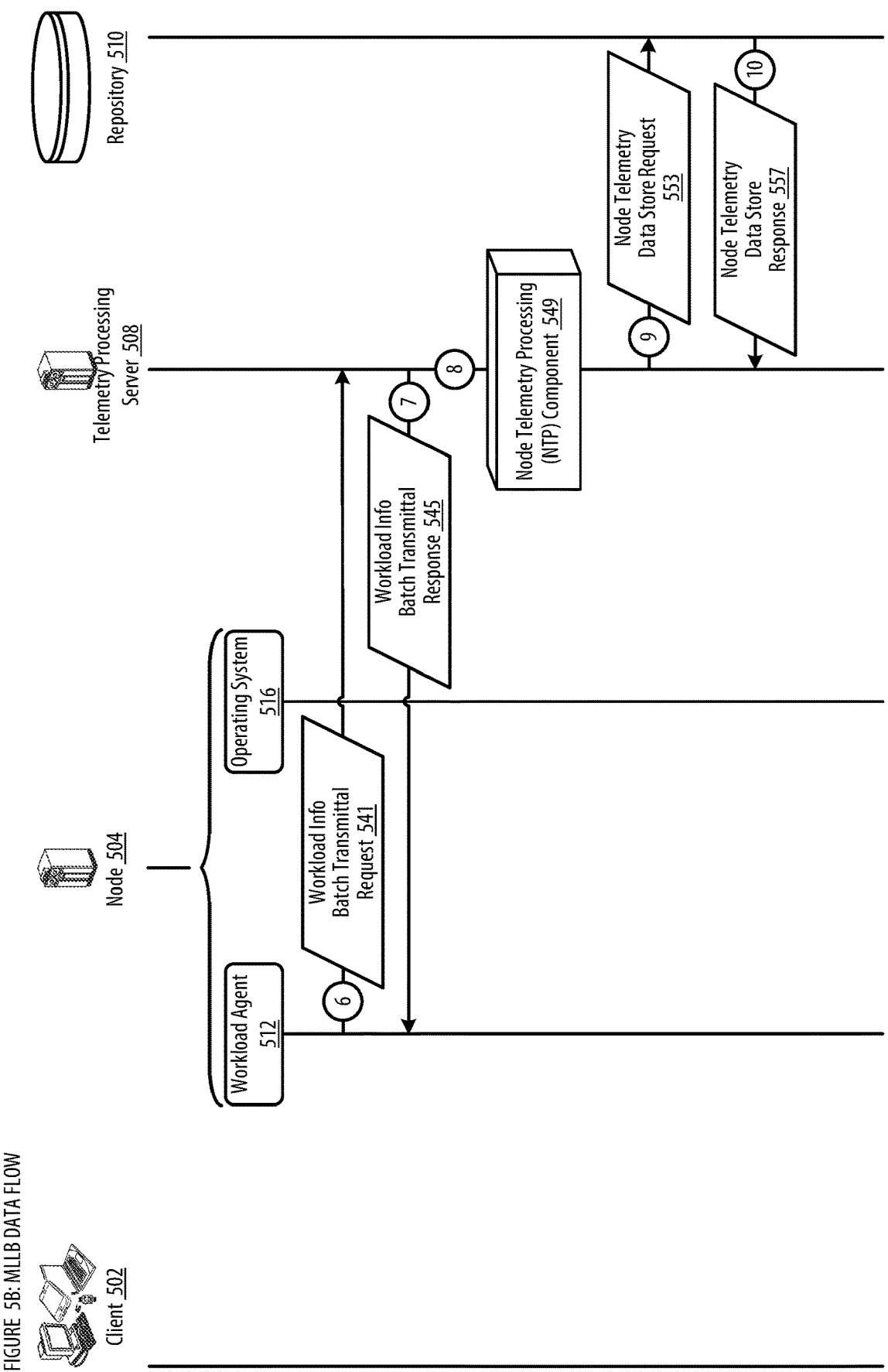
FIGURE 5B: MLLB DATA FLOW

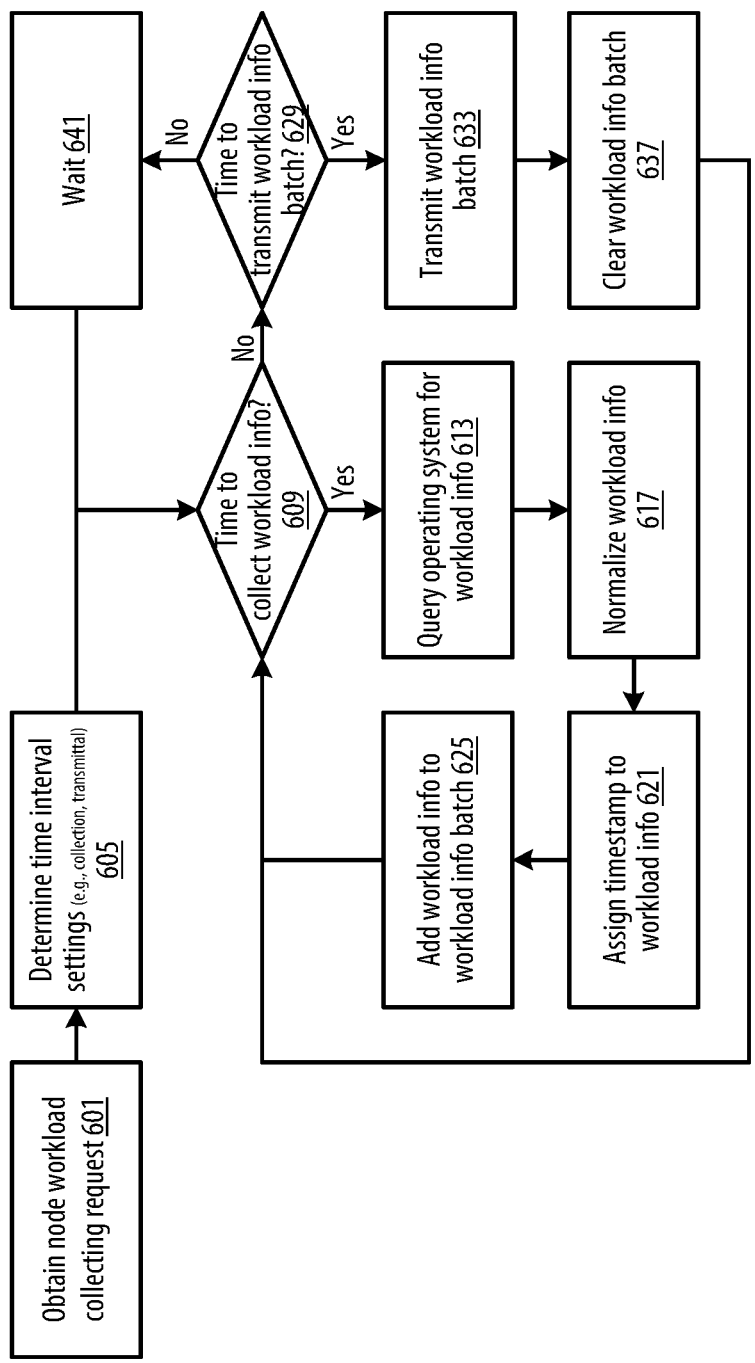
FIGURE 6: MLLB NWCO COMPONENT

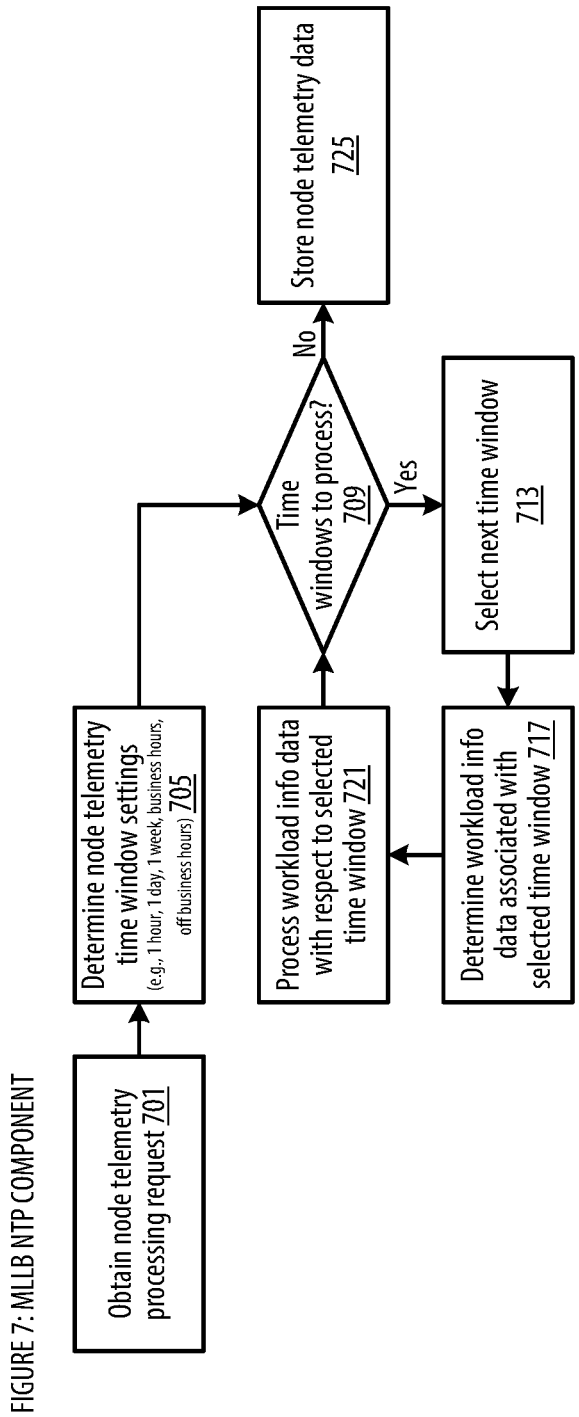

FIGURE 9: MLLB DATA FLOW
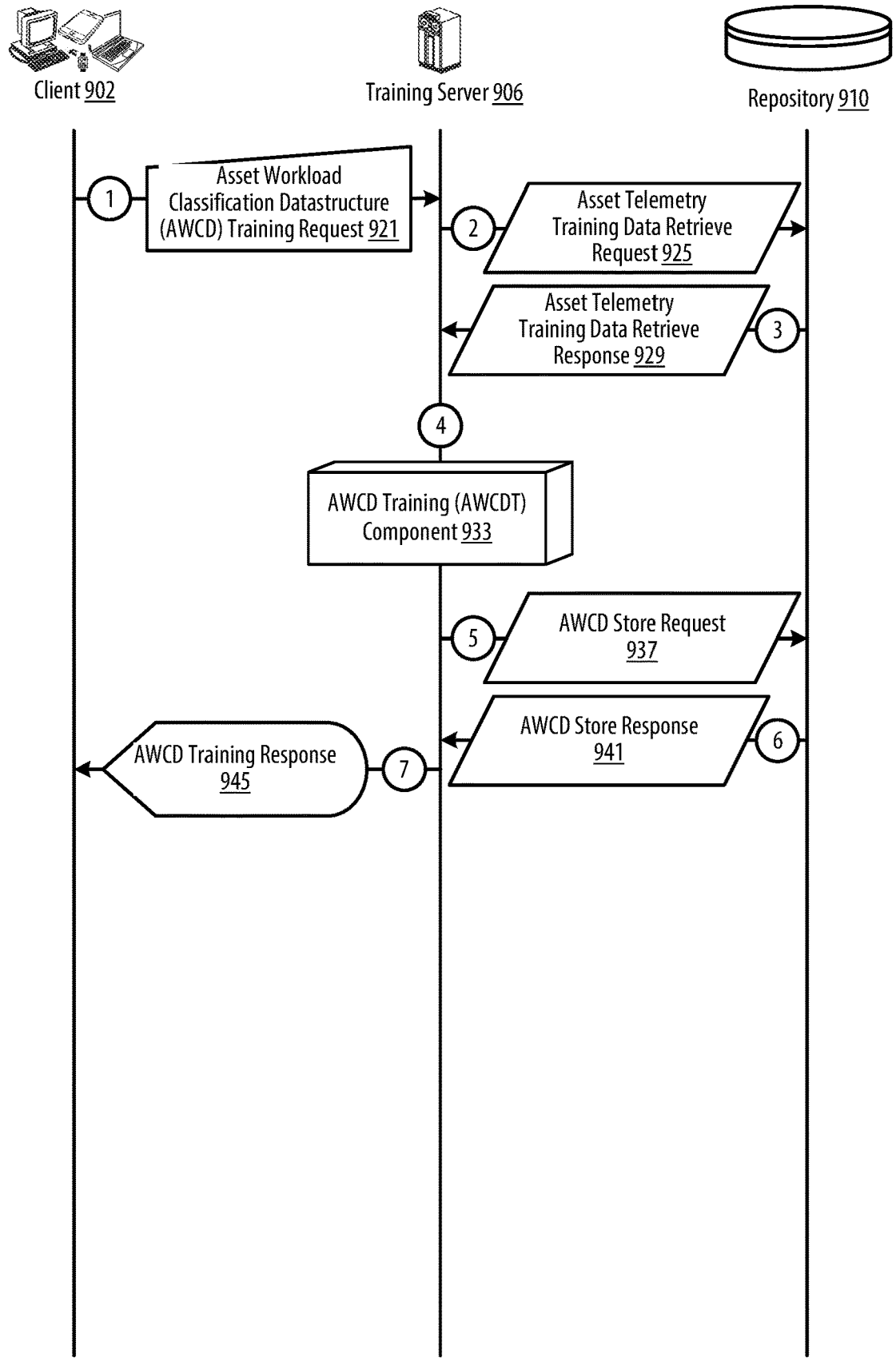

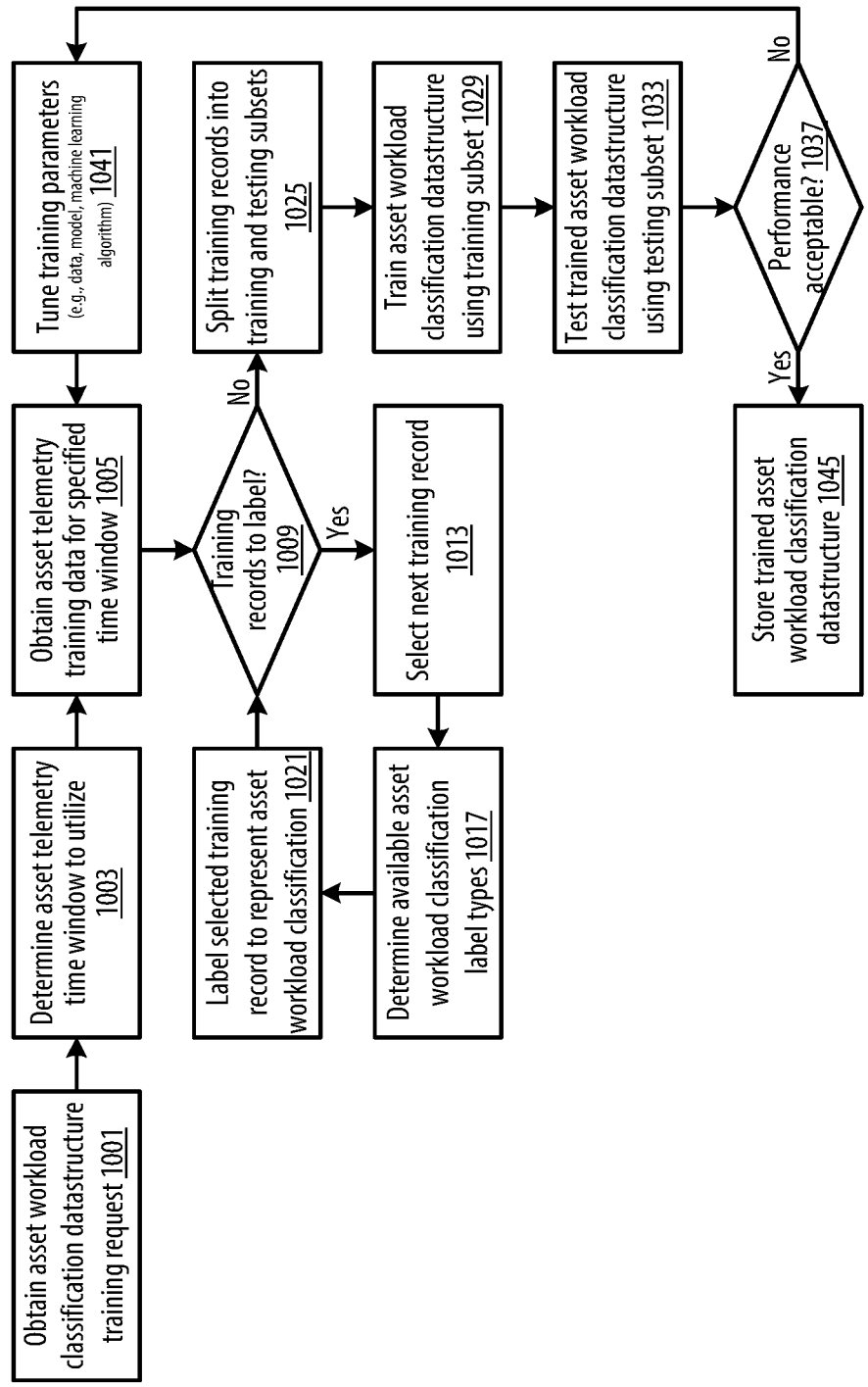
FIGURE 10: MLLB AWCDT COMPONENT

FIGURE 12: MLLB DATA FLOW
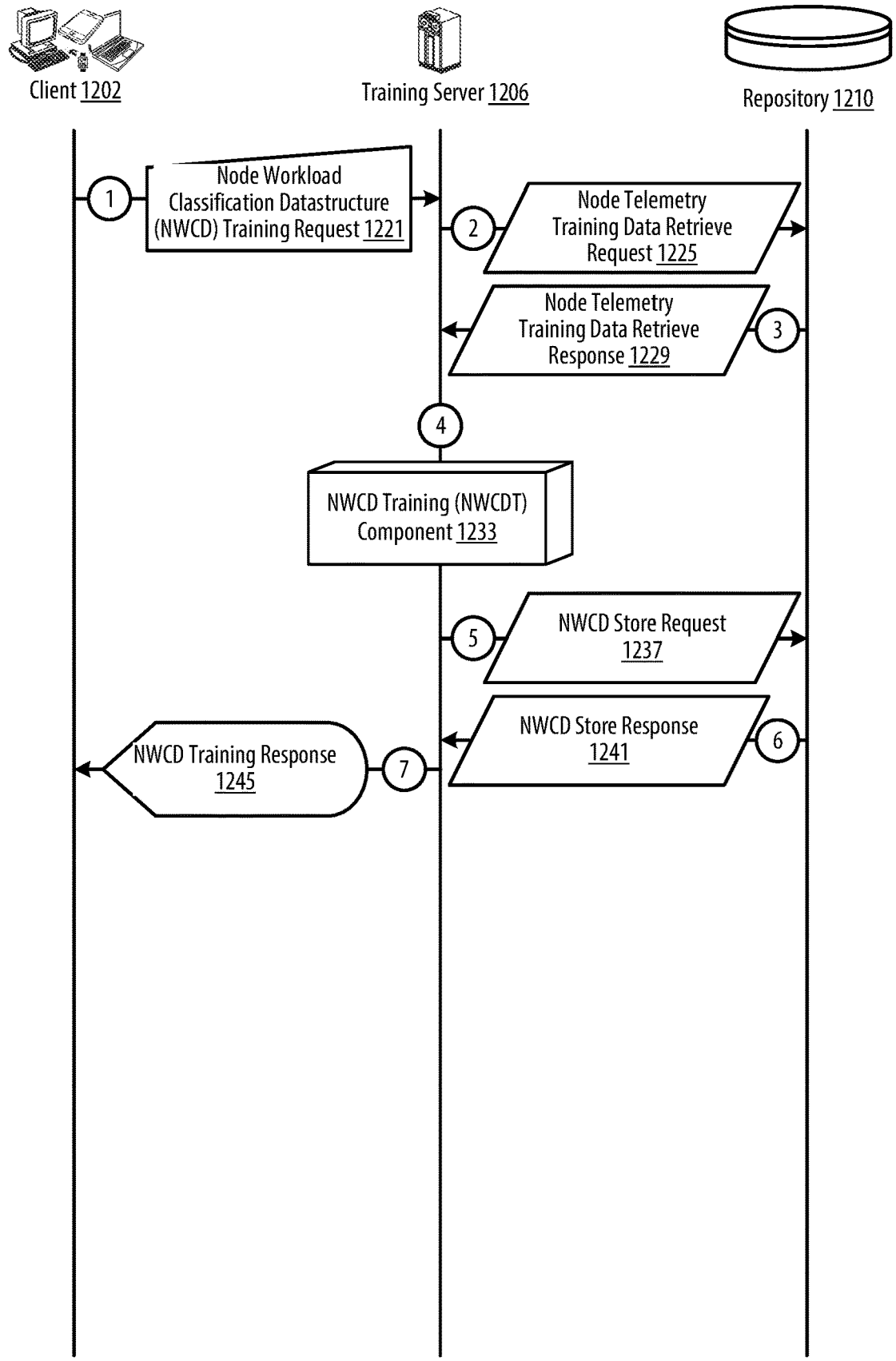

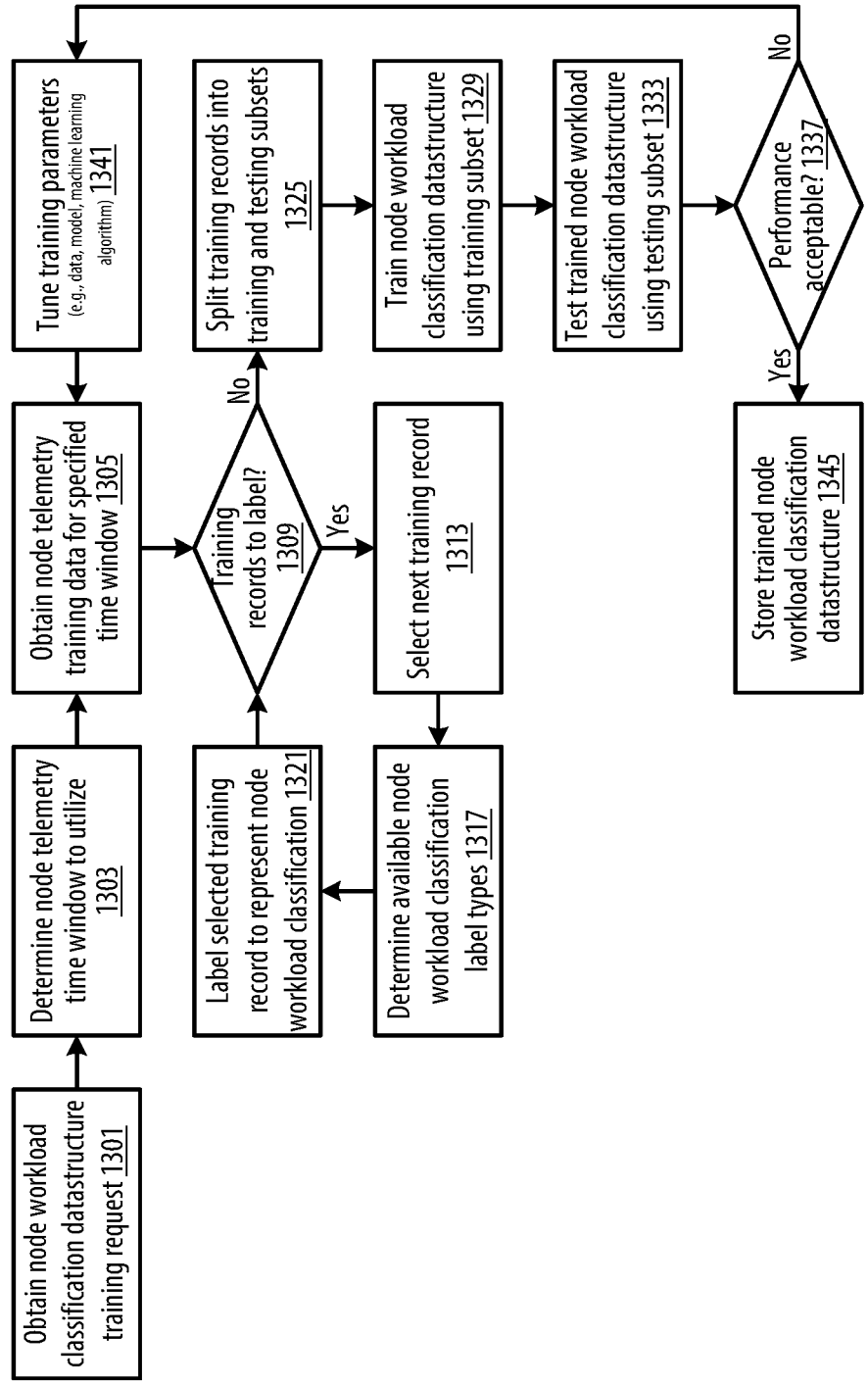
FIGURE 13: MLLB NWCDT COMPONENT

FIGURE 15: MLLB DATA FLOW
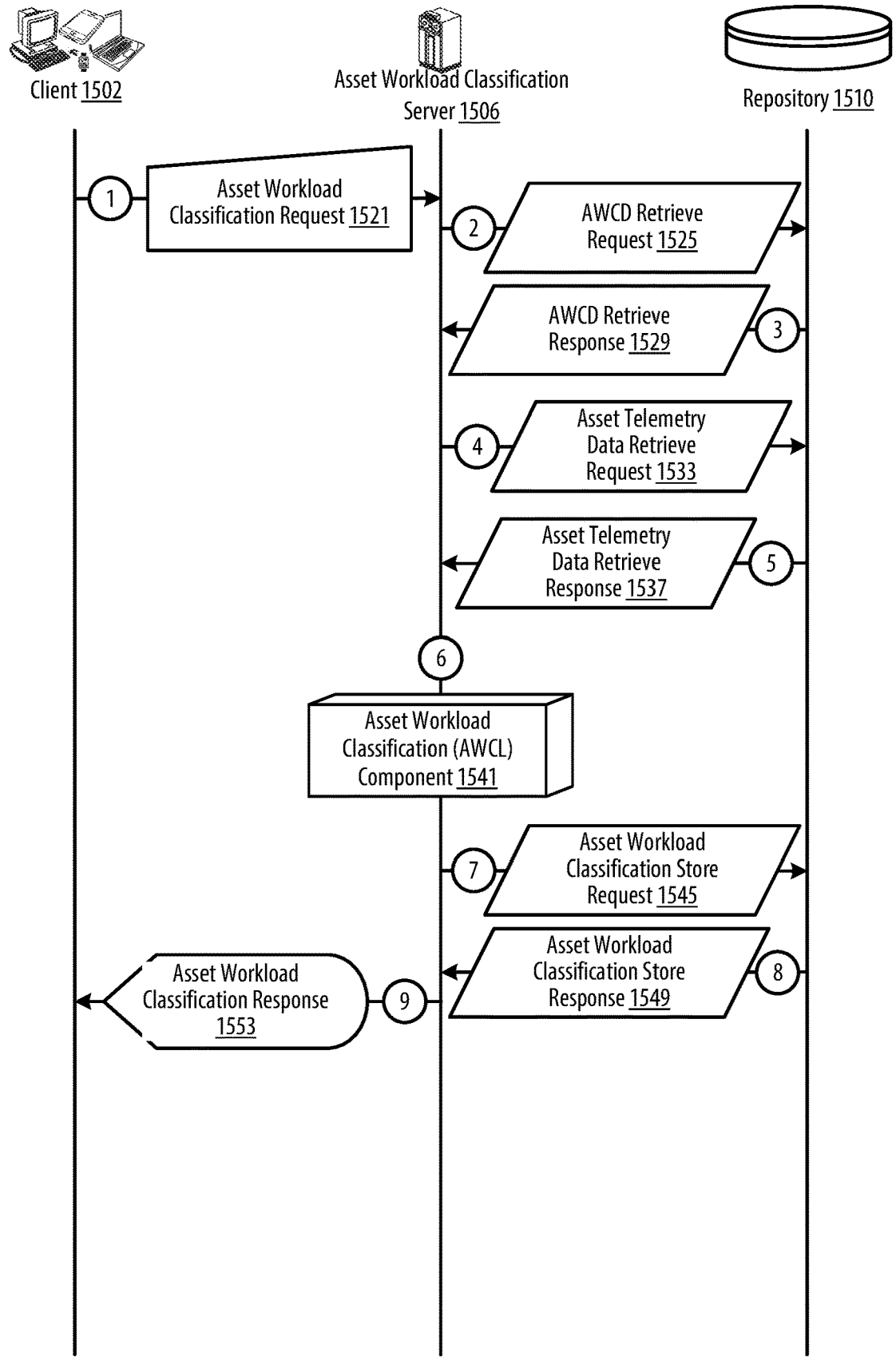

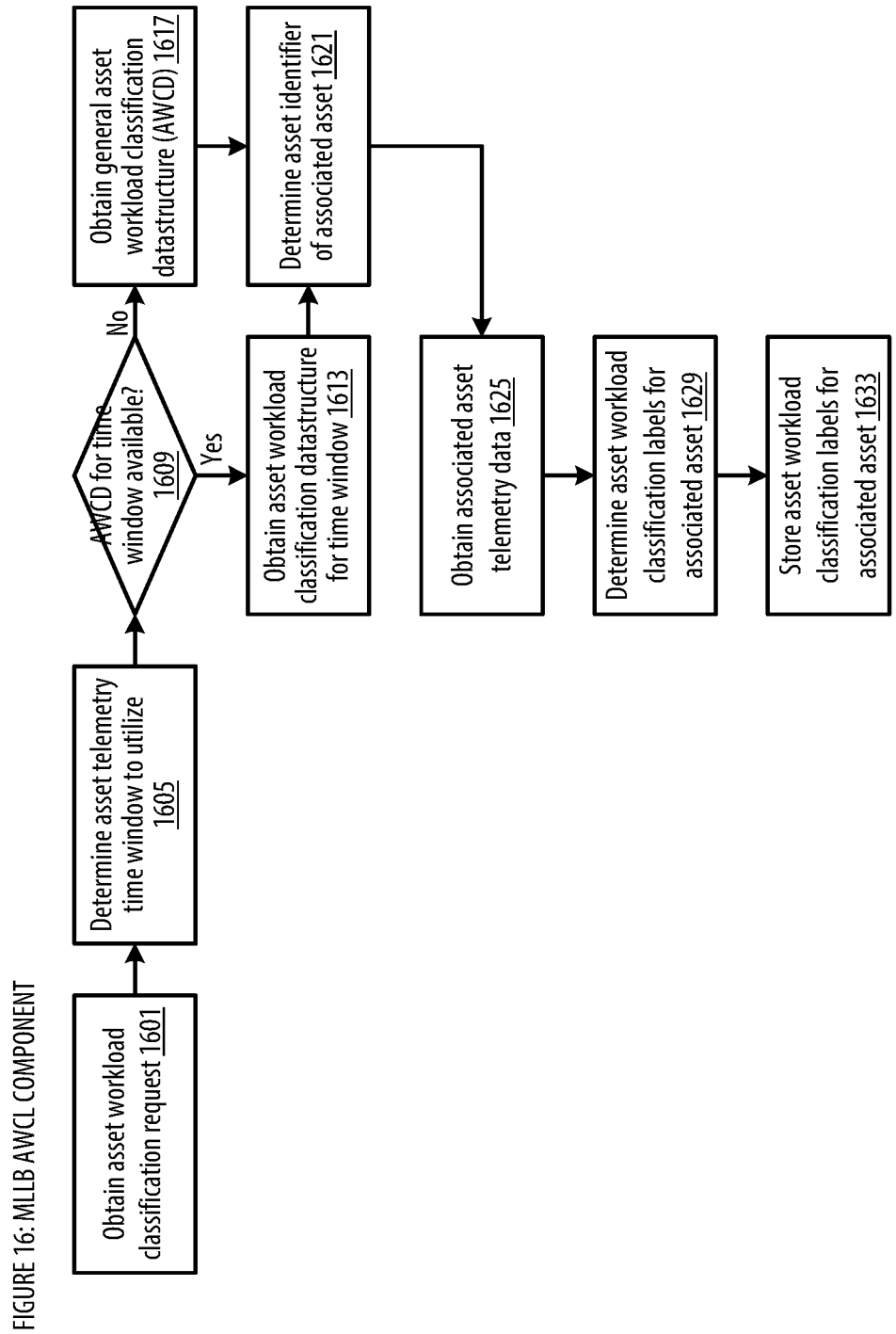

FIGURE 18: MLLB DATA FLOW

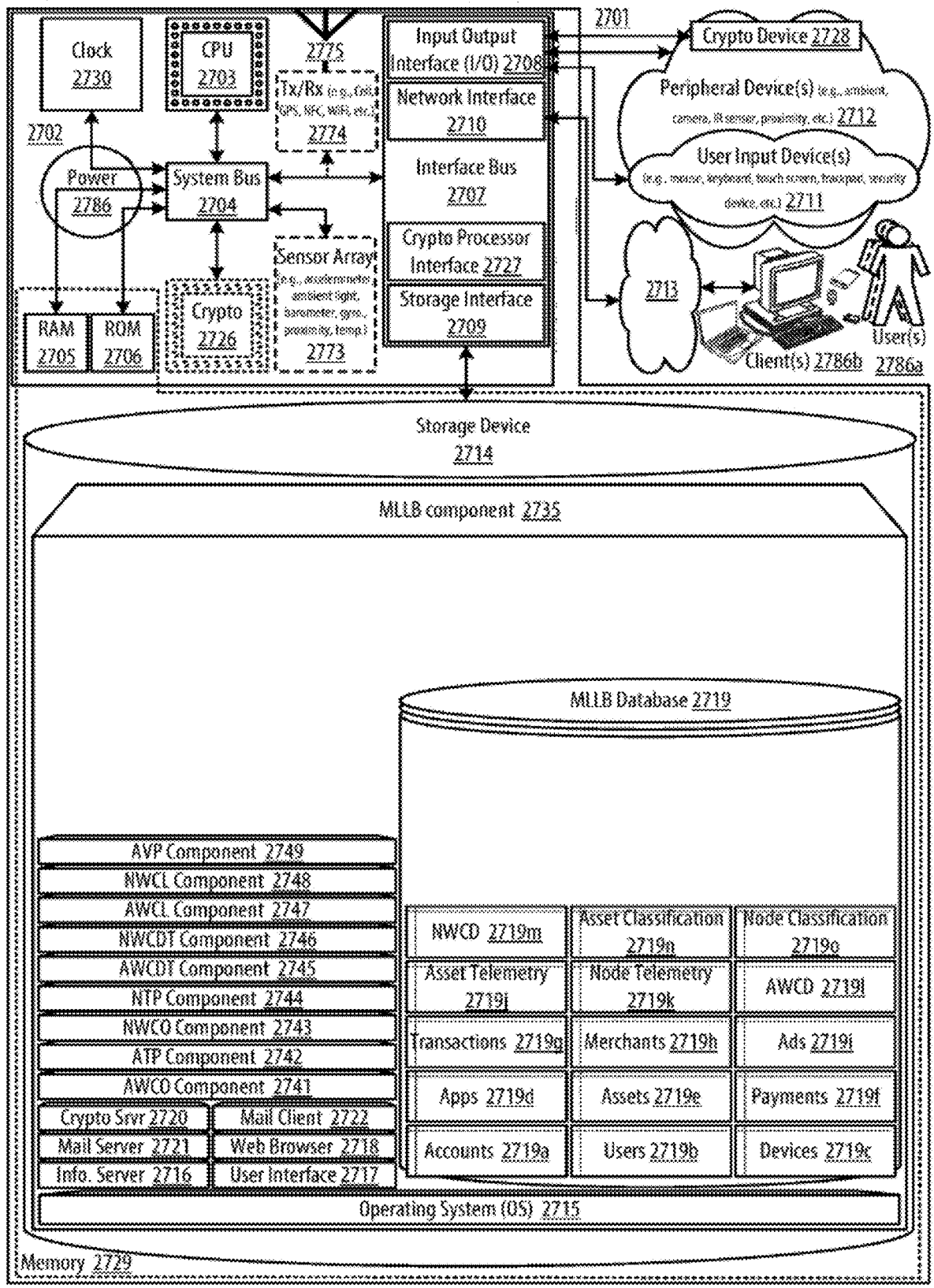

MACHINE-LEARNING-BASED LOAD BALANCING FOR CLOUD-BASED DISASTER RECOVERY APPARATUSES, PROCESSES AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address machine learning and backup systems, and more particularly, include Machine-Learning-Based Load Balancing for Cloud-Based Disaster Recovery Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Machine-Learning-Based Load Balancing for Cloud-Based Disaster Recovery Apparatuses, Processes and Systems (hereinafter "MLLB") disclosure, include:

FIGS. 1A-B show a datagraph illustrating data flow(s) for the MLLB;

FIG. 2 shows a logic flow illustrating embodiments of an asset workload collecting (AWCO) component for the MLLB;

FIG. 3 shows a logic flow illustrating embodiments of an asset telemetry processing (ATP) component for the MLLB;

FIGS. 5A-B show a datagraph illustrating data flow(s) for the MLLB;

FIG. 6 shows a logic flow illustrating embodiments of a node workload collecting (NWCO) component for the MLLB;

FIG. 7 shows a logic flow illustrating embodiments of a node telemetry processing (NTP) component for the MLLB;

FIG. 9 shows a datagraph illustrating data flow(s) for the MLLB;

FIG. 10 shows a logic flow illustrating embodiments of an asset workload classification datastructure training (AWCDT) component for the MLLB;

FIG. 12 shows a datagraph illustrating data flow(s) for the MLLB;

FIG. 13 shows a logic flow illustrating embodiments of a node workload classification datastructure training (NWCDT) component for the MLLB;

FIG. 15 shows a datagraph illustrating data flow(s) for the MLLB;

FIG. 16 shows a logic flow illustrating embodiments of an asset workload classification (AWCL) component for the MLLB;

FIG. 27 shows a block diagram illustrating embodiments of a MLLB controller.

Figure 4A:
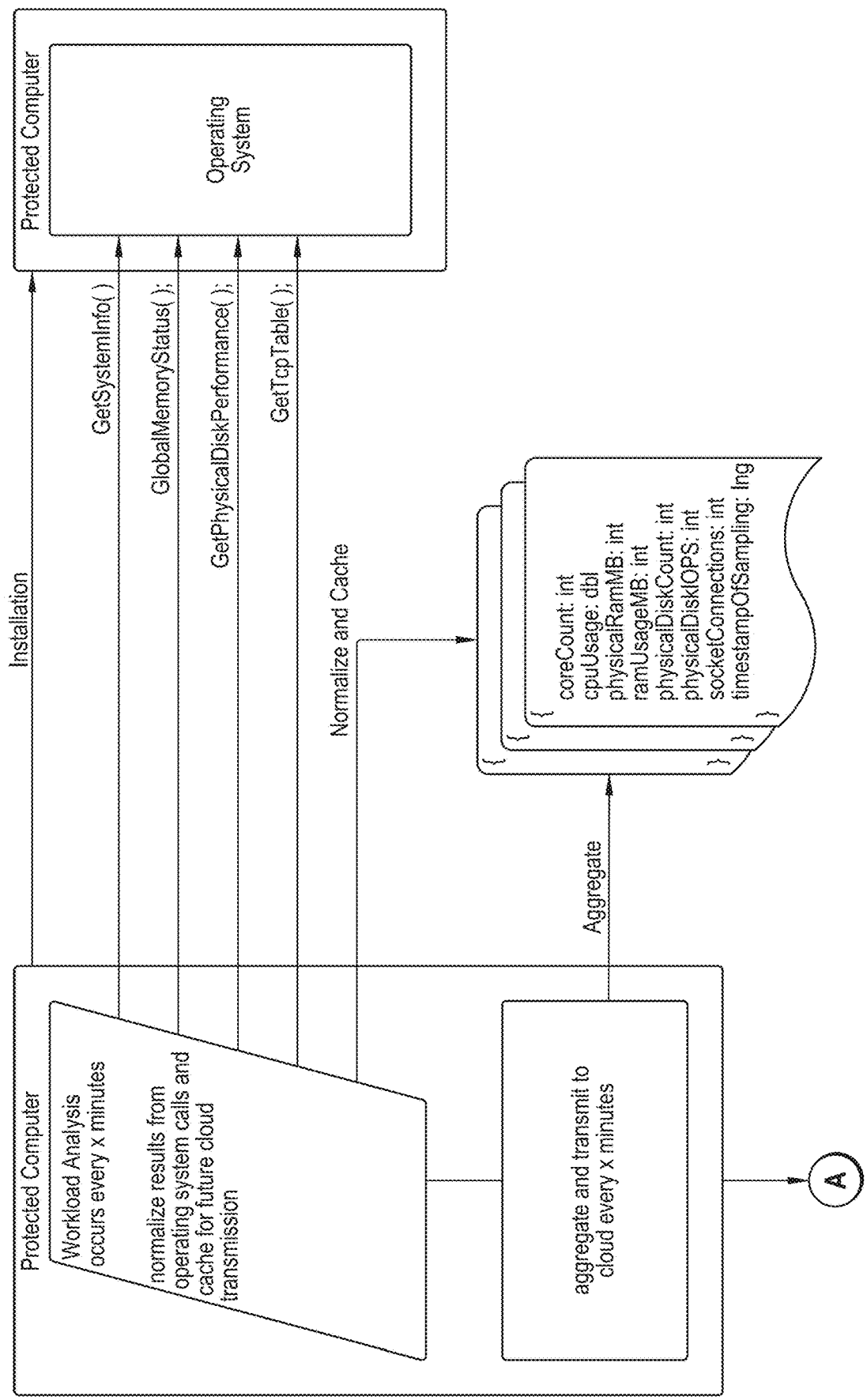
FIGS. 4A-4B show implementation case(s) for the MLLB.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Machine-Learning-Based Load Balancing for Cloud-Based Disaster Recovery Apparatuses, Processes and Systems (hereinafter "MLLB") transforms workload agent installation request, AWCD training request, NWCD training request, asset workload classification request, node workload classification request, asset virtualization request inputs, via MLLB components (e.g., AWCO, ATP, NWCO, NTP, AWCDT, NWCDT, AWCL, NWCL, AVP, etc. components), into workload agent installation response, AWCD training response, NWCD training response, asset workload classification response, node workload classification response, asset virtualization response outputs. The MLLB components, in various embodiments, implement advantageous features as set forth below.

INTRODUCTION

The MLLB provides unconventional features (e.g., using machine learning (ML) assigned workload labels of assets and/or compute nodes to load balance virtualization workloads across nodes during cloud-based disaster recovery) that were never before available in machine learning and backup systems.

Large disaster recovery (DR) scenarios are composed of multiple virtual machines (VMs) being spun up to provide business continuity for a partner's assets (e.g., an asset may be a desktop, a workstation, a laptop, a mobile device, a server, and/or the like that is protected by backup software). One strategy is to launch VMs on any compute node available, which can result in heavy CPU/RAM/IO/Network/etc. workloads being launched on the same compute node. This results in a compounded "noisy-neighbor" syndrome and performance degradation that affects hosted VMs as well as the host itself. Another approach is to label each asset that can be virtualized with the class of service that it represents (e.g., AD, RDBMS, WebServer, etc.), however, such an approach may not really represent the true workload of an asset (e.g., the asset may have multiple services that are running (e.g., Web Server, Database), but they have little to no usage). Additionally, there may be other custom services that can't be classified easily with regard to the class of service (e.g., custom data crunching routines).

In one embodiment, the MLLB may learn the workload (e.g., the amount of disk, RAM, CPU, energy, network, etc. utilization of an asset for a point in time or time range) footprint of each protected asset via sampling the CPU/RAM/IO/Network/etc. usage by a backup agent during normal runtime operations. This sampled data may be transmitted to the cloud (e.g., in an asynchronous manner), accumulated, and run through a supervised classification model to provide a normalized workload label for that asset.

In one embodiment, the MLLB may learn the workload footprint of each compute node within a compute cloud (e.g., backup cloud). As with assets, CPU/RAM/IO/Network/etc. may be sampled on a continuous basis. This data may be sent through another supervised classifier for the purpose of multi-labeling the state of a compute node (e.g., HOT-CPU, HOT-DISK, HOT-RAM).

The labels of the asset and/or the compute node may be used to determine if the compute node is an appropriate host for a virtualized instance of the asset. For example, a compute node with a HOT-DISK label would not be appropriate for the virtualization of an asset that has been observed to have high disk IO. Additional dimensions of observability may be leveraged to further balance the load. For example, a compute node that is HOT-DISK only during business hours can accommodate a virtualized asset with high disk IO that was only observed off business hours (e.g., nightly batch).

In addition to using the features provided by the agents to optimally balance load across the compute nodes, these features may be used as a guard against VM over-provisioning (or under-provisioning) for an asset. For example, since the CPU/RAM/IO/Network/etc. requirements of the agent are known, the MLLB can ensure that partners don't configure VMs with more (or less) resources than the VM actually needs.

In one implementation, machine learning may be applied to optimally distribute virtualization workloads across compute nodes in a DR situation as follows:
  Instrumenting backup agents so that they capture CPU/RAM/IO/Network/etc. telemetry data and provide it to the backup cloud
  Instrumenting compute nodes so that they capture CPU/RAM/IO/Network/etc. telemetry data and provide it to the ingestion and classification components
  Capturing raw telemetry data from agents and compute nodes to build a pool of model training data
  Polling a statistically significant sample of the raw data for model training
  Labeling sample training data accordingly for training and model testing purposes
  Creating supervised classification models (e.g., one for the agent telemetry data and one for compute node telemetry data)
  Applying the appropriate ML classification algorithm to the produced models and held back testing data to produce a set of labels chosen by the algorithm
  Judging result accuracy and proceeding, or tuning the data/model/algorithm choice
  Deploying model to production for new telemetry data classification
  Normalizing (or smoothing) telemetry data to eliminate noise and feeding normalized data to classification routine. Using a time window (e.g., data for each hour) could be of benefit to help understand if the workload is business hours or off business hours.
    Repeating the normalization for each new hour until a number of days' worth of captured data is analyzed
    Hour of day→day and day→week rollups may eliminate skew and provide more accurate labeling of the asset
  Labeling the asset with the label provided by the classification routine so it is known at time of virtualization
  At time of virtualization of the asset, scanning compute nodes that can accommodate the identified (labeled) asset
  Avoiding densely packing compute nodes with assets of the same label for optimal performance Accordingly, the MLLB may be used to prevent overload of compute/storage nodes and to provide an optimal performance experience for a DR scenario. Additionally, the MLLB may be used to enforce fair usage policies in a cloud environment.

MLLB

FIGS. 1A-B show a datagraph illustrating data flow(s) for the MLLB. In FIGS. 1A-B, a client 102 (e.g., of a user) may send a workload agent installation request 121 to an asset 104 to facilitate installation of workload info collecting agent on the asset (e.g., as part of backup software installation). For example, the client may be a desktop, a laptop, a tablet, a smartphone, a smartwatch, and/or the like that is executing a client application. For example, the asset may be a desktop, a workstation, a laptop, a mobile device, a server, and/or the like that is protected by backup software. It is to be understood that, in some implementations, the client and the asset may be the same device. In one implementation, the workload agent installation request may include data such as a request identifier, workload collection settings, and/or the like. In one embodiment, the client may provide the following example workload agent installation request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MLLB.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <workload_agent_installation_request>
```

```
    <request_identifier>ID_request_1</request_identifier>
    <workload_collection_settings>
      <collection_time_interval>1 minute</collection_time_interval>
      <requested_workload_info>
        CPU, RAM, IO, Network
      </requested_workload_info>
      <transmittal_time_interval>1 hour</transmittal_time_interval>
    </workload_collection_settings>
  </workload_agent_installation_request>
</auth_request>
```

The asset 104 may send a workload agent installation response 125 to the client 102 to inform the user that the workload info collecting agent was installed successfully. In one implementation, the workload agent installation response may include data such as a response identifier, a status, and/or the like. In one embodiment, the asset may provide the following example workload agent installation response, substantially in the form of a HTTP(S) POST message including XML-formatted data, as provided below:

```
POST /workload_agent_installation_response.php HTTP/1.1
Host: www.server.com
Content-Type: Application/XML
Content-Length: 667
<?XML version = "1.0" encoding = "UTF-8"?>
<workload_agent_installation_response>
  <response_identifier>ID_response_1</response_identifier>
  <status>OK</status>
</workload_agent_installation_response>
```

The workload agent 112 on the asset may send a workload info collection request 129 to the operating system 116 of the asset to collect workload info (e.g., every 1 minute). In one implementation, the workload info collection request may include data such as a request identifier, requested workload info, and/or the like. In one embodiment, the workload agent may provide the following example workload info collection request, substantially in the form of a HTTP(S) POST message including XML-formatted data, as provided below:

```
POST /workload_info_collection_request.php HTTP/1.1
Host: www.server.com
Content-Type: Application/XML
Content-Length: 667
<?XML version = "1.0" encoding = "UTF-8"?>
<workload_info_collection_request>
  <request_identifier>ID_request_2</request_identifier>
  <requested_workload_info>CPU, RAM, IO, Network</requested_workload_info>
</workload_info_collection_request>
```

The operating system 116 may send a workload info collection response 133 to the workload agent 112 with the requested workload info. In one implementation, the workload info collection response may include data such as a response identifier, the requested workload info, and/or the like. In one embodiment, the operating system may provide the following example workload info collection response, substantially in the form of a HTTP(S) POST message including XML-formatted data, as provided below:

```
POST /workload_info_collection_response.php HTTP/1.1
Host: www.server.com
Content-Type: Application/XML
Content-Length: 667
```

```
<?XML version = "1.0" encoding = "UTF-8"?>
<workload_info_collection_response>
  <response_identifier>ID_response_2</response_identifier>
  <workload_info>
    <CPU>30%</CPU>
    <RAM>40%</RAM>
    <IO>300 IOPS</IO>
    <Network>50 Mbps</Network>
  </workload_info>
</workload_info_collection_response>
```

An asset workload collecting (AWCO) component 137 may collect workload info and/or transmit the collected workload info (e.g., in batches) to a telemetry processing server to facilitate generating asset telemetry data. See FIG. 2 for additional details regarding the AWCO component.

The workload agent 112 may send a workload info batch transmittal request 141 to a telemetry processing server 108 to transmit a workload info batch (e.g., every 1 hour). In one implementation, the workload info batch transmittal request may include data such as a request identifier, an asset identifier, the workload info batch, and/or the like. In one embodiment, the workload agent may provide the following example workload info batch transmittal request, substantially in the form of a HTTP(S) POST message including XML-formatted data, as provided below:

```
POST /workload_info_batch_transmittal_request.php HTTP/1.1
Host: www.server.com
Content-Type: Application/XML
Content-Length: 667
<?XML version = "1.0" encoding = "UTF-8"?>
  <workload_info_batch_transmittal_request>
    <request_identifier>ID_request_3</request_identifier>
    <asset_identifier>ID_asset_1</asset_identifier>
    <workload_info_batch>
      <workload_info>
        <CPU>30%</CPU>
        <RAM>40%</RAM>
        <IO>300 IOPS</IO>
        <Network>50 Mbps</Network>
        <timestamp>2021-01-01 01:00:00</timestamp>
      </workload_info>
```

-continued

```
    <workload_info>
        <CPU>32%</CPU>
        <RAM>42%</RAM>
        <IO>310 IOPS</IO>
        <Network>52 Mbps</Network>
        <timestamp>2021-01-01 01:01:00</timestamp>
    </workload_info>
    <workload_info>
        <CPU>31%</CPU>
        <RAM>41%</RAM>
        <IO>320 IOPS</IO>
        <Network>10 Mbps</Network>
        <timestamp>2021-01-01 01:02:00</timestamp>
    </workload_info>
    ...
```

-continued

```
        </workload_info_batch>
    </workload_info_batch_transmittal_request>
```

The telemetry processing server 108 may send a workload info batch transmittal response 145 to the workload agent 112 to confirm that the workload info batch was received successfully. In one implementation, the workload info batch transmittal response may include data such as a response identifier, a status, and/or the like. In one embodiment, the telemetry processing server may provide the following example workload info batch transmittal response, substantially in the form of a HTTP(S) POST message including XML-formatted data, as provided below:

```
POST /workload_info_batch_transmittal_response.php HTTP/1.1
Host: www.server.com
Content-Type: Application/XML
Content-Length: 667
<?XML version = "1.0" encoding = "UTF-8"?>
<workload_info_batch_transmittal_response>
    <response_identifier>ID_response_3</response_identifier>
    <status>OK</status>
</workload_info_batch_transmittal_response>
```

An asset telemetry processing (ATP) component 149 may utilize workload info (e.g., currently and/or previously provided via workload info batches) to generate asset telemetry data (e.g., for various time windows). See FIG. 3 for additional details regarding the ATP component.

The telemetry processing server 108 may send an asset telemetry data store request 153 to a repository 110 to store the generated asset telemetry data. In one implementation, the asset telemetry data store request may include data such as a request identifier, asset telemetry data, and/or the like. In one embodiment, the telemetry processing server may provide the following example asset telemetry data store request, substantially in the form of a HTTP(S) POST message including XML-formatted data, as provided below:

```
POST /asset_telemetry_data_store_request.php HTTP/1.1
Host: www.server.com
Content-Type: Application/XML
Content-Length: 667
<?XML version = "1.0" encoding = "UTF-8"?>
<asset_telemetry_data_store_request>
    <request_identifier>ID_request_4</request_identifier>
    <asset_telemetry_data>
        <asset_identifier>ID_asset_1</asset_identifier>
        <CPU>30%</CPU>
        <RAM>45%</RAM>
        <IO>350 IOPS</IO>
        <Network>50 Mbps</Network>
        <time_window_size>1 hour</time_window_size>
        <time_window_timestamp>2021-01-01, hour 1</time_window_timestamp>
    </asset_telemetry_data>
    <asset_telemetry_data>
        <asset_identifier>ID_asset_1</asset_identifier>
        <CPU>60%</CPU>
        <RAM>70%</RAM>
        <IO>350 IOPS</IO>
        <Network>10 Mbps</Network>
        <time_window_size>1 day</time_window_size>
        <time_window_timestamp>2021-01-01</time_window_timestamp>
    </asset_telemetry_data>
    ...
</asset_telemetry_data_store_request>
```

The repository 110 may send an asset telemetry data store response 157 to the telemetry processing server 108 to confirm that the asset telemetry data was stored successfully. In one implementation, the asset telemetry data store response may include data such as a response identifier, a status, and/or the like. In one embodiment, the repository may provide the following example asset telemetry data store response, substantially in the form of a HTTP(S) POST message including XML-formatted data, as provided below:

```
POST /asset_telemetry_data_store_response.php HTTP/1.1
Host: www.server.com
Content-Type: Application/XML
Content-Length: 667
<?XML version = "1.0" encoding = "UTF-8"?>
<asset_telemetry_data_store_response>
    <response_identifier>ID_response_4</response_identifier>
    <status>OK</status>
</asset_telemetry_data_store_response>
```

FIG. 2 shows a logic flow illustrating embodiments of an asset workload collecting (AWCO) component for the MLLB. In FIG. 2, an asset workload collecting request may be obtained at 201. For example, the asset workload collecting request may be obtained as a result of installation (e.g., by a user) of a workload agent (e.g., as part of backup software installation).

Time interval settings may be determined at 205. For example, the time interval settings may specify a workload info collection time interval, a workload info batch transmittal time interval, and/or the like. In one implementation, a workload agent installation request may be parsed (e.g., using PHP commands) to determine the time interval settings (e.g., based on the values of the collection_time_interval, transmittal_time_interval, etc. fields). In another implementation, the time interval settings may be specified via a configuration setting.

A determination may be made at 209 whether it is time to collect workload info. For example, the workload info collection time interval may specify that workload info should be collected every 1 minute. If it is time to collect workload info, the operating system of the asset may be queried for workload info at 213. For example, workload info may include CPU utilization, RAM utilization, IO utilization, Network utilization, energy consumption, SMART drive values, temperature, power supply unit health, and/or the like metrics. In one embodiment, a kernel-resident agent may use low level API calls to obtain workload info. In one implementation, workload info may be collected using Microsoft Windows operating system calls such as GetSystemInfo( ), GlobalMemoryStatus( ), GetPhysicalDiskPerformance( ), GetTcpTable( ), and/or the like.

The collected workload info may be normalized at 217. In one implementation, the collected workload info may be adjusted to common units (e.g., percentages). For example, workload info regarding assets with different numbers of CPU cores, assets using operating systems that provide different types of CPU utilization units, etc. may be converted to CPU utilization percentages.

A timestamp may be assigned to the collected workload info at 221. In one implementation, the timestamp may specify the time when the workload agent was scheduled to initiate collection of workload info.

The collected workload info may be added to a workload info batch at 225. In one implementation, the workload info batch may be a datastructure (e.g., an array) that stores a set of collected workload info datastructures (e.g., JSON objects with metrics). For example, the collected workload info may be added as a new array element to the array.

A determination may be made at 229 whether it is time to transmit the workload info batch. For example, the workload info batch transmittal time interval may specify that workload info batches should be sent every 1 hour. If it is time to transmit the workload info batch, the workload info batch may be transmitted at 233. For example, the workload info batch may be transmitted via a workload info batch transmittal request (e.g., to a telemetry processing server).

The workload info batch may be cleared at 237. In one implementation, the array may be emptied (e.g., by setting the array's length to 0) and reset to a new empty array, so that it may be used for the next batch.

If it is not yet time either to collect workload info or to transmit a workload info batch, the MLLB may wait at 241 until the next scheduled operation.

FIG. 3 shows a logic flow illustrating embodiments of an asset telemetry processing (ATP) component for the MLLB. In FIG. 3, an asset telemetry processing request may be obtained at 301. For example, the asset telemetry processing request may be obtained as a result of receiving a workload info batch transmittal request from an asset.

Asset telemetry time window settings may be determined at 305. For example, the asset telemetry time window settings may specify a set of time windows (e.g., 1 hour, 1 day, 1 week, business hours, off business hours) for which to generate asset telemetry data. In one implementation, the asset telemetry time window settings may be specified via a configuration setting.

A determination may be made at 309 whether there remain time windows to process. In one implementation, each of the time windows specified in the asset telemetry time window settings may be processed. If there remain time windows to process, the next time window may be selected for processing at 313.

Workload info data associated with the selected time window may be determined at 317. In one implementation, workload info currently and/or previously provided via workload info batches from the asset corresponding to the selected time window may be determined. For example, if the selected time window is 1 hour (e.g., corresponding to the 1-hour length of a workload info batch), workload info transmitted via the last workload info batch may be utilized. In another example, if the selected time window is 1 day, workload info transmitted via the last 24 workload info batches may be utilized.

The determined workload info data may be processed with respect to the selected time window at 321. In one implementation, a metric value for the selected time window may be calculated for each workload info metric. For example, a metric value (e.g., CPU utilization percentage) for a workload info metric (e.g., CPU utilization) may be determined by winsorizing, taking the average of, and/or the like metric values corresponding to the selected time window. In some implementations, metric values may be rolled up to help eliminate skew. For example, when calculating a metric value for a workload info metric for a 1-day time window, processed metric values calculated for each of the corresponding 24 hours (e.g., 24 values) may be used instead of raw metric values for the corresponding day (e.g., 24*60=1440 values).

The generated asset telemetry data may be stored at 325. In one implementation, the asset telemetry data may be stored via an asset telemetry data store request.

Figure 4B:
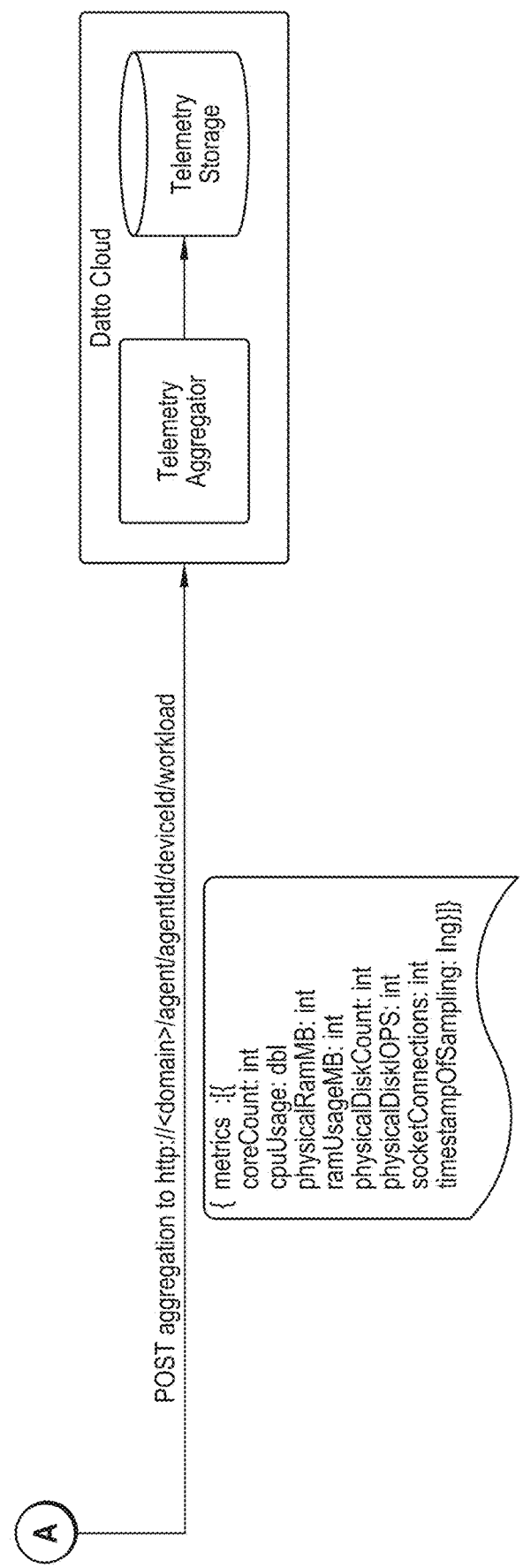

FIG. 4 shows implementation case(s) for the MLLB. In FIG. 4, exemplary asset telemetry data generation is illustrated. In one implementation, a backup agent may be modified to emit observed CPU/RAM/IO/Network/etc. usage on a continual basis (e.g., 1 minute interval) and transmit asynchronously to a DR provider on a defined interval (e.g., every 1 hour). For example, an asynchronous infrastructure service (e.g., RabbitMQ) may be utilized to facilitate high throughput async data capture and storage of asset telemetry data.

A supervised learning model may be utilized that contains a set of features labeled in a way that identifies the workload of the protected asset. For example, the following set of features may be used:

CPU Cores: int
CPU Usage: double
RAM: int
RAM Usage: double
Disk IOPS: int
Socket Connections: int
timestamp A label may be associated with each feature set to classify the asset workload impact (e.g., small, medium, large, X-large, etc.).

In one implementation, a normalizer, which may be an async processor that obtains a set of telemetry data for an asset for a window of time (e.g., 1 hour, 1 day, etc.) may be utilized. This processor reduces the telemetry data to a smaller statistically relevant set of data that is then provided to the classifier.

In one implementation, the classifier may apply the supervised model in conjunction with a k-nearest neighbors method against the provided telemetry data. The result of this operation is a normalized label that represents the workload of the provided telemetry data.

The telemetry data may be further normalized to one feature set, augmented with the classification label, and stored along with the asset record. This block of data may be used during the time of virtualization for the purpose of load balancing the virtualized asset for optimal performance. This data may also be used to protect against under/over provisioning of the virtualized asset.

FIGS. 5A-B show a datagraph illustrating data flow(s) for the MLLB. In FIGS. 5A-B, a client 502 (e.g., of a user) may send a workload agent installation request 521 to a node 504 to facilitate installation of workload info collecting agent on the node. For example, the client may be a desktop, a laptop, a tablet, a smartphone, a smartwatch, and/or the like that is executing a client application. For example, the node may be a compute node in a compute farm that provides backup continuity and disaster recovery in a cloud-based environment. It is to be understood that, in some implementations, the client and the node may be the same device. In one implementation, the workload agent installation request may include data such as a request identifier, workload collection settings, and/or the like. In one embodiment, the client may provide the following example workload agent installation request, substantially in the form of a HTTP(S) POST message including XML-formatted data, as provided below:

```
POST /workload_agent_installation_request.php HTTP/1.1
Host: www.server.com
Content-Type: Application/XML
Content-Length: 667
<?XML version = "1.0" encoding = "UTF-8"?>
<workload_agent_installation_request>
   <request_identifier>ID_request_11</request_identifier>
   <workload_collection_settings>
      <collection_time_interval>1 minute</collection_time_interval>
      <requested_workload_info>
        CPU, RAM, IO, Network
      </requested_workload_info>
      <transmittal_time_interval>1 hour</transmittal_time_interval>
   </workload_collection_settings>
</workload_agent_installation_request>
```

The node 504 may send a workload agent installation response 525 to the client 502 to inform the user that the workload info collecting agent was installed successfully. In one implementation, the workload agent installation response may include data such as a response identifier, a status, and/or the like. In one embodiment, the node may provide the following example workload agent installation response, substantially in the form of a HTTP(S) POST message including XML-formatted data, as provided below:

```
POST /workload_agent_installation_response.php HTTP/1.1
Host: www.server.com
Content-Type: Application/XML
Content-Length: 667
<?XML version = "1.0" encoding = "UTF-8"?>
<workload_agent_installation_response>
   <response_identifier>ID_response_11</response_identifier>
   <status>OK</status>
</workload_agent_installation_response>
```

The workload agent 512 on the node may send a workload info collection request 529 to the operating system 516 of the node to collect workload info (e.g., every 1 minute). In one implementation, the workload info collection request may include data such as a request identifier, requested workload info, and/or the like. In one embodiment, the workload agent may provide the following example workload info collection request, substantially in the form of a HTTP(S) POST message including XML-formatted data, as provided below:

```
POST /workload_info_collection_request.php HTTP/1.1
Host: www.server.com
Content-Type: Application/XML
Content-Length: 667
<?XML version = "1.0" encoding = "UTF-8"?>
<workload_info_collection_request>
   <request_identifier>ID_request_12</request_identifier>
   <requested_workload_info>CPU, RAM, IO, Network</requested_workload_info>
</workload_info_collection_request>
```

The operating system 516 may send a workload info collection response 533 to the workload agent 512 with the requested workload info. In one implementation, the workload info collection response may include data such as a response identifier, the requested workload info, and/or the like. In one embodiment, the operating system may provide the following example workload info collection response, substantially in the form of a HTTP(S) POST message including XML-formatted data, as provided below:

```
POST /workload_info_collection_response.php HTTP/1.1
Host: www.server.com
Content-Type: Application/XML
Content-Length: 667
<?XML version = "1.0" encoding = "UTF-8"?>
<workload_info_collection_response>
   <response_identifier>ID_response_12</response_identifier>
   <workload_info>
      <CPU>30%</CPU>
      <RAM>40%</RAM>
      <IO>300 IOPS</IO>
      <Network>50 Mbps</Network>
   </workload_info>
</workload_info_collection_response>
```

A node workload collecting (NWCO) component 537 may collect workload info and/or transmit the collected workload info (e.g., in batches) to a telemetry processing server to facilitate generating node telemetry data. See FIG. 6 for additional details regarding the NWCO component.

The workload agent 512 may send a workload info batch transmittal request 541 to a telemetry processing server 508 to transmit a workload info batch (e.g., every 1 hour). In one implementation, the workload info batch transmittal request may include data such as a request identifier, a node identifier, the workload info batch, and/or the like. In one embodiment, the workload agent may provide the following example workload info batch transmittal request, substantially in the form of a HTTP(S) POST message including XML-formatted data, as provided below:

```
POST /workload_info_batch_transmittal_request.php HTTP/1.1
Host: www.server.com
Content-Type: Application/XML
Content-Length: 667
<?XML version = "1.0" encoding = "UTF-8"?>
<workload_info_batch_transmittal_request>
   <request_identifier>ID_request_13</request_identifier>
   <node_identifier>ID_node_1</node_identifier>
   <workload_info_batch>
      <workload_info>
         <CPU>30%</CPU>
         <RAM>40%</RAM>
         <IO>300 IOPS</IO>
         <Network>50 Mbps</Network>
         <timestamp>2021-01-01 01:00:00</timestamp>
      </workload_info>
      <workload_info>
         <CPU>32%</CPU>
         <RAM>42%</RAM>
         <IO>310 IOPS</IO>
         <Network>52 Mbps</Network>
         <timestamp>2021-01-01 01:01:00</timestamp>
      </workload_info>
      <workload_info>
         <CPU>31%</CPU>
         <RAM>41%</RAM>
         <IO>320 IOPS</IO>
         <Network>10 Mbps</Network>
         <timestamp>2021-01-01 01:02:00</timestamp>
      </workload_info>
      ...
   </workload_info_batch>
</workload_info_batch_transmittal_request>
```

The telemetry processing server 508 may send a workload info batch transmittal response 545 to the workload agent 512 to confirm that the workload info batch was received successfully. In one implementation, the workload info batch transmittal response may include data such as a response identifier, a status, and/or the like. In one embodiment, the telemetry processing server may provide the following example workload info batch transmittal response, substantially in the form of a HTTP(S) POST message including XML-formatted data, as provided below:

```
POST /workload_info_batch_transmittal_response.php HTTP/1.1
Host: www.server.com
Content-Type: Application/XML
Content-Length: 667
<?XML version = "1.0" encoding = "UTF-8"?>
<workload_info_batch_transmittal_response>
   <response_identifier>ID_response_13</response_identifier>
   <status>OK</status>
</workload_info_batch_transmittal_response>
```

A node telemetry processing (NTP) component 549 may utilize workload info (e.g., currently and/or previously provided via workload info batches) to generate node telemetry data (e.g., for various time windows). See FIG. 7 for additional details regarding the NTP component.

The telemetry processing server 508 may send a node telemetry data store request 553 to a repository 510 to store the generated node telemetry data. In one implementation, the node telemetry data store request may include data such as a request identifier, node telemetry data, and/or the like. In one embodiment, the telemetry processing server may provide the following example node telemetry data store request, substantially in the form of a HTTP(S) POST message including XML-formatted data, as provided below:

```
POST /node_telemetry_data_store_request.php HTTP/1.1
Host: www.server.com
Content-Type: Application/XML
Content-Length: 667
<?XML version = "1.0" encoding = "UTF-8"?>
<node_telemetry_data_store_request>
   <request_identifier>ID_request_14</request_identifier>
   <node_telemetry_data>
      <node_identifier>ID_node_1</node_identifier>
      <CPU>30%</CPU>
      <RAM>45%</RAM>
      <IO>350 IOPS</IO>
      <Network>50 Mbps</Network>
      <time_window_size>1 hour</time_window_size>
      <time_window_timestamp>2021-01-01, hour 1</time_window_timestamp>
   </node_telemetry_data>
   <node_telemetry_data>
      <node_identifier>ID_node_1</node_identifier>
      <CPU>60%</CPU>
      <RAM>70%</RAM>
      <IO>350 IOPS</IO>
      Network Mbps/Network
      <time_window_size>1 day</time_window_size>
      <time_window_timestamp>2021-01-01</time_window_timestamp>
   </node_telemetry_data>
   ...
</node_telemetry_data_store_request>
```

The repository 510 may send a node telemetry data store response 557 to the telemetry processing server 508 to confirm that the node telemetry data was stored successfully. In one implementation, the node telemetry data store response may include data such as a response identifier, a status, and/or the like. In one embodiment, the repository may provide the following example node telemetry data store response, substantially in the form of a HTTP(S) POST message including XML-formatted data, as provided below:

```
POST /node_telemetry_data_store_response.php HTTP/1.1
Host: www.server.com
Content-Type: Application/XML
Content-Length: 667
<?XML version = "1.0" encoding = "UTF-8"?>
<node_telemetry_data_store_response>
    <response_identifier>ID_response_14</response_identifier>
    <status>OK</status>
</node_telemetry_data_store_response>
```

FIG. 6 shows a logic flow illustrating embodiments of a node workload collecting (NWCO) component for the MLLB. In FIG. 6, a node workload collecting request may be obtained at 601. For example, the node workload collecting request may be obtained as a result of installation (e.g., by a user) of a workload agent.

Time interval settings may be determined at 605. For example, the time interval settings may specify a workload info collection time interval, a workload info batch transmittal time interval, and/or the like. In one implementation, a workload agent installation request may be parsed (e.g., using PHP commands) to determine the time interval settings (e.g., based on the values of the collection_time_interval, transmittal_time_interval, etc. fields). In another implementation, the time interval settings may be specified via a configuration setting.

A determination may be made at 609 whether it is time to collect workload info. For example, the workload info collection time interval may specify that workload info should be collected every 1 minute. If it is time to collect workload info, the operating system of the node may be queried for workload info at 613. For example, workload info may include CPU utilization, RAM utilization, IO utilization, Network utilization, energy consumption, SMART drive values, temperature, power supply unit health, and/or the like metrics. In one embodiment, a kernel-resident agent may use low level API calls to obtain workload info. In one implementation, workload info may be collected using Microsoft Windows operating system calls such as GetSystemInfo( ), GlobalMemoryStatus( ), GetPhysicalDiskPerformance( ), GetTcpTable( ), and/or the like.

The collected workload info may be normalized at 617. In one implementation, the collected workload info may be adjusted to common units (e.g., percentages). For example, workload info regarding nodes with different numbers of CPU cores, nodes using operating systems that provide different types of CPU utilization units, etc. may be converted to CPU utilization percentages.

A timestamp may be assigned to the collected workload info at 621. In one implementation, the timestamp may specify the time when the workload agent was scheduled to initiate collection of workload info.

The collected workload info may be added to a workload info batch at 625. In one implementation, the workload info batch may be a datastructure (e.g., an array) that stores a set of collected workload info datastructures (e.g., JSON objects with metrics). For example, the collected workload info may be added as a new array element to the array.

A determination may be made at 629 whether it is time to transmit the workload info batch. For example, the workload info batch transmittal time interval may specify that workload info batches should be sent every 1 hour. If it is time to transmit the workload info batch, the workload info batch may be transmitted at 633. For example, the workload info batch may be transmitted via a workload info batch transmittal request (e.g., to a telemetry processing server).

The workload info batch may be cleared at 637. In one implementation, the array may be emptied (e.g., by setting the array's length to 0) and reset to a new empty array, so that it may be used for the next batch.

If it is not yet time either to collect workload info or to transmit a workload info batch, the MLLB may wait at 641 until the next scheduled operation.

FIG. 7 shows a logic flow illustrating embodiments of a node telemetry processing (NTP) component for the MLLB. In FIG. 7, a node telemetry processing request may be obtained at 701. For example, the node telemetry processing request may be obtained as a result of receiving a workload info batch transmittal request from a node.

Node telemetry time window settings may be determined at 705. For example, the node telemetry time window settings may specify a set of time windows (e.g., 1 hour, 1 day, 1 week, business hours, off business hours) for which to generate node telemetry data. In one implementation, the node telemetry time window settings may be specified via a configuration setting.

A determination may be made at 709 whether there remain time windows to process. In one implementation, each of the time windows specified in the node telemetry time window settings may be processed. If there remain time windows to process, the next time window may be selected for processing at 713.

Workload info data associated with the selected time window may be determined at 717. In one implementation, workload info currently and/or previously provided via workload info batches from the node corresponding to the selected time window may be determined. For example, if the selected time window is 1 hour (e.g., corresponding to the 1-hour length of a workload info batch), workload info transmitted via the last workload info batch may be utilized. In another example, if the selected time window is 1 day, workload info transmitted via the last 24 workload info batches may be utilized.

The determined workload info data may be processed with respect to the selected time window at 721. In one implementation, a metric value for the selected time window may be calculated for each workload info metric. For example, a metric value (e.g., CPU utilization percentage) for a workload info metric (e.g., CPU utilization) may be determined by winsorizing, taking the average of, and/or the like metric values corresponding to the selected time window. In some implementations, metric values may be rolled up to help eliminate skew. For example, when calculating a metric value for a workload info metric for a 1-day time window, processed metric values calculated for each of the corresponding 24 hours (e.g., 24 values) may be used instead of raw metric values for the corresponding day (e.g., 24*60=1440 values).

The generated node telemetry data may be stored at 725. In one implementation, the node telemetry data may be stored via a node telemetry data store request.

Figure 8A:
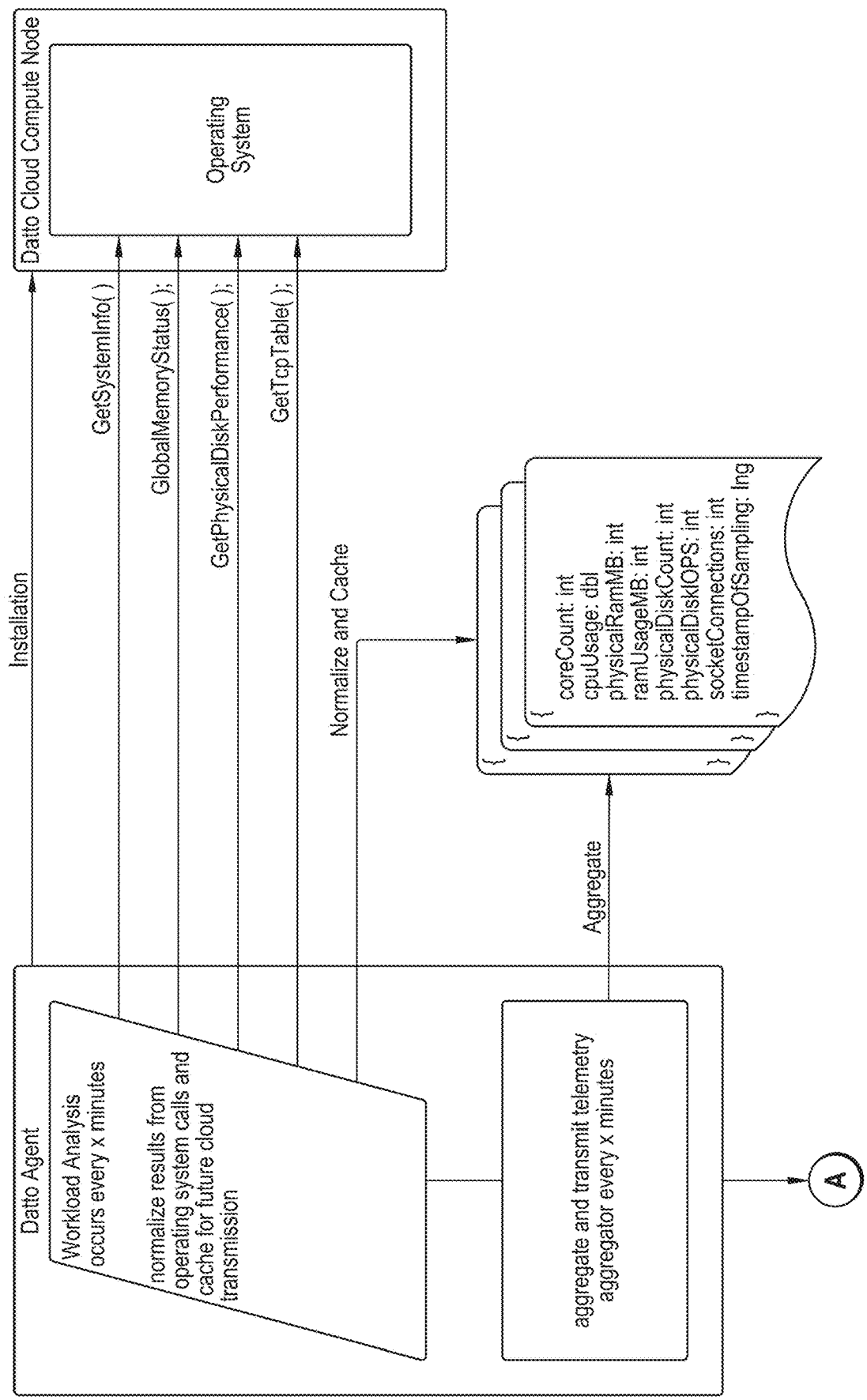
FIGS. 8A-8B show implementation case(s) for the MLLB.
Figure 8B:
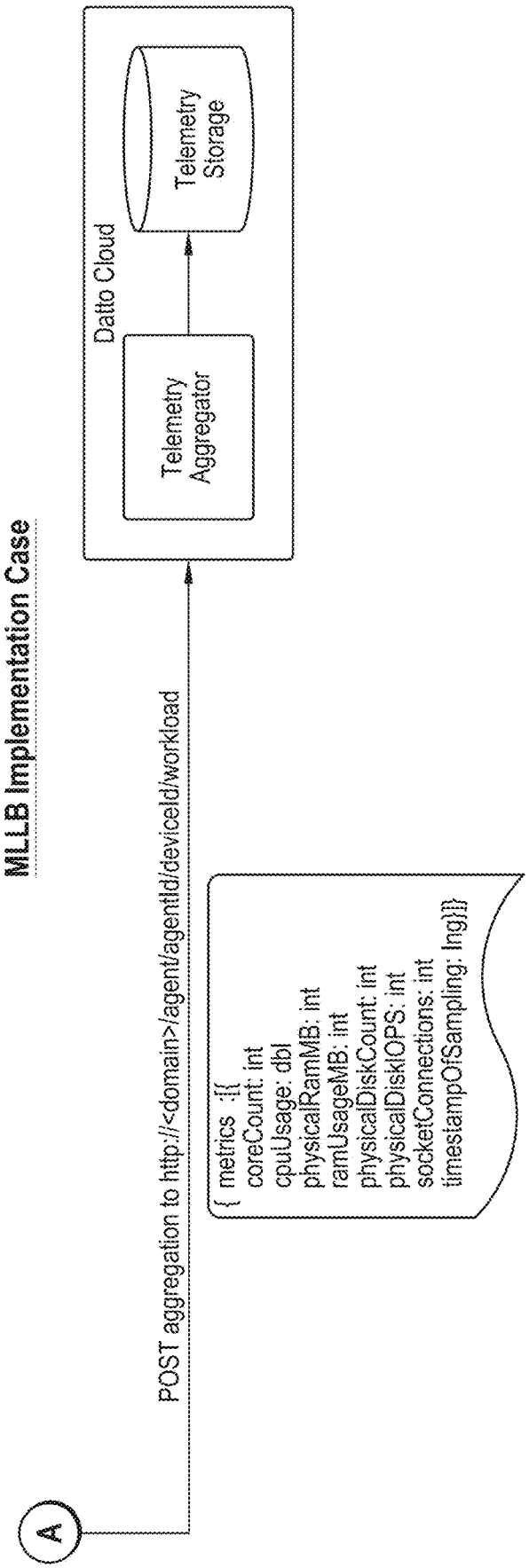

FIG. 8 shows implementation case(s) for the MLLB. In FIG. 8, an exemplary compute node telemetry data generation is illustrated. In one implementation, a compute node may be modified to emit observed CPU/RAM/IO/Network/ etc. usage on a continual basis (e.g., 1 minute interval) and transmit asynchronously to an ingesting routine for processing on a defined interval (e.g., every 1 hour). For example, an asynchronous infrastructure service (e.g., RabbitMQ) may be utilized to facilitate high throughput async data capture and storage of compute node telemetry data.

A supervised learning model may be utilized that contains a set of features labeled in a way that identifies the workload of the node. For example, the following set of features may be used:

---
CPU Cores: int
CPU Usage: double
RAM: int
RAM Usage: double
Disk IOPS: int
Socket Connections: int
timestamp
---

A label may be associated with each feature set to classify the node workload impact (e.g., small, medium, large, X-large, etc.).

In one implementation, a normalizer, which may be an async processor that obtains a set of telemetry data for a node for a window of time (e.g., 1 hour, 1 day, etc.) may be utilized. This processor reduces the telemetry data to a smaller statistically relevant set of data that is then provided to the classifier.

In one implementation, the classifier may apply the supervised model in conjunction with a k-nearest neighbors method against the provided telemetry data. The result of this operation is a normalized label that represents the workload of the provided telemetry data.

The telemetry data may be further normalized to one feature set, augmented with the classification label, and stored along with the node record. This block of data may be used during the time of virtualization for the purpose of load balancing virtualized assets instantiated on the node for optimal performance.

FIG. 9 shows a datagraph illustrating data flow(s) for the MLLB. In FIG. 9, a client 902 (e.g., of a user) may send an asset workload classification datastructure (AWCD) training request 921 to a training server 906 to facilitate training an AWCD (e.g., for a specified time window). For example, the client may be a desktop, a laptop, a tablet, a smartphone, a smartwatch, and/or the like that is executing a client application. In one implementation, the AWCD training request may include data such as a request identifier, an asset telemetry time window, an asset telemetry training data range, asset workload classification label types, a machine learning method, an acceptable performance metric, and/or the like. In one embodiment, the client may provide the following example AWCD training request, substantially in the form of a HTTP(S) POST message including XML-formatted data, as provided below:

---
POST /asset_workload_classification_datastructure_training_request.php HTTP/1.1
Host: www.server.com
Content-Type: Application/XML
Content-Length: 667
<?XML version = "1.0" encoding = "UTF-8"?>
<asset_workload_classification_datastructure_training_request>
    <request_identifier>ID_request_21</request_identifier>
    <asset_telemetry_time_window>1 hour</asset_telemetry_time_window>
    <asset_telemetry_training_data_range>1 month</asset_telemetry_training_data_range>
    <asset_workload_classification_label_types>
        CPU-small, CPU-medium, CPU-large, RAM-small, RAM-medium, RAM-large, IO-small,
        IO-medium, IO-large, Network-small, Network-medium, Network-large
    </asset_workload_classification_label_types>
    <machine_learning_method>k-nearest neighbors</machine_learning_method>
    <acceptable_performance_metric>90% accuracy</acceptable_performance_metric>
</asset_workload_classification_datastructure_training_request>
---

The training server 906 may send an asset telemetry training data retrieve request 925 to a repository 910 to retrieve asset telemetry training data utilized to generate the AWCD. In one implementation, the asset telemetry training data retrieve request may include data such as a request identifier, an asset telemetry time window, an asset telemetry training data range, and/or the like. In one embodiment, the training server may provide the following example asset telemetry training data retrieve request, substantially in the form of a HTTP(S) POST message including XML-formatted data, as provided below:

---
POST /asset_telemetry_training_data_retrieve_request.php HTTP/1.1
Host: www.server.com
Content-Type: Application/XML
Content-Length: 667
<?XML version = "1.0" encoding = "UTF-8"?>
<asset_telemetry_training_data_retrieve_request>
    <request_identifier>ID_request_22</request_identifier>
    <asset_telemetry_time_window>1 hour</asset_telemetry_time_window>
    <asset_telemetry_training_data_range>1 month</asset_telemetry_training_data_range>
</asset_telemetry_training_data_retrieve_request>
---

The repository 910 may send an asset telemetry training data retrieve response 929 to the training server 906 with the requested asset telemetry training data. In one implementation, the asset telemetry training data retrieve response may include data such as a response identifier, the requested asset telemetry training data, and/or the like. In one embodiment, the repository may provide the following example asset telemetry training data retrieve response, substantially in the form of a HTTP(S) POST message including XML-formatted data, as provided below:

```
POST /asset_telemetry_training_data_retrieve_response.php HTTP/1.1
Host: www.server.com
Content-Type: Application/XML
Content-Length: 667
<?XML version = "1.0" encoding = "UTF-8"?>
<asset_telemetry_training_data_retrieve_response>
  <response_identifier>ID_response_22</response_identifier>
  <asset_telemetry_data>
     <asset_identifier>ID_asset_1</asset_identifier>
     <CPU>30%</CPU>
     <RAM>45%</RAM>
     <IO>350 IOPS</IO>
     <Network>50 Mbps</Network>
     <time_window_size>1 hour</time_window_size>
     <time_window_timestamp>2021-01-01, hour 1</time_window_timestamp>
  </asset_telemetry_data>
  <asset_telemetry_data>
     <asset_identifier>ID_asset_1</asset_identifier>
     <CPU>35%</CPU>
     <RAM>40%</RAM>
     <IO>450 IOPS</IO>
     <Network>50 Mbps</Network>
     <time_window_size>1 hour</time_window_size>
     <time_window_timestamp>2021-01-01, hour 2</time_window_timestamp>
  </asset_telemetry_data>
  ...
  <asset_telemetry_data>
     <asset_identifier>ID_asset_2</asset_identifier>
     <CPU>70%</CPU>
     <RAM>45%</RAM>
     <IO>160 IOPS</IO>
     <Network>10 Mbps</Network>
     <time_window_size>1 hour</time_window_size>
     <time_window_timestamp>2021-01-01, hour 1</time_window_timestamp>
  </asset_telemetry_data>
  <asset_telemetry_data>
     <asset_identifier>ID_asset_2</asset_identifier>
     <CPU>80%</CPU>
     <RAM>45%</RAM>
     <IO>150 IOPS</IO>
     <Network>10 Mbps</Network>
     <time_window_size>1 hour</time_window_size>
     <time_window_timestamp>2021-01-01, hour 2</time_window_timestamp>
  </asset_telemetry_data>
  ...
</asset_telemetry_training_data_retrieve_response>
```

An AWCD training (AWCDT) component 933 may utilize the retrieved asset telemetry training data to train the asset workload classification datastructure. See FIG. 10 for additional details regarding the AWCDT component.

The training server 906 may send an AWCD store request 937 to the repository 910 to store the trained AWCD. In one implementation, the AWCD store request may include data such as a request identifier, AWCD data, and/or the like. In one embodiment, the training server may provide the following example AWCD store request, substantially in the form of a HTTP(S) POST message including XML-formatted data, as provided below:

```
POST /AWCD_store_request.php HTTP/1.1
Host: www.server.com
Content-Type: Application/XML
Content-Length: 667
<?XML version = "1.0" encoding = "UTF-8"?>
<AWCD_store_request>
  <request_identifier>ID_request_23</request_identifier>
  <AWCD_identifier>ID_AWCD_1</AWCD_identifier>
  <AWCD_machine_learning_method>k-nearest neighbors</AWCD_machine_learning_method>
  <AWCD_performance_metric>95% accuracy</AWCD_performance_metric>
  <AWCD_parameters>model parameters defining the AWCD</AWCD_parameters>
</AWCD_store_request>
```

The repository 910 may send an AWCD store response 941 to the training server 906 to confirm that the trained AWCD was stored successfully. In one implementation, the AWCD store response may include data such as a response identifier, a status, and/or the like. In one embodiment, the repository may provide the following example AWCD store response, substantially in the form of a HTTP(S) POST message including XML-formatted data, as provided below:

```
POST /AWCD_store_response.php HTTP/1.1
Host: www.server.com
Content-Type: Application/XML
Content-Length: 667
```

```
-continued

<?XML version = "1.0" encoding = "UTF-8"?>
<AWCD_store_response>
   <response_identifier>ID_response_23</response_identifier>
   <status>OK</status>
</AWCD_store_response>
```

The training server 906 may send an AWCD training response 945 to the client 902 to inform the user that the AWCD was trained successfully. In one implementation, the AWCD training response may include data such as a response identifier, a status, and/or the like. In one embodiment, the training server may provide the following example AWCD training response, substantially in the form of a HTTP(S) POST message including XML-formatted data, as provided below:

```
POST /AWCD_training_response.php HTTP/1.1
Host: www.server.com
Content-Type: Application/XML
Content-Length: 667
<?XML version = "1.0" encoding = "UTF-8"?>
<AWCD_training_response>
   <response_identifier>ID_response_21</response_identifier>
   <status>OK</status>
</AWCD_training_response>
```

FIG. 10 shows a logic flow illustrating embodiments of an asset workload classification datastructure training (AWCDT) component for the MLLB. In FIG. 10, an asset workload classification datastructure training request may be obtained at 1001. For example, the asset workload classification datastructure training request may be obtained as a result of a user request to train an asset workload classification datastructure (AWCD).

An asset telemetry time window to utilize may be determined at 1003. For example, the asset telemetry time window may be 1 hour, 1 day, 1 week, business hours, off business hours, and/or the like. In one implementation, the asset workload classification datastructure training request may be parsed (e.g., using PHP commands) to determine the asset telemetry time window to utilize (e.g., based on the value of the asset_telemetry_time_window field). In another implementation, the asset telemetry time window to utilize may be specified via a configuration setting.

Asset telemetry training data for the specified time window may be obtained at 1005. For example, the asset telemetry training data may include any available data or data specific to a partner. In one embodiment, asset telemetry training data within a specified range (e.g., 1 month) corresponding to the specified time window (e.g., 1 hour) may be obtained. In one implementation, the asset workload classification datastructure training request may be parsed (e.g., using PHP commands) to determine the specified range (e.g., based on the value of the asset_telemetry_training_data_range field). For example, the asset telemetry training data for the specified time window may be obtained via a MySQL database command similar to the following:

```
SELECT *
FROM AssetTelemetry
WHERE timeWindowSize = "1 hour" AND
   timestampOfSampling BETWEEN 'date 1 month ago' AND 'current date'.
```

A determination may be made at 1009 whether there remain training records to label. In one implementation, each of the training records included in the asset telemetry training data may be labeled. If there remain training records to label, the next training record may be selected for labeling at 1013.

Available asset workload classification label types may be determined at 1017. In one embodiment, training records may be labeled based on the overall workload footprint (e.g., small, medium, large). In another embodiment, training records may be multi-labeled based on the workload footprints of different components (e.g., CPU-small, CPU-medium, CPU-large for CPU usage workload footprint; RAM-small, RAM-medium, RAM-large for RAM usage workload footprint; IO-small, IO-medium, IO-large for IO usage workload footprint; Network-small, Network-medium, Network-large for network usage workload footprint). In another embodiment, training records may be (multi-)labeled to indicate heavily utilized components (e.g., CPU-HOT, RAM-HOT, IO-HOT, Network-HOT). In one implementation, the asset workload classification datastructure training request may be parsed (e.g., using PHP commands) to determine the available asset workload classification label types (e.g., based on the value of the asset_workload_classification_label_types field). In another implementation, the available asset workload classification label types may be specified via a configuration setting.

The selected training record may be labeled to represent its asset workload classification at 1021. In one embodiment, the selected training record may be labeled in accordance with the available asset workload classification label types. In one implementation, the selected training record may be labeled based on specified usage thresholds (e.g., 0%-30% average CPU usage=CPU-small, 31%-70% average CPU usage=CPU-medium, 71%-100% average CPU usage=CPU-large). In another implementation, the selected training record may be labeled by an expert. For example, the selected training record may be updated to store its asset workload classification label.

The training records may be split into training and testing subsets at 1025. In one embodiment, the training subset may be utilized to train the AWCD and the testing subset may be used to evaluate the AWCD's performance. In one implementation, the training records may be split (e.g., randomly) into training and testing subsets based on a specified ratio (e.g., 80% of the training records are used as the training subset and 20% of the training records are used as the testing subset).

The asset workload classification datastructure may be trained using the training subset at 1029. In one embodiment, a machine learning method may be utilized to train the asset workload classification datastructure. For example, the machine learning method may be logistic regression, k-nearest neighbors, random forest, neural network, and/or the like. In one implementation, the asset workload classification datastructure training request may be parsed (e.g., using PHP commands) to determine the machine learning method to utilize (e.g., based on the value of the machine_learning_method field). In another implementation, the machine learning method to utilize may be specified via a configuration setting. In one embodiment, workload info metric values and asset workload classification label associated with each training record in the training subset may be used as training examples by the machine learning method to train the AWCD.

The trained asset workload classification datastructure may be tested using the testing subset at 1033. In one embodiment, the trained AWCD may be used to label each training record in the testing subset, and the resulting label may be compared to the original label associated with the respective training record to evaluate the AWCD's performance. In one implementation, the AWCD's performance may be expressed as the percentage of training records in the testing subset that were labeled correctly by the AWCD.

A determination may be made at 1037 whether the AWCD's performance is acceptable. In one embodiment, the AWCD's performance may be deemed acceptable if it meets or exceeds a threshold acceptable performance metric (e.g., 90% accuracy). In one implementation, the asset workload classification datastructure training request may be parsed (e.g., using PHP commands) to determine the threshold acceptable performance metric (e.g., based on the value of the acceptable_performance_metric field). In another implementation, the threshold acceptable performance metric may be specified via a configuration setting.

If the AWCD's performance is not acceptable (e.g., below the threshold acceptable performance metric), the training parameters may be tuned at 1041 and the AWCD may be retrained. For example, asset telemetry time window, asset telemetry training data range, asset workload classification label types, machine learning method, and/or the like may be adjusted.

If the AWCD's performance is acceptable, the trained asset workload classification datastructure may be stored at 1045. In one implementation, the AWCD may be stored via an AWCD store request.

Figure 11A:
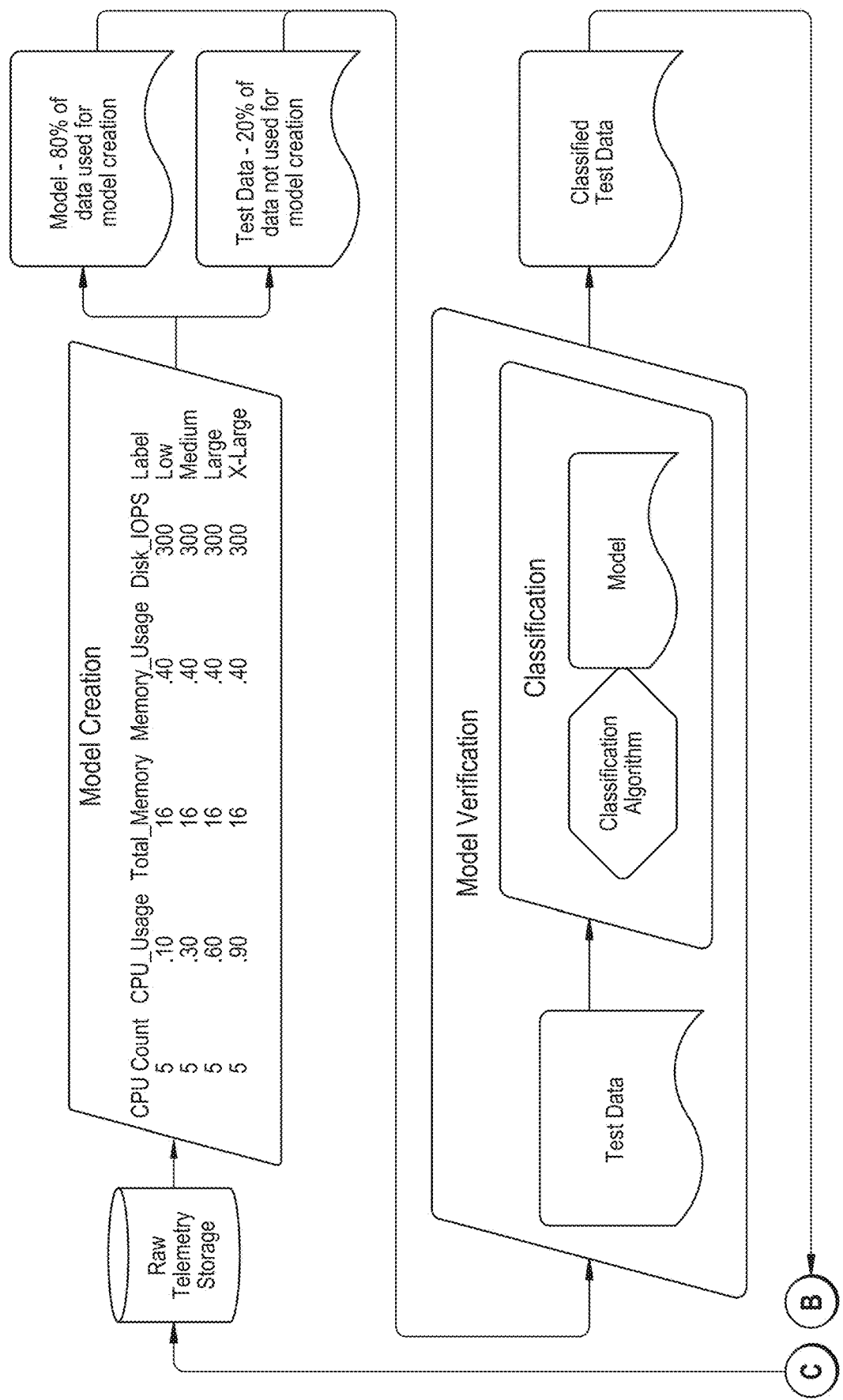
FIGS. 11A-11B show implementation case(s) for the MLLB.
Figure 11B:
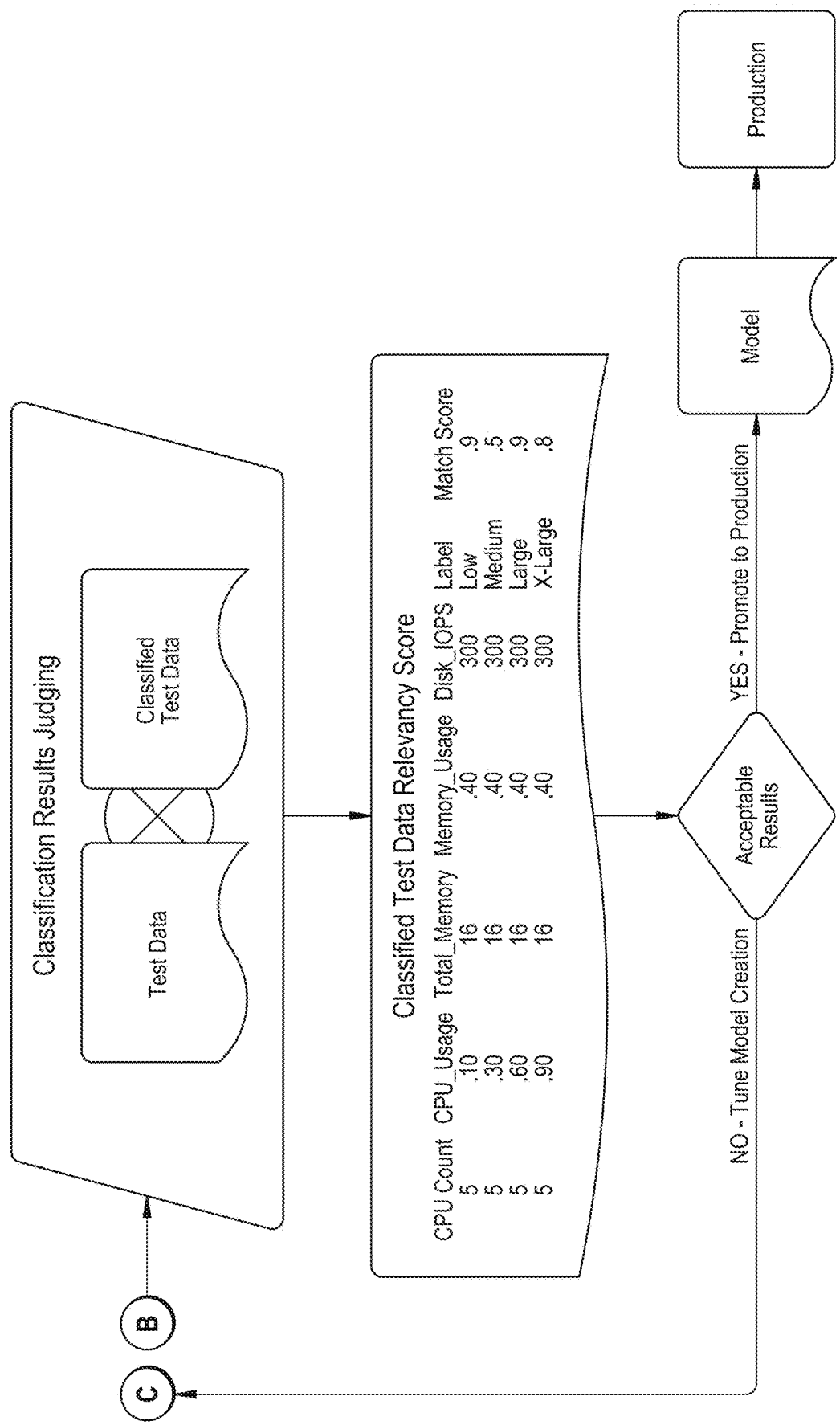

FIG. 11 shows implementation case(s) for the MLLB. In FIG. 11, an exemplary supervised training workflow for generating an asset workload classification datastructure is illustrated. In one implementation, unlabeled feature records are obtained from the raw captured workload telemetry repository. The obtained records are labeled accordingly to represent their workload classification (e.g., small, medium, large).

In one implementation, 80% of newly labeled records are provided to model creation process and a normalized model is produced. The 20% of data not provided to model creation is processed by the classification algorithm in conjunction with the normalized model.

In one implementation, the output of the classification algorithm is compared with the original labeling of the processed data and the results judged. When the results are acceptable, training is complete, and the model can be promoted to production. When the results are not acceptable, tuning of the model creation process is performed until desired results are achieved.

FIG. 12 shows a datagraph illustrating data flow(s) for the MLLB. In FIG. 12, a client 1202 (e.g., of a user) may send a node workload classification datastructure (NWCD) training request 1221 to a training server 1206 to facilitate training an NWCD (e.g., for a specified time window). For example, the client may be a desktop, a laptop, a tablet, a smartphone, a smartwatch, and/or the like that is executing a client application. In one implementation, the NWCD training request may include data such as a request identifier, a node telemetry time window, a node telemetry training data range, node workload classification label types, a machine learning method, an acceptable performance metric, and/or the like. In one embodiment, the client may provide the following example NWCD training request, substantially in the form of a HTTP(S) POST message including XML-formatted data, as provided below:

```
POST /node_workload_classification_datastructure_training_request.php HTTP/1.1
Host: www.server.com
Content-Type: Application/XML
Content-Length: 667
<?XML version = "1.0" encoding = "UTF-8"?>
<node_workload_classification_datastructure_training_request>
    <request_identifier>ID_request_31</request_identifier>
    <node_telemetry_time_window>1 hour</node_telemetry_time_window>
    <node_telemetry_training_data_range>1 month</node_telemetry_training_data_range>
    <node_workload_classification_label_types>
       CPU-HOT, RAM-HOT, IO-HOT, Network-HOT
    </node_workload_classification_label_types>
    <machine_learning_method>k-nearest neighbors</machine_learning_method>
    <acceptable_performance_metric>90% accuracy</acceptable_performance_metric>
</node_workload_classification_datastructure_training_request>
```

The training server 1206 may send a node telemetry training data retrieve request 1225 to a repository 1210 to retrieve node telemetry training data utilized to generate the NWCD. In one implementation, the node telemetry training data retrieve request may include data such as a request identifier, a node telemetry time window, a node telemetry training data range, and/or the like. In one embodiment, the training server may provide the following example node telemetry training data retrieve request, substantially in the form of a HTTP(S) POST message including XML-formatted data, as provided below:

```
POST /node_telemetry_training_data_retrieve_request.php HTTP/1.1
Host: www.server.com
Content-Type: Application/XML
Content-Length: 667
<?XML version = "1.0" encoding = "UTF-8"?>
<node_telemetry_training_data_retrieve_request>
    <request_identifier>ID_request_32</request_identifier>
    <node_telemetry_time_window>1 hour</node_telemetry_time_window>
    <node_telemetry_training_data_range>1 month</node_telemetry_training_data_range>
</node_telemetry_training_data_retrieve_request>
```

The repository 1210 may send a node telemetry training data retrieve response 1229 to the training server 1206 with the requested node telemetry training data. In one implementation, the node telemetry training data retrieve response may include data such as a response identifier, the requested node telemetry training data, and/or the like. In one embodiment, the repository may provide the following example node telemetry training data retrieve response, substantially in the form of a HTTP(S) POST message including XML-formatted data, as provided below:

```
POST /node_telemetry_training_data_retrieve_response.php HTTP/1.1
Host: www.server.com
Content-Type: Application/XML
Content-Length: 667
<?XML version = "1.0" encoding = "UTF-8"?>
<node_telemetry_training_data_retrieve_response>
    <response_identifier>ID_response_32</response_identifier>
    <node_telemetry_data>
        <node_identifier>ID_node_1</node_identifier>
        <CPU>30%</CPU>
        <RAM>45%</RAM>
        <IO>350 IOPS</IO>
        <Network>50 Mbps</Network>
        <time_window_size>1 hour</time_window_size>
        <time_window_timestamp>2021-01-01, hour 1</time_window_timestamp>
    </node_telemetry_data>
    <node_telemetry_data>
        <node_identifier>ID_node_1</node_identifier>
        <CPU>35%</CPU>
        <RAM>40%</RAM>
        <IO>450 IOPS</IO>
        <Network>50 Mbps</Network>
        <time_window_size>1 hour</time_window_size>
        <time_window_timestamp>2021-01-01, hour 2</time_window_timestamp>
    </node_telemetry_data>
    ...
    <node_telemetry_data>
        <node_identifier>ID_node_2</node_identifier>
        <CPU>70%</CPU>
        <RAM>45%</RAM>
        <IO>160 IOPS</IO>
        <Network>10 Mbps</Network>
        <time_window_size>1 hour</time_window_size>
        <time_window_timestamp>2021-01-01, hour 1</time_window_timestamp>
    </node_telemetry_data>
    <node_telemetry_data>
        <node_identifier>ID_node_2</node_identifier>
        <CPU>80%</CPU>
        RAM/RAM
        <IO>150 IOPS</IO>
```

```
    <Network>10 Mbps</Network>
    <time_window_size>1 hour</time_window_size>
    <time_window_timestamp>2021-01-01, hour 2</time_window_timestamp>
  </node_telemetry_data>
  ...
</node_telemetry_training_data_retrieve_response>
```

A NWCD training (NWCDT) component 1233 may utilize the retrieved node telemetry training data to train the node workload classification datastructure. See FIG. 13 for additional details regarding the NWCDT component.

The training server 1206 may send a NWCD store request 1237 to the repository 1210 to store the trained NWCD. In one implementation, the NWCD store request may include data such as a request identifier, NWCD data, and/or the like. In one embodiment, the training server may provide the following example NWCD store request, substantially in the form of a HTTP(S) POST message including XML-formatted data, as provided below:

```
POST /NWCD_store_request.php HTTP/1.1
Host: www.server.com
Content-Type: Application/XML
Content-Length: 667
<?XML version = "1.0" encoding = "UTF-8"?>
<NWCD_store_request>
  <request_identifier>ID_request_33</request_identifier>
  <NWCD_identifier>ID_NWCD_1</NWCD_identifier>
  <NWCD_machine_learning_method>k-nearest neighbors</NWCD_machine_learning_method>
  <NWCD_performance_metric>95% accuracy</NWCD_performance_metric>
  <NWCD_parameters>modeL parameters defining the WWCD</NWCD_parameters>
</NWCD_store_request>
```

The repository 1210 may send a NWCD store response 1241 to the training server 1206 to confirm that the trained NWCD was stored successfully. In one implementation, the NWCD store response may include data such as a response identifier, a status, and/or the like. In one embodiment, the repository may provide the following example NWCD store response, substantially in the form of a HTTP(S) POST message including XML-formatted data, as provided below:

```
POST /NWCD_ store_response, php HTTP/1.1
Host: www.server.com
Content-Type: Application/XML
Content-Length: 667
<?XML version = "1.0" encoding = "UTF-8"?>
<NWCD_store_response>
  <response_identifier>ID_response_33</response_identifier>
  <status>OK</status>
</NWCD_store_response>
```

The training server 1206 may send an NWCD training response 1245 to the client 1202 to inform the user that the NWCD was trained successfully. In one implementation, the NWCD training response may include data such as a response identifier, a status, and/or the like. In one embodiment, the training server may provide the following example NWCD training response, substantially in the form of a HTTP(S) POST message including XML-formatted data, as provided below:

```
POST /NWCD_training_response.php HTTP/1.1
Host: www.server.com
```

-continued

```
Content-Type: Application/XML
Content-Length: 667
<?XML version = "1.0" encoding = "UTF-8"?>
<NWCD_training_response>
  <response_identifier>ID_response_31</response_identifier>
  <status>OK</status>
</NWCD_training_response>
```

FIG. 13 shows a logic flow illustrating embodiments of a node workload classification datastructure training (NWCDT) component for the MLLB. In FIG. 13, a node workload classification datastructure training request may be obtained at 1301. For example, the node workload classification datastructure training request may be obtained as a result of a user request to train a node workload classification datastructure (NWCD).

A node telemetry time window to utilize may be determined at 1303. For example, the node telemetry time window may be 1 hour, 1 day, 1 week, business hours, off business hours, and/or the like. In one implementation, the node workload classification datastructure training request may be parsed (e.g., using PHP commands) to determine the node telemetry time window to utilize (e.g., based on the value of the node_telemetry_time_window field). In another implementation, the node telemetry time window to utilize may be specified via a configuration setting.

Node telemetry training data for the specified time window may be obtained at 1305. In one embodiment, node telemetry training data within a specified range (e.g., 1 month) corresponding to the specified time window (e.g., 1 hour) may be obtained. In one implementation, the node workload classification datastructure training request may be parsed (e.g., using PHP commands) to determine the specified range (e.g., based on the value of the node_telemetry_training_data_range field). For example, the node telemetry training data for the specified time window may be obtained via a MySQL database command similar to the following:

```
SELECT *
FROM NodeTelemetry
WHERE timeWindowSize = "1 hour" AND
    timestampOfSampling BETWEEN 'date 1 month ago' AND 'current date'.
```

A determination may be made at 1309 whether there remain training records to label. In one implementation, each of the training records included in the node telemetry training data may be labeled. If there remain training records to label, the next training record may be selected for labeling at 1313.

Available node workload classification label types may be determined at 1317. In one embodiment, training records may be labeled based on the overall workload footprint (e.g., small, medium, large). In another embodiment, training records may be multi-labeled based on the workload footprints of different components (e.g., CPU-small, CPU-medium, CPU-large for CPU usage workload footprint; RAM-small, RAM-medium, RAM-large for RAM usage workload footprint; IO-small, IO-medium, IO-large for IO usage workload footprint; Network-small, Network-medium, Network-large for network usage workload footprint). In another embodiment, training records may be (multi-)labeled to indicate heavily utilized components (e.g., CPU-HOT, RAM-HOT, IO-HOT, Network-HOT). In one implementation, the node workload classification datastructure training request may be parsed (e.g., using PHP commands) to determine the available node workload classification label types (e.g., based on the value of the node_workload_classification_label_types field). In another implementation, the available node workload classification label types may be specified via a configuration setting.

The selected training record may be labeled to represent its node workload classification at 1321. In one embodiment, the selected training record may be labeled in accordance with the available node workload classification label types. In one implementation, the selected training record may be labeled based on specified usage thresholds (e.g., 0%-30% average CPU usage=CPU-small, 31%-70% average CPU usage=CPU-medium, 71%-100% average CPU usage=CPU-large). In another implementation, the selected training record may be labeled by an expert. For example, the selected training record may be updated to store its node workload classification label.

The training records may be split into training and testing subsets at 1325. In one embodiment, the training subset may be utilized to train the NWCD and the testing subset may be used to evaluate the NWCD's performance. In one implementation, the training records may be split (e.g., randomly) into training and testing subsets based on a specified ratio (e.g., 80% of the training records are used as the training subset and 20% of the training records are used as the testing subset).

The node workload classification datastructure may be trained using the training subset at 1329. In one embodiment, a machine learning method may be utilized to train the node workload classification datastructure. For example, the machine learning method may be logistic regression, k-nearest neighbors, random forest, neural network, and/or the like. In one implementation, the node workload classification datastructure training request may be parsed (e.g., using PHP commands) to determine the machine learning method to utilize (e.g., based on the value of the machine_learning_method field). In another implementation, the machine learning method to utilize may be specified via a configuration setting. In one embodiment, workload info metric values and node workload classification label associated with each training record in the training subset may be used as training examples by the machine learning method to train the NWCD.

The trained node workload classification datastructure may be tested using the testing subset at 1333. In one embodiment, the trained NWCD may be used to label each training record in the testing subset, and the resulting label may be compared to the original label associated with the respective training record to evaluate the NWCD's performance. In one implementation, the NWCD's performance may be expressed as the percentage of training records in the testing subset that were labeled correctly by the NWCD.

A determination may be made at 1337 whether the NWCD's performance is acceptable. In one embodiment, the NWCD's performance may be deemed acceptable if it meets or exceeds a threshold acceptable performance metric (e.g., 90% accuracy). In one implementation, the node workload classification datastructure training request may be parsed (e.g., using PHP commands) to determine the threshold acceptable performance metric (e.g., based on the value of the acceptable_performance_metric field). In another implementation, the threshold acceptable performance metric may be specified via a configuration setting.

If the NWCD's performance is not acceptable (e.g., below the threshold acceptable performance metric), the training parameters may be tuned at 1341 and the NWCD may be retrained. For example, node telemetry time window, node telemetry training data range, node workload classification label types, machine learning method, and/or the like may be adjusted.

If the NWCD's performance is acceptable, the trained node workload classification datastructure may be stored at 1345. In one implementation, the NWCD may be stored via an NWCD store request.

Figure 14A:
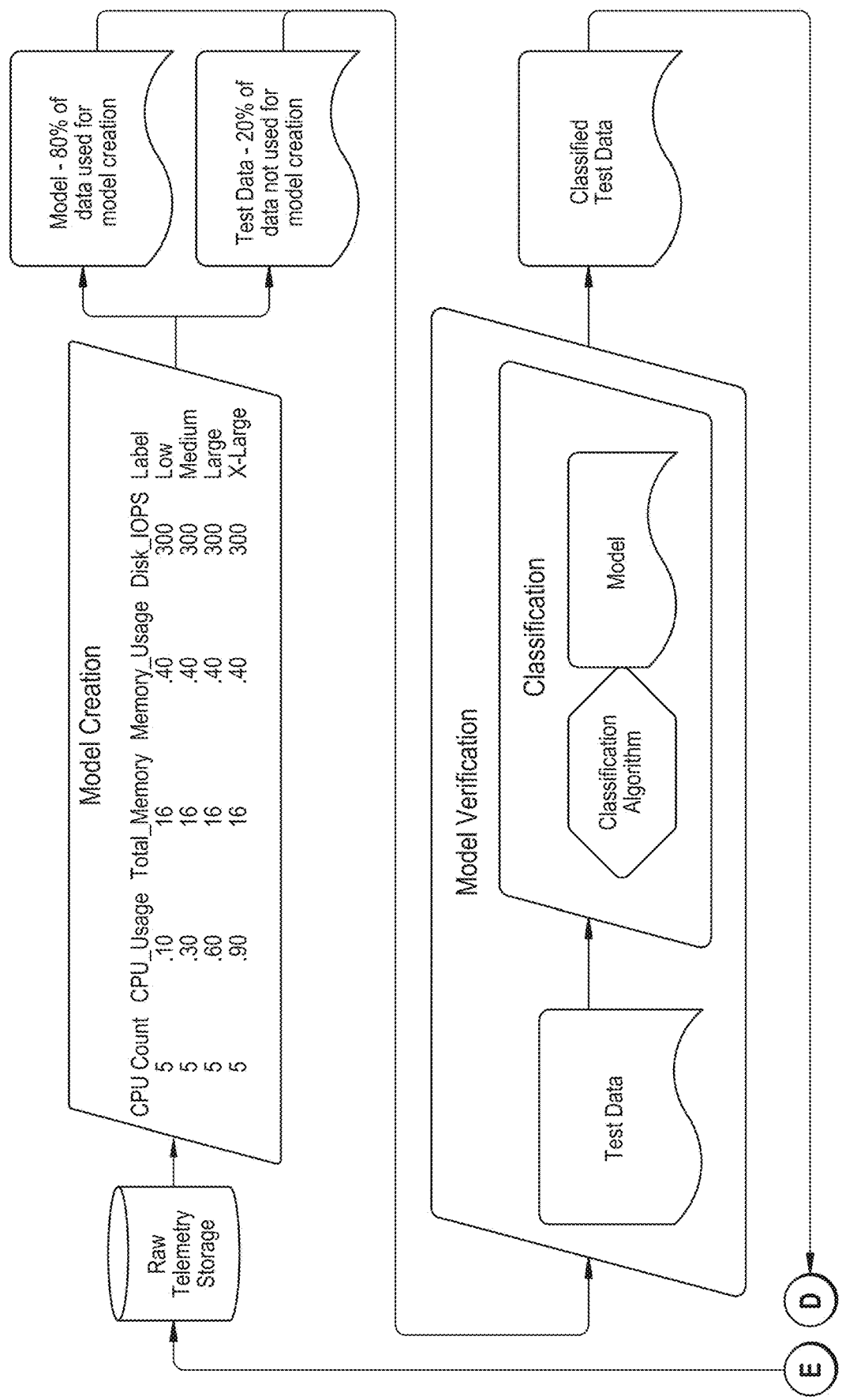
FIGS. 14A-14B show implementation case(s) for the MLLB.
Figure 14B:
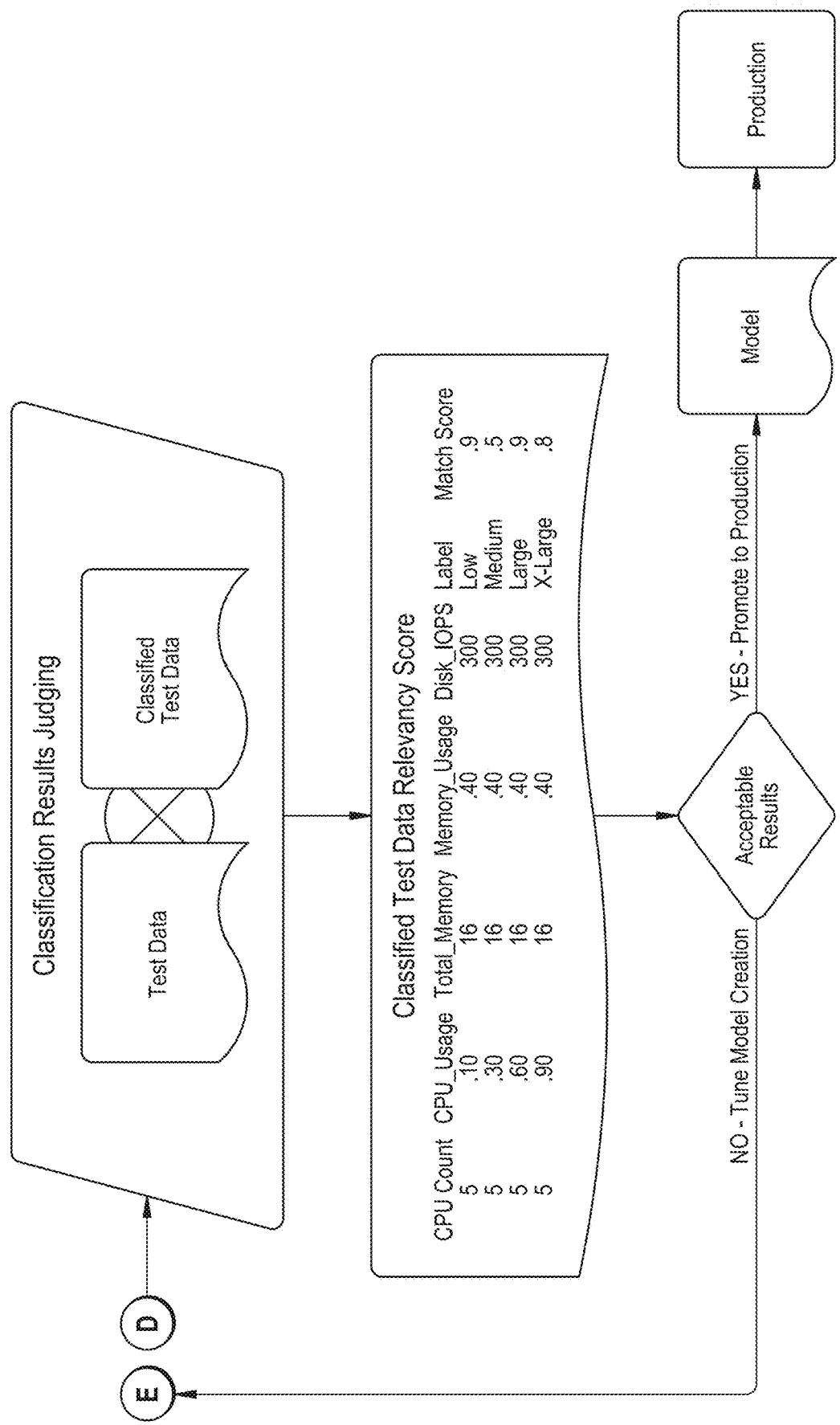

FIG. 14 shows implementation case(s) for the MLLB. In FIG. 14, an exemplary supervised training workflow for generating a node workload classification datastructure is illustrated. In one implementation, unlabeled feature records are obtained from the raw captured workload telemetry repository. The obtained records are labeled accordingly to represent their workload classification (e.g., small, medium, large).

In one implementation, 80% of newly labeled records are provided to model creation process and a normalized model is produced. The 20% of data not provided to model creation is processed by the classification algorithm in conjunction with the normalized model.

In one implementation, the output of the classification algorithm is compared with the original labeling of the processed data and the results judged. When the results are acceptable, training is complete, and the model can be promoted to production. When the results are not acceptable, tuning of the model creation process is performed until desired results are achieved.

FIG. 15 shows a datagraph illustrating data flow(s) for the MLLB. In FIG. 15, a client 1502 (e.g., of a user) may send an asset workload classification request 1521 to an asset workload classification server 1506 to facilitate labeling an asset workload associated with an asset with asset workload classification label(s). For example, the client may be a desktop, a laptop, a tablet, a smartphone, a smartwatch, and/or the like that is executing a client application. In one implementation, the asset workload classification request may include data such as a request identifier, an asset identifier, an AWCD identifier, an asset telemetry time window, an asset telemetry data range, and/or the like. In one embodiment, the client may provide the following example asset workload classification request, substantially in the form of a HTTP(S) POST message including XML-formatted data, as provided below:

```
POST /asset_workload_classification_request.php HTTP/1.1
Host: www.server.com
Content-Type: Application/XML
Content-Length: 667
<?XML version = "1.0" encoding = "UTF-8"?>
<asset_workload_classification_request>
    <request_identifier>ID_request_41</request_identifier>
    <asset_identifier>ID_asset_1</asset_identifier>
    <AWCD_identifier>ID_AWCD_1</AWCD_identifier>
```

-continued

```
    <asset_telemetry_time_window>1 hour</asset_telemetry_time_window>
    <asset_telemetry_data_range>last 1 hour</asset_telemetry_data_range>
</asset_workload_classification_request>
```

The asset workload classification server 1506 may send an asset workload classification datastructure (AWCD) retrieve request 1525 to a repository 1510 to retrieve an AWCD utilized for labeling the asset workload associated with the asset. In one implementation, the AWCD retrieve request may include data such as a request identifier, an AWCD identifier, an asset telemetry time window, and/or the like. In one embodiment, the asset workload classification server may provide the following example AWCD retrieve request, substantially in the form of a HTTP(S) POST message including XML-formatted data, as provided below:

```
POST /AWCD_retrieve_request.php HTTP/1.1
Host: www.server.com
Content-Type: Application/XML
Content-Length: 667
<?XML version = "1.0" encoding = "UTF-8"?>
<AWCD_retrieve_request>
    <request_identifier>ID_request_42</request_identifier>
    <AWCD_identifier>ID_AWCD_1</AWCD_identifier>
</AWCD_retrieve_request>
```

The repository 1510 may send an AWCD retrieve response 1529 to the asset workload classification server 1506 with the requested AWCD. In one implementation, the AWCD retrieve response may include data such as a response identifier, the requested AWCD, and/or the like. In one embodiment, the repository may provide the following example AWCD retrieve response, substantially in the form of a HTTP(S) POST message including XML-formatted data, as provided below:

```
POST /AWCD_retrieve_response.php HTTP/1.1
Host: www.server.com
Content-Type: Application/XML
Content-Length: 667
<?XML version = "1.0" encoding = "UTF-8"?>
<AWCD_retrieve_response>
    <response_identifier>ID_response_42</response_identifier>
    <AWCD_parameters>modeL parameters defining the AWCD</AWCD_parameters>
</AWCD_retrieve_response>
```

The asset workload classification server 1506 may send an asset telemetry data retrieve request 1533 to the repository 1510 to retrieve specified asset telemetry data associated with the asset. In one implementation, the asset telemetry data retrieve request may include data such as a request identifier, an asset identifier, an asset telemetry time window, an asset telemetry data range, and/or the like. In one embodiment, the asset workload classification server may provide the following example asset telemetry data retrieve request, substantially in the form of a HTTP(S) POST message including XML-formatted data, as provided below:

```
POST /asset_telemetry_data_retrieve_request.php HTTP/1.1
Host: www.server.com
Content-Type: Application/XML
Content-Length: 667
<?XML version = "1.0" encoding = "UTF-8"?>
<asset_telemetry_data_retrieve_request>
    <request_identifier>ID_request_43</request_identifier>
    <asset_identifier>ID_asset_1</asset_identifier>
    <asset_telemetry_time_window>1 hour</asset_telemetry_time_window>
    <asset_telemetry_data_range>last 1 hour</asset_telemetry_data_range>
</asset_telemetry_data_retrieve_request>
```

The repository 1510 may send an asset telemetry data retrieve response 1537 to the asset workload classification server 1506 with the requested asset telemetry data. In one implementation, the asset telemetry data retrieve response may include data such as a response identifier, the requested asset telemetry data, and/or the like. In one embodiment, the repository may provide the following example asset telemetry data retrieve response, substantially in the form of a HTTP(S) POST message including XML-formatted data, as provided below:

```
POST /asset_telemetry_data_retrieve_response.php HTTP/1.1
Host: www.server.com
Content-Type: Application/XML
Content-Length: 667
<?XML version = "1.0" encoding = "UTF-8"?>
<asset_telemetry_data_retrieve_response>
    <response_identifier>ID_response_43</response_identifier>
    <asset_telemetry_data>
        <asset_identifier>ID_asset_1</asset_identifier>
        <CPU>28%</CPU>
        <RAM>43%</RAM>
        <IO>330 IOPS/IO
        Network Mbps/Network
        <time_window_size>1 hour</time_window_size>
        <time_window_timestamp>2021-11-11, hour 11</time_window_timestamp>
    </asset_telemetry_data>
</asset_telemetry_data_retrieve_response>
```

An asset workload classification (AWCL) component 1541 may utilize the retrieved asset telemetry data as input to the retrieved AWCD to label the asset workload associated with the asset with asset workload classification label(s). See FIG. 16 for additional details regarding the AWCL component.

The asset workload classification server 1506 may send an asset workload classification store request 1545 to the repository 1510 to store the determined asset workload classification label(s) for the asset. In one implementation, the asset workload classification store request may include data such as a request identifier, an asset identifier, an asset telemetry time window, asset workload classification label(s), a timestamp, a snapshot identifier, and/or the like. In one embodiment, the asset workload classification server may provide the following example asset workload classification store request, substantially in the form of a HTTP(S) POST message including XML-formatted data, as provided below:

```
POST /asset_workload_classification_store_request.php HTTP/1.1
Host: www.server.com
Content-Type: Application/XML
Content-Length: 667
<?XML version = "1.0" encoding = "UTF-8"?>
<asset_workload_classification_store_request>
    <request_identifier>ID_request_44</request_identifier>
    <asset_identifier>ID_asset_1</asset_identifier>
    <asset_telemetry_time_window>1 hour</asset_telemetry_time_window>
    <asset_workload_classification_labels>
       CPU-small, RAM-medium, 10-small, Network-large
    </asset_workload_classification_labels>
    <timestamp>2021-11-12 00:01:01</timestamp>
    <snapshot_identifier>ID_snapshot_1</snapshot_identifier>
</asset_workload_classification_store_request>
```

The repository 1510 may send an asset workload classification store response 1549 to the asset workload classification server 1506 to confirm that the determined asset workload classification for the asset was stored successfully. In one implementation, the asset workload classification store response may include data such as a response identifier, a status, and/or the like. In one embodiment, the repository may provide the following example asset workload classification store response, substantially in the form of a HTTP(S) POST message including XML-formatted data, as provided below:

```
POST /asset_workload_classification_store_response.php HTTP/1.1
Host: www.server.com
Content-Type: Application/XML
Content-Length: 667
<?XML version = "1.0" encoding = "UTF-8"?>
<asset_workload_classification_store_response>
    <response_identifier>ID_response_44</response_identifier>
    <status>OK</status>
</asset_workload_classification_store_response>
```

The asset workload classification server 1506 may send an asset workload classification response 1553 to the client 1502 to inform the user that the asset workload for the asset was classified successfully. In one implementation, the asset workload classification response may include data such as a response identifier, a status, and/or the like. In one embodiment, the asset workload classification server may provide the following example asset workload classification response, substantially in the form of a HTTP(S) POST message including XML-formatted data, as provided below:

```
POST/asset_workload_classification_response.php HTTP/1.1
Host: www.server.com
Content-Type: Application/XML
Content-Length: 667
<?XML version = "1.0" encoding = "UTF-8"?>
<asset_workload_classification_response>
    <response_identifier>ID_response_41</response_identifier>
    <status>OK</status>
</asset_workload_classification_response>
```

FIG. 16 shows a logic flow illustrating embodiments of an asset workload classification (AWCL) component for the MLLB. In FIG. 16, an asset workload classification request may be obtained at 1601. For example, the asset workload classification request may be obtained as a result of a user request to label an asset workload associated with an asset with asset workload classification label(s).

An asset telemetry time window to utilize may be determined at 1605. For example, the asset telemetry time window may be 1 hour, 1 day, 1 week, business hours, off business hours, and/or the like. In one implementation, the asset workload classification request may be parsed (e.g., using PHP commands) to determine the asset telemetry time window to utilize (e.g., based on the value of the asset_telemetry_time_window field). In another implementation, the asset telemetry time window to utilize may be specified via a configuration setting.

A determination may be made at 1609 whether an asset workload classification datastructure (AWCD) for the asset telemetry time window is available. In one embodiment, different AWCDs may be utilized for different asset telemetry time windows. In another embodiment, a general AWCD may be utilized for any asset telemetry time window.

If an AWCD specific to the asset telemetry time window is available, the AWCD for the asset telemetry time window may be obtained at 1613. In various implementations, the AWCD may be usable for assets of any partner, for assets of a specific partner (e.g., associated with the partner's account identifier), for a specific subset of a partner's assets (e.g., associated with a specific asset type (e.g., laptop, server)), and/or the like. For example, the asset workload classification datastructure specific to the asset telemetry time window may be obtained via a MySQL database command similar to the following:

```
SELECT AWCD_parameters
FROM AWCD
WHERE AWCD_associatedTimeWindowSize = "1 hour";
```

If an AWCD specific to the asset telemetry time window is not available, the general AWCD (e.g., the latest version) may be obtained at 1617. In various implementations, the AWCD may be usable for assets of any partner, for assets of a specific partner (e.g., associated with the partner's account identifier), for a specific subset of a partner's assets (e.g., associated with a specific asset type), and/or the like. For example, the general asset workload classification datastructure may be obtained via a MySQL database command similar to the following:

```
SELECT AWCD_parameters
FROM AWCD
WHERE AWCD_ID = ID_AWCD_1;
```

An asset identifier of the asset associated with the asset workload classification request may be determined at 1621. In one implementation, the asset workload classification request may be parsed (e.g., using PHP commands) to determine the asset identifier of the asset (e.g., based on the value of the asset_identifier field).

Asset telemetry data for the specified time window associated with the asset may be obtained at 1625. In one embodiment, asset telemetry data for a specified timestamp (e.g., last 1 hour, hour 5 from 2 days ago) corresponding to the specified time window (e.g., 1 hour) may be obtained. In another embodiment, asset telemetry data within a specified range (e.g., last 4 hours, hour 6 of the last 10 Fridays) corresponding to the specified time window (e.g., 1 hour) may be obtained. In one implementation, the asset workload classification request may be parsed (e.g., using PHP commands) to determine the specified timestamp and/or range (e.g., based on the value of the asset_telemetry_data_range field). For example, the asset telemetry data for the specified time window associated with the asset may be obtained via a MySQL database command similar to the following:

```
SELECT *
FROM AssetTelemetry
WHERE assetID = ID_asset_1 AND timeWindowSize = "1 hour" AND
    timestampOfSampling = 'Last 1 hour';
```

In some implementations, if multiple records are retrieved (e.g., 10 records may be retrieved for hour 6 of the last 10 Fridays), a normalized metric value may be calculated for each workload info metric of the asset telemetry data to generate a normalized record. For example, a normalized metric value (e.g., CPU utilization percentage) for a workload info metric (e.g., CPU utilization) may be determined by winsorizing, taking the average of, and/or the like metric values specified in the retrieved records (e.g., by taking the average of CPU utilizations specified in the 10 retrieved records).

Asset workload classification label(s) for the asset telemetry data for the specified time window associated with the asset may be determined at 1629. In one embodiment, the asset telemetry data may be labeled based on the overall workload footprint (e.g., small, medium, large). In another embodiment, the asset telemetry data may be multi-labeled based on the workload footprints of different components (e.g., CPU-small, CPU-medium, CPU-large for CPU usage workload footprint; RAM-small, RAM-medium, RAM-large for RAM usage workload footprint; IO-small, IO-medium, IO-large for IO usage workload footprint; Network-small, Network-medium, Network-large for network usage workload footprint). In another embodiment, the asset telemetry data may be (multi-)labeled to indicate heavily utilized components (e.g., CPU-HOT, RAM-HOT, IO-HOT, Network-HOT). In one implementation, the AWCD may be used to label the retrieved (e.g., normalized) asset telemetry data record. For example, the asset telemetry data record may be provided as input to the AWCD, and the AWCD may provide a set of asset workload classification labels as output.

The determined asset workload classification label(s) for the specified time window associated with the asset may be stored at 1633. In one implementation, the determined asset workload classification label(s) may be stored via an asset workload classification store request.

Figure 17:
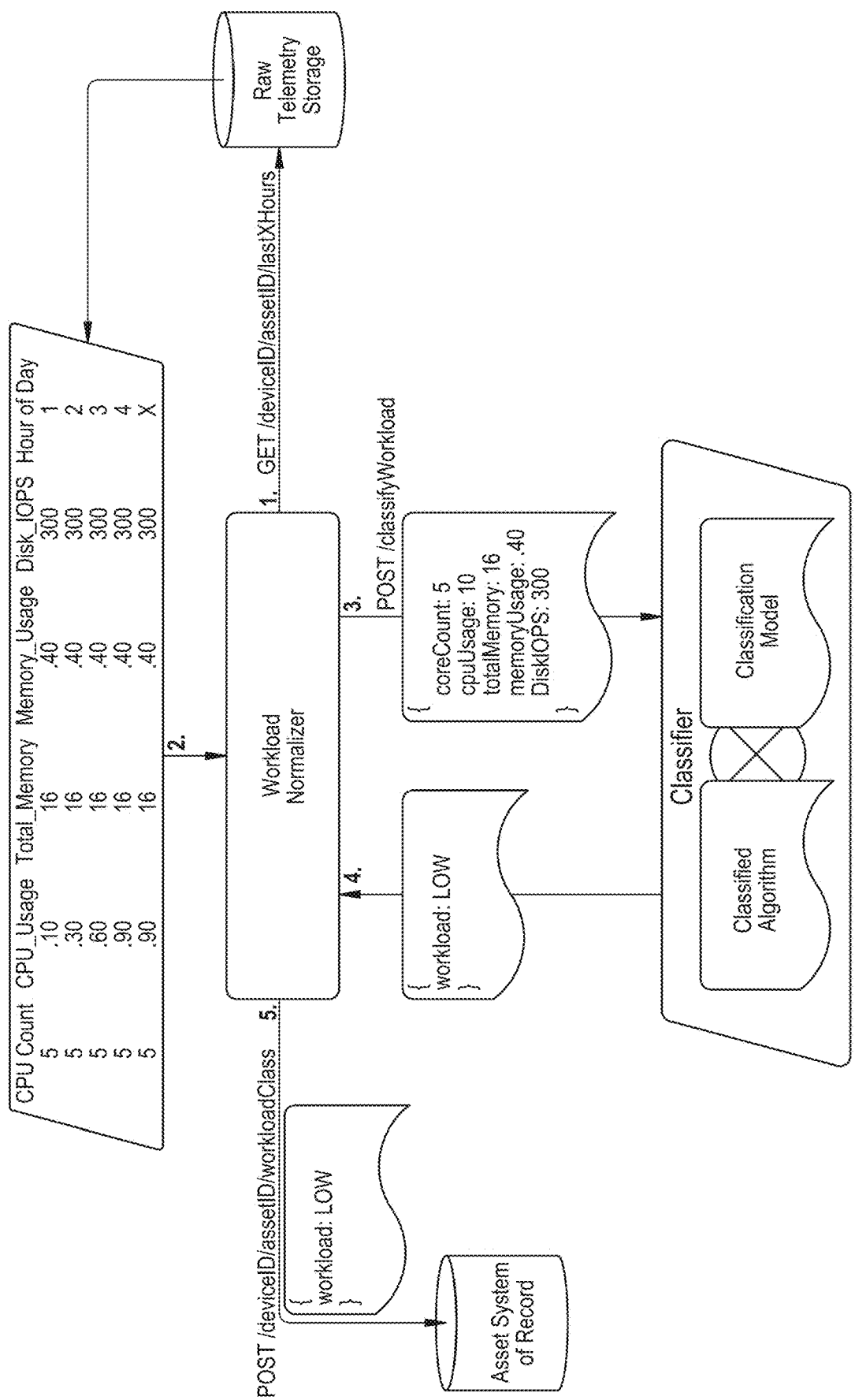
FIG. 17 shows implementation case(s) for the MLLB.

FIG. 17 shows implementation case(s) for the MLLB. In FIG. 17, an exemplary labeling of asset workload is illustrated. In one implementation, a Workload Normalizer is an async processor that obtains a set of telemetry data for an asset for a window of time (e.g., 1 hour, 1 day, etc.). This processor reduces the telemetry data to a smaller statistically relevant set of data that is then provided to the classifier. The classifier may apply the supervised model in conjunction with a ML classification algorithm against the provided telemetry data. The result of this operation is a normalized label that represents the current workload of the provided data.

In one implementation, various manipulations of the features fed into the classifier may be performed to get more discrete labels for a subset of features (e.g., Core Count and CPU Usage to determine if the asset is CPU-HOT).

In one implementation, the telemetry data may be further normalized to one feature set, augmented with one or more classification labels, and stored along with the record. This new block of data may be used during the time of virtualization for the purpose of load balancing a virtualized asset for optimal performance.

Figure 18:
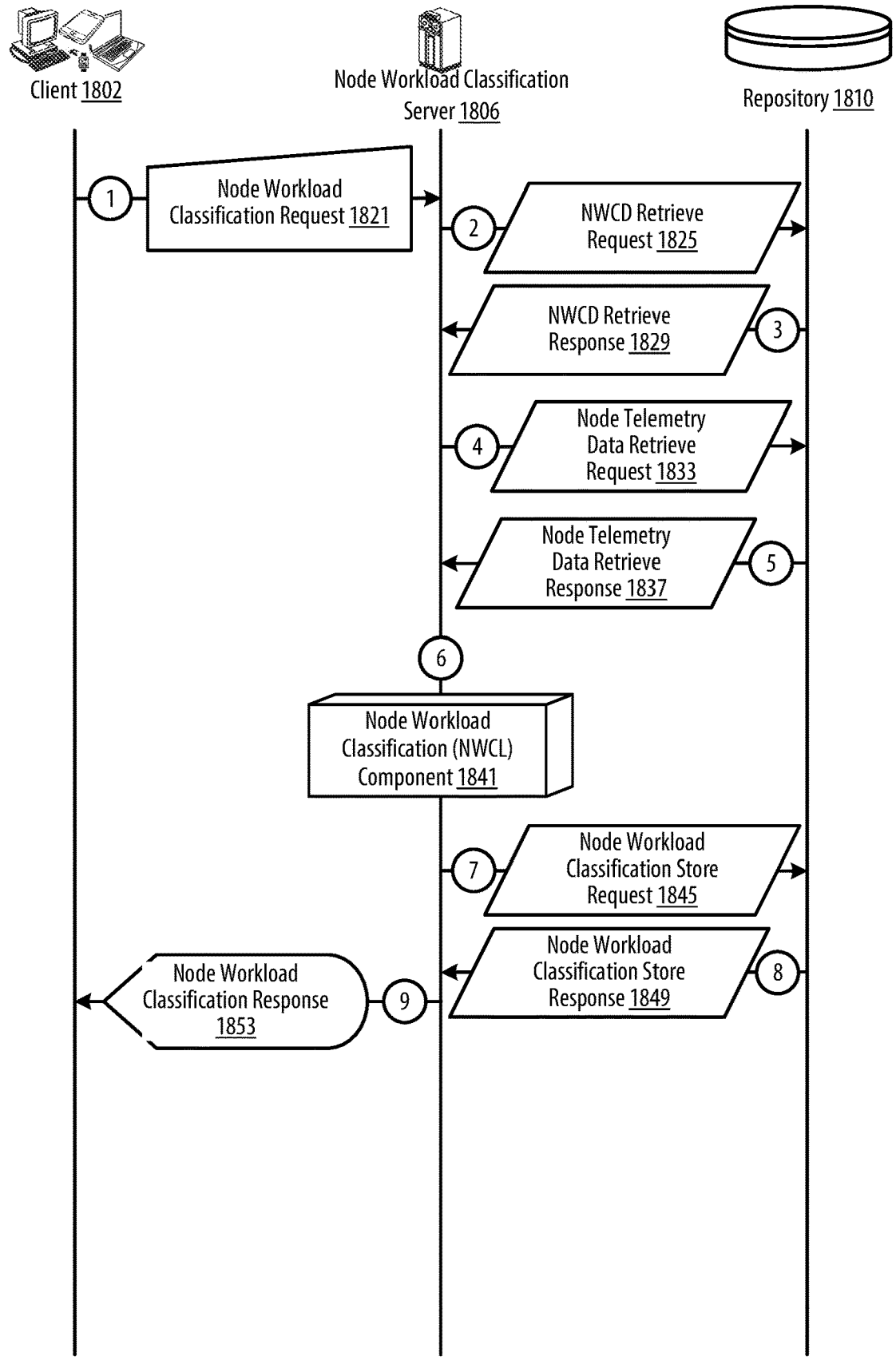
FIG. 18 shows a datagraph illustrating data flow(s) for the MLLB.

FIG. 18 shows a datagraph illustrating data flow(s) for the MLLB. In FIG. 18, a client 1802 (e.g., of a user) may send a node workload classification request 1821 to a node workload classification server 1806 to facilitate labeling a node workload associated with a node with node workload classification label(s). For example, the client may be a desktop, a laptop, a tablet, a smartphone, a smartwatch, and/or the like that is executing a client application. In one implementation, the node workload classification request may include data such as a request identifier, a node identifier, an NWCD identifier, a node telemetry time window, a node telemetry data range, and/or the like. In one embodiment, the client may provide the following example node workload classification request, substantially in the form of a HTTP(S) POST message including XML-formatted data, as provided below:

```
POST/node_workload_classification_request.php HTTP/1.1
Host: www.server.com
Content-Type: Application/XML
Content-Length: 667
<?XML version = "1.0" encoding = "UTF-8"?>
<node_workload_classification_request>
    <request_identifier>ID_request_51</request_identifier>
    <node_identifier>ID_node_1</node_identifier>
    <NWCD_identifier>ID_NWCD_1</NWCD_identifier>
    <node_telemetry_time_window>1 hour</node_telemetry_time_window>
    <node_telemetry_data_range>last 1 hour</node_telemetry_data_range>
</node_workload_classification_request>
```

The node workload classification server 1806 may send a node workload classification datastructure (NWCD) retrieve request 1825 to a repository 1810 to retrieve an NWCD utilized for labeling the node workload associated with the node. In one implementation, the NWCD retrieve request may include data such as a request identifier, an NWCD identifier, a node telemetry time window, and/or the like. In one embodiment, the node workload classification server may provide the following example NWCD retrieve request, substantially in the form of a HTTP(S) POST message including XML-formatted data, as provided below:

```
POST/NWCD_retrieve_request.php HTTP/1.1
Host: www.server.com
Content-Type: Application/XML
Content-Length: 667
<?XML version = "1.0" encoding = "UTF-8"?>
<NWCD_retrieve_request>
    <request_identifier>ID_request_52</request_identifier>
    <NWCD_identifier>ID_NWCD_1</NWCD_identifier>
</NWCD_retrieve_request>
```

The repository 1810 may send an NWCD retrieve response 1829 to the node workload classification server 1806 with the requested NWCD. In one implementation, the NWCD retrieve response may include data such as a response identifier, the requested NWCD, and/or the like. In one embodiment, the repository may provide the following example NWCD retrieve response, substantially in the form of a HTTP(S) POST message including XML-formatted data, as provided below:

```
POST/NWCD_retrieve_response.php HTTP/1.1
Host: www.server.com
Content-Type: Application/XML
Content-Length: 667
<?XML version = "1.0" encoding = "UTF-8"?>
<NWCD_retrieve_response>
    <response_identifier>ID_response_52</response_identifier>
    <NWCD_parameters>modeL parameters defining the NWCD</NWCD_parameters>
</NWCD_retrieve_response>
```

The node workload classification server 1806 may send a node telemetry data retrieve request 1833 to the repository 1810 to retrieve specified node telemetry data associated with the node. In one implementation, the node telemetry data retrieve request may include data such as a request identifier, a node identifier, a node telemetry time window, a node telemetry data range, and/or the like. In one embodiment, the node workload classification server may provide the following example node telemetry data retrieve request, substantially in the form of a HTTP(S) POST message including XML-formatted data, as provided below:

```
POST/node_telemetry_data_retrieve_request.php HTTP/1.1
Host: www.server.com
Content-Type: Application/XML
Content-Length: 667
<?XML version = "1.0" encoding = "UTF-8"?>
<node_telemetry_data_retrieve_request>
    <request_identifier>ID_request_53</request_identifier>
    <node_identifier>ID_node_1</node_identifier>
    <node_telemetry_time_window>1 hour</node_telemetry_time_window>
    <node_telemetry_data_range>last 1 hour</node_telemetry_data_range>
</node_telemetry_data_retrieve_request>
```

The repository 1810 may send a node telemetry data retrieve response 1837 to the node workload classification server 1806 with the requested node telemetry data. In one implementation, the node telemetry data retrieve response may include data such as a response identifier, the requested node telemetry data, and/or the like. In one embodiment, the repository may provide the following example node telemetry data retrieve response, substantially in the form of a HTTP(S) POST message including XML-formatted data, as provided below:

```
POST/node_telemetry_data_retrieve_response.php HTTP/1.1
Host: www.server.com
Content-Type: Application/XML
Content-Length: 667
<?XML version = "1.0" encoding = "UTF-8"?>
<node_telemetry_data_retrieve_response>
```

```
<response_identifier>ID_response_53</response_identifier>
<node_telemetry_data>
   <node_identifier>ID_node_1</node_identifier>
   <CPU>28%</CPU>
   <RAM>43%</RAM>
   <IO>330 IOPS/IO>
   <Network>52 Mbps</Network>
   <time_window_size>1 hour</time_window_size>
   <time_window_timestamp>2021-11-11, hour 11</time_window_timestamp>
</node_telemetry_data>
</node_telemetry_data_retrieve_response>
```

A node workload classification (NWCL) component 1841 may utilize the retrieved node telemetry data as input to the retrieved NWCD to label the node workload associated with the node with node workload classification label(s). See FIG. 19 for additional details regarding the NWCL component.

The node workload classification server 1806 may send a node workload classification store request 1845 to the repository 1810 to store the determined node workload classification label(s) for the node. In one implementation, the node workload classification store request may include data such as a request identifier, a node identifier, a node telemetry time window, node workload classification label(s), a timestamp, and/or the like. In one embodiment, the node workload classification server may provide the following example node workload classification store request, substantially in the form of a HTTP(S) POST message including XML-formatted data, as provided below:

```
POST/node_workload_classification_store_request.php HTTP/1.1
Host: www.server.com
Content-Type: Application/XML
Content-Length: 667
<?XML version = "1.0" encoding = "UTF-8"?>
<node_workload_classification_store_request>
   <request_identifier>ID_request_54</request_identifier>
   <node_identifier>ID_node_1</node_identifier>
   <node_telemetry_time_window>1 hour</node_telemetry_time_window>
   <node_workload_classification_labels>
      Network-HOT
   </node_workload_classification_labels>
   <timestamp>2021-11-12 00:01:01</timestamp>
</node_workload_classification_store_request>
```

The repository 1810 may send a node workload classification store response 1849 to the node workload classification server 1806 to confirm that the determined node workload classification for the node was stored successfully. In one implementation, the node workload classification store response may include data such as a response identifier, a status, and/or the like. In one embodiment, the repository may provide the following example node workload classification store response, substantially in the form of a HTTP(S) POST message including XML-formatted data, as provided below:

```
POST/node_workload_classification_store_response.php HTTP/1.1
Host: www.server.com
Content-Type: Application/XML
Content-Length: 667
<?XML version = "1.0" encoding = "UTF-8"?>
<node_workload_classification_store_response>
   <response_identifier>ID_response_54</response_identifier>
   <status>OK</status>
</node_workload_classification_store_response>
```

The node workload classification server 1806 may send a node workload classification response 1853 to the client 1802 to inform the user that the node workload for the node was classified successfully. In one implementation, the node workload classification response may include data such as a response identifier, a status, and/or the like. In one embodiment, the node workload classification server may provide the following example node workload classification response, substantially in the form of a HTTP(S) POST message including XML-formatted data, as provided below:

```
POST/node_workload_classification_response.php HTTP/1.1
Host: www.server.com
Content-Type: Application/XML
Content-Length: 667
<?XML version = "1.0" encoding = "UTF-8"?>
<node_workload_classification_response>
```

```
<response_identifier>ID_response_51</response_identifier>
<status>OK</status>
</node_workload_classification_response>
```

Figure 19:
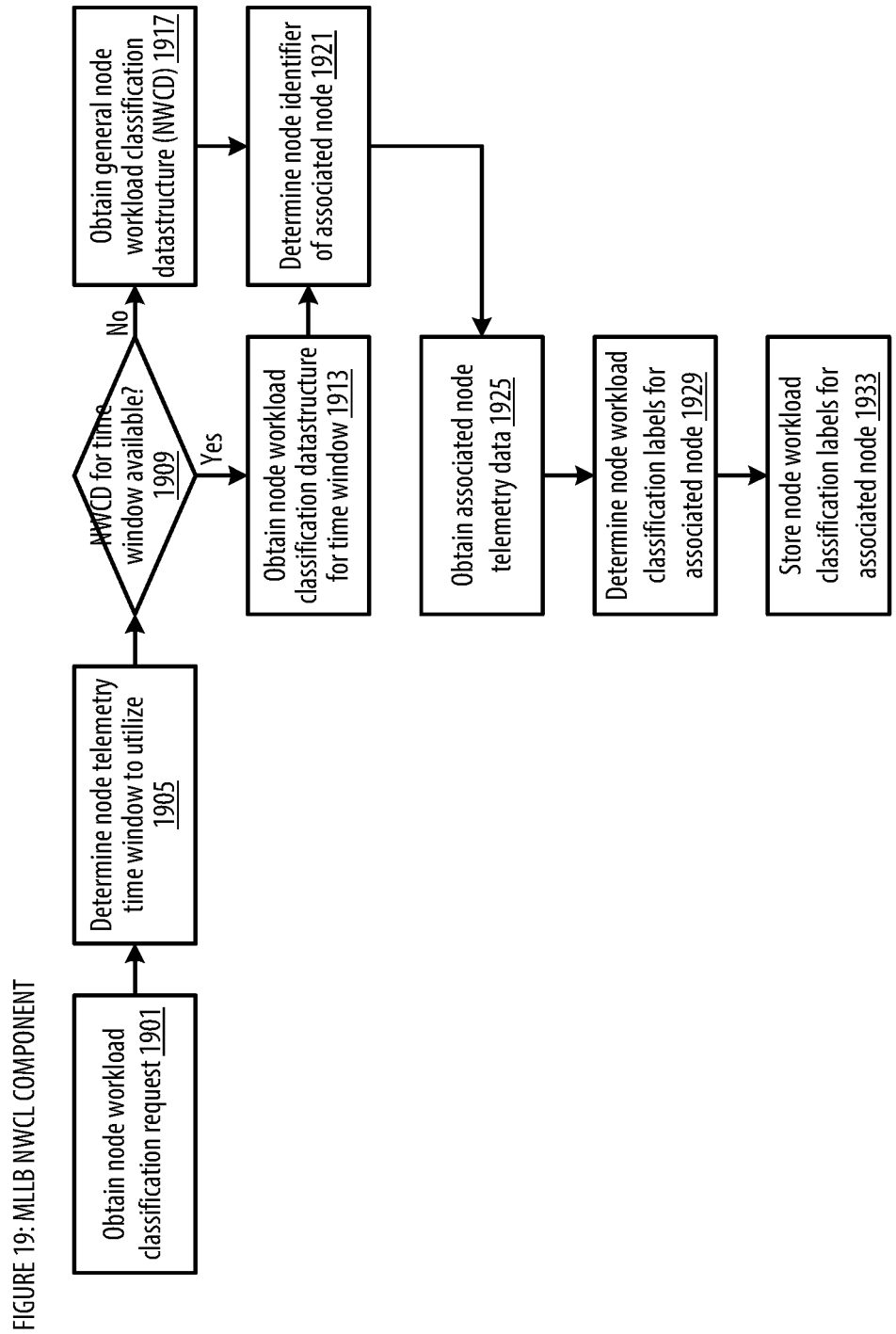
FIG. 19 shows a logic flow illustrating embodiments of a node workload classification (NWCL) component for the MLLB.

FIG. 19 shows a logic flow illustrating embodiments of a node workload classification (NWCL) component for the MLLB. In FIG. 19, a node workload classification request may be obtained at 1901. For example, the node workload classification request may be obtained as a result of a user request to label a node workload associated with a node with node workload classification label(s).

A node telemetry time window to utilize may be determined at 1905. For example, the node telemetry time window may be 1 hour, 1 day, 1 week, business hours, off business hours, and/or the like. In one implementation, the node workload classification request may be parsed (e.g., using PHP commands) to determine the node telemetry time window to utilize (e.g., based on the value of the node_telemetry_time_window field). In another implementation, the node telemetry time window to utilize may be specified via a configuration setting.

A determination may be made at 1909 whether a node workload classification datastructure (NWCD) for the node telemetry time window is available. In one embodiment, different NWCDs may be utilized for different node telemetry time windows. In another embodiment, a general NWCD may be utilized for any node telemetry time window.

If an NWCD specific to the node telemetry time window is available, the NWCD for the node telemetry time window may be obtained at 1913. In various implementations, the NWCD may be usable for any compute nodes, for a specific subset of a compute nodes (e.g., associated with a specific node type (e.g., Windows server, Linux server)), and/or the like. For example, the node workload classification datastructure specific to the node telemetry time window may be obtained via a MySQL database command similar to the following:

```
SELECT NWCD_parameters
FROM NWCD
WHERE NWCD_associatedTimeWindowSize = "1 hour";
```

If an NWCD specific to the node telemetry time window is not available, the general NWCD (e.g., the latest version) may be obtained at 1917. In various implementations, the NWCD may be usable for any compute nodes, for a specific subset of a compute nodes (e.g., associated with a specific node type), and/or the like. For example, the general node workload classification datastructure may be obtained via a MySQL database command similar to the following:

```
SELECT NWCD_parameters
FROM NWCD
WHERE NWCD_ID = ID_NWCD_1;
```

A node identifier of the node associated with the node workload classification request may be determined at 1921. In one implementation, the node workload classification request may be parsed (e.g., using PHP commands) to determine the node identifier of the node (e.g., based on the value of the node_identifier field).

Node telemetry data for the specified time window associated with the node may be obtained at 1925. In one embodiment, node telemetry data for a specified timestamp (e.g., last 1 hour, hour 5 from 2 days ago) corresponding to the specified time window (e.g., 1 hour) may be obtained. In another embodiment, node telemetry data within a specified range (e.g., last 4 hours, hour 6 of the last 10 Fridays) corresponding to the specified time window (e.g., 1 hour) may be obtained. In one implementation, the node workload classification request may be parsed (e.g., using PHP commands) to determine the specified timestamp and/or range (e.g., based on the value of the node_telemetry_data_range field). For example, the node telemetry data for the specified time window associated with the node may be obtained via a MySQL database command similar to the following:

```
SELECT *
FROM NodeTelemetry
WHERE nodeID = ID_node_1 AND timeWindowSize = "1 hour" AND
    timestampOfSampling = 'Last 1 hour';
```

In some implementations, if multiple records are retrieved (e.g., 10 records may be retrieved for hour 6 of the last 10 Fridays), a normalized metric value may be calculated for each workload info metric of the node telemetry data to generate a normalized record. For example, a normalized metric value (e.g., CPU utilization percentage) for a workload info metric (e.g., CPU utilization) may be determined by winsorizing, taking the average of, and/or the like metric values specified in the retrieved records (e.g., by taking the average of CPU utilizations specified in the 10 retrieved records).

Node workload classification label(s) for the node telemetry data for the specified time window associated with the node may be determined at 1929. In one embodiment, the node telemetry data may be labeled based on the overall workload footprint (e.g., small, medium, large). In another embodiment, the node telemetry data may be multi-labeled based on the workload footprints of different components (e.g., CPU-small, CPU-medium, CPU-large for CPU usage workload footprint; RAM-small, RAM-medium, RAM-large for RAM usage workload footprint; IO-small, IO-medium, IO-large for IO usage workload footprint; Network-small, Network-medium, Network-large for network usage workload footprint). In another embodiment, the node telemetry data may be (multi-)labeled to indicate heavily utilized components (e.g., CPU-HOT, RAM-HOT, IO-HOT, Network-HOT). In one implementation, the NWCD may be used to label the retrieved (e.g., normalized) node telemetry data record. For example, the node telemetry data record may be provided as input to the NWCD, and the NWCD may provide a set of node workload classification labels as output.

The determined node workload classification label(s) for the specified time window associated with the node may be stored at 1933. In one implementation, the determined node workload classification label(s) may be stored via a node workload classification store request.

Figure 20:
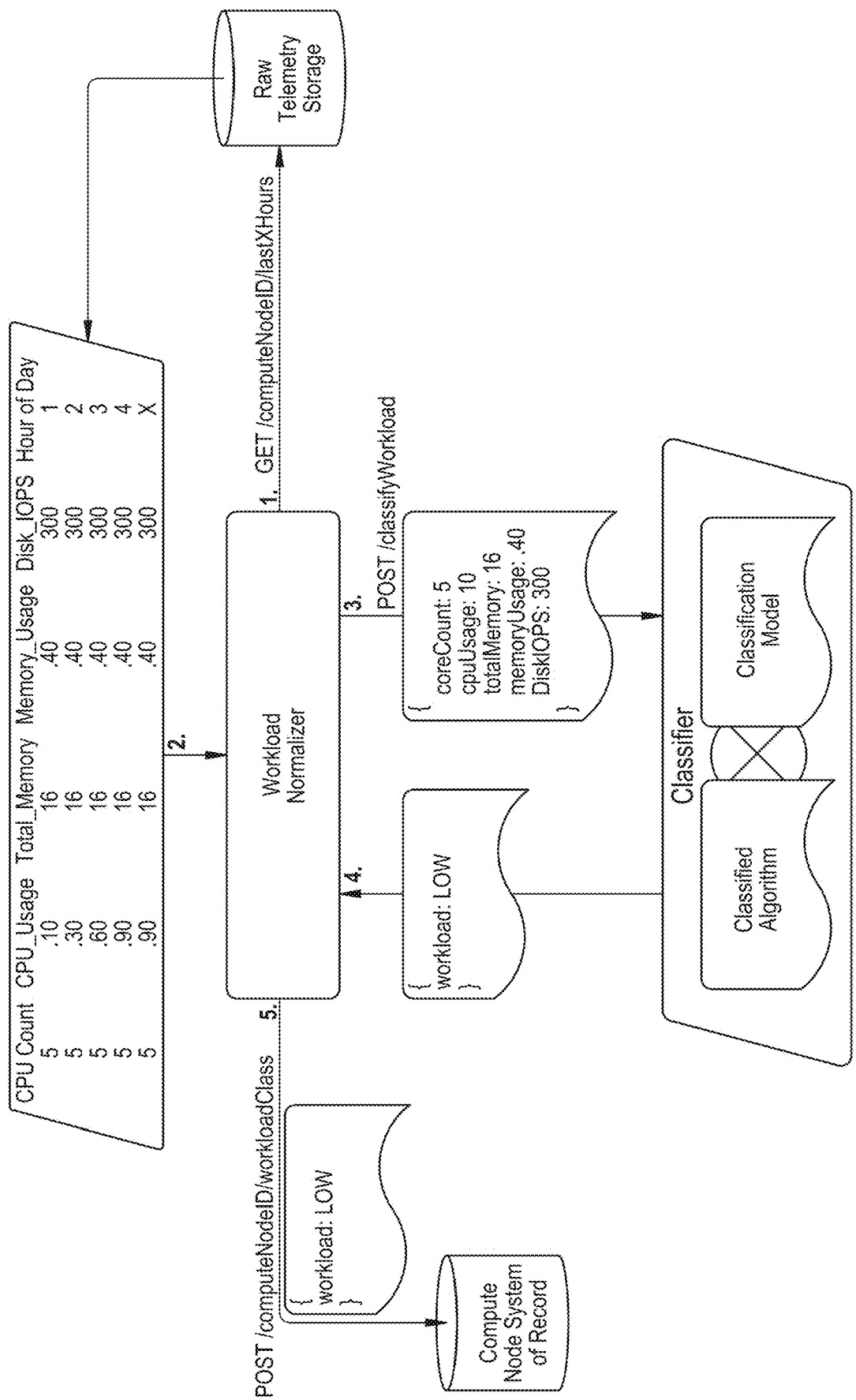
FIG. 20 shows implementation case(s) for the MLLB.

FIG. 20 shows implementation case(s) for the MLLB. In FIG. 20, an exemplary labeling of compute node workload is illustrated. In one implementation, a Workload Normalizer is an async processor that obtains a set of telemetry data for a node for a window of time (e.g., 1 hour, 1 day, etc.). This processor reduces the telemetry data to a smaller statistically relevant set of data that is then provided to the classifier. The classifier may apply the supervised model in conjunction with a ML classification algorithm against the provided telemetry data. The result of this operation is a normalized label that represents the current workload of the provided data.

In one implementation, various manipulations of the features fed into the classifier may be performed to get more discrete labels for a subset of features (e.g., Core Count and CPU Usage to determine if the compute node is CPU-HOT).

In one implementation, the telemetry data may be further normalized to one feature set, augmented with one or more classification labels, and stored along with the record. This new block of data may be used during the time of virtualization for the purpose of load balancing virtualized assets instantiated on the node for optimal performance.

Figure 21:
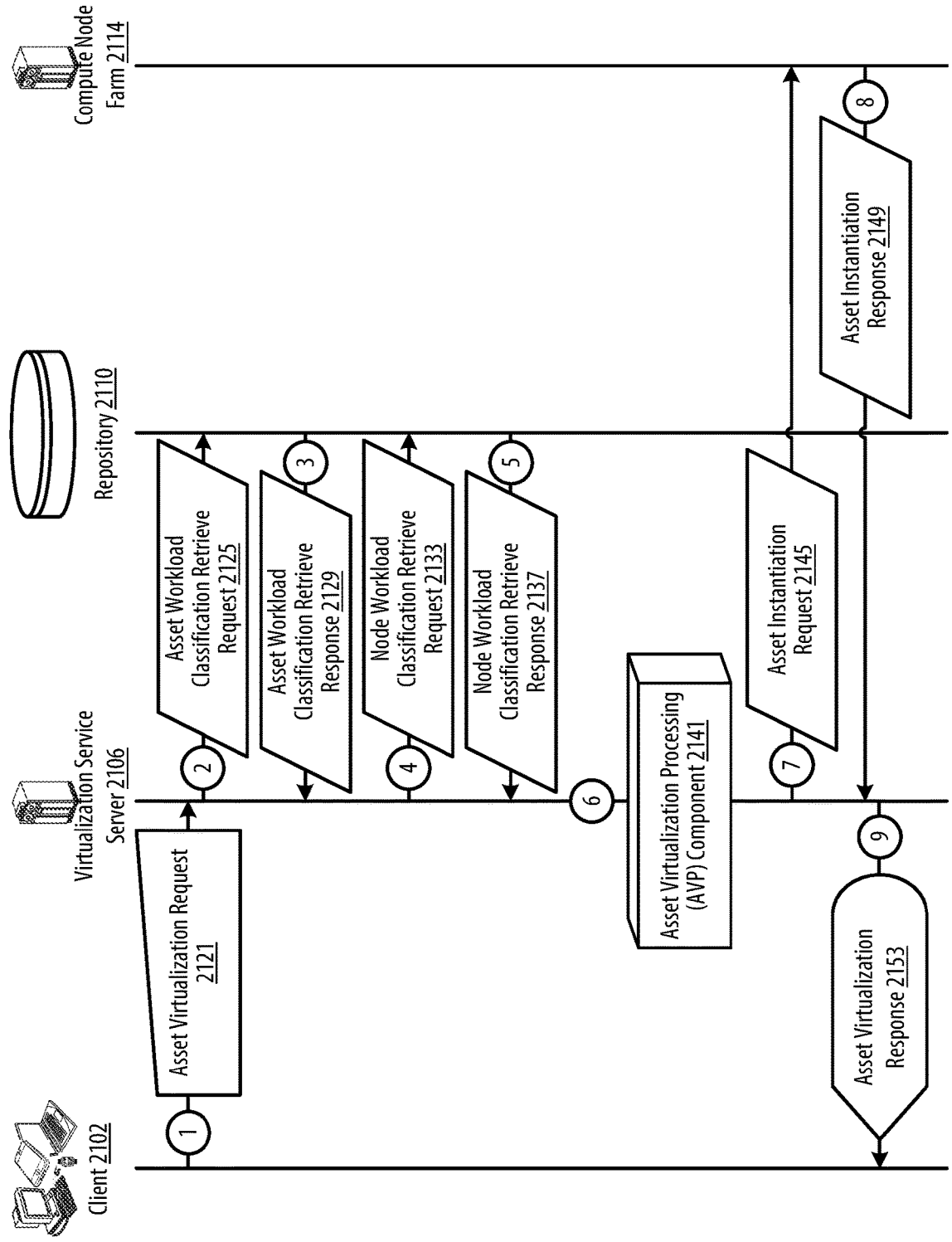
FIG. 21 shows a datagraph illustrating data flow(s) for the MLLB.

FIG. 21 shows a datagraph illustrating data flow(s) for the MLLB. In FIG. 21, a client 2102 (e.g., of a user) may send an asset virtualization request 2121 to a virtualization service server 2106 to facilitate virtualizing an asset on a compute node. For example, the client may be a desktop, a laptop, a tablet, a smartphone, a smartwatch, and/or the like that is executing a client application. In one implementation, the asset virtualization request may include data such as a request identifier, an asset identifier, a snapshot identifier, a virtualization definition, and/or the like. In one embodiment, the client may provide the following example asset virtualization request, substantially in the form of a HTTP(S) POST message including XML-formatted data, as provided below:

```
POST /asset_virtualization_request.php HTTP/1.1
Host: www.server.com
Content-Type: Application/XML
Content-Length: 667
<?XML version = "1.0" encoding = "UTF-8"?>
<asset_virtualization_request>
   <request_identifier>ID_request_61</request_identifier>
   <asset_identifier>ID_asset_1</asset_identifier>
   <snapshot_identifier>ID_snapshot_1</snapshot_identifier>
   <virtualization_definition>
      <CPU_Cores>4</CPU_Cores>
      <RAM>16GB</RAM>
      <IO>400 IOPS</IO>
      <Network_Capacity>100 Mbs</Network_Capacity>
      <workload_timeframe>business hours</workload_timeframe>
   </virtualization_definition>
</asset_virtualization_request>
```

The virtualization service server 2106 may send an asset workload classification retrieve request 2125 to a repository 2110 to retrieve asset workload classification label(s) for an asset (e.g., the asset to be virtualized, other assets whose guest virtual machines are already running on a candidate node). In one implementation, the asset workload classification retrieve request may include data such as a request identifier, an asset identifier, a snapshot identifier, a time window, a timestamp, and/or the like. In one embodiment, the virtualization service server may provide the following example asset workload classification retrieve request, substantially in the form of a HTTP(S) POST message including XML-formatted data, as provided below:

```
POST /asset_workload_classification_retrieve_request.php HTTP/1.1
Host: www.server.com
Content-Type: Application/XML
Content-Length: 667
<?XML version = "1.0" encoding = "UTF-8"?>
<asset_workload_classification_retrieve_request>
   <request_identifier>ID_request_62</request_identifier>
   <asset_identifier>ID_asset_1</asset_identifier>
   <snapshot_identifier>ID_snapshot_1</snapshot_identifier>
   <time_window>business hours</time_window>
</asset_workload_classification_retrieve_request>
```

The repository 2110 may send an asset workload classification retrieve response 2129 to the virtualization service server 2106 with the requested asset workload classification label(s) for the asset. In one implementation, the asset workload classification retrieve response may include data such as a response identifier, the requested asset workload classification label(s) for the asset, and/or the like. In one embodiment, the repository may provide the following example asset workload classification retrieve response, substantially in the form of a HTTP(S) POST message including XML-formatted data, as provided below:

```
POST /asset_workload_classification_retrieve_response.php HTTP/1.1
Host: www.server.com
Content-Type: Application/XML
Content-Length: 667
<?XML version = "1.0" encoding = "UTF-8"?>
<asset_workload_classification_retrieve_response>
   <response_identifier>ID_response_62</response_identifier>
   <asset_workload_classification_labels>
      CPU-small, RAM-medium, IO-small, Network-large
   </asset_workload_classification_labels>
</asset_workload_classification_retrieve_response>
```

The virtualization service server 2106 may send a node workload classification retrieve request 2133 to the repository 2110 to retrieve node workload classification label(s) for a node (e.g., for each available compute node to analyze). In one implementation, the node workload classification retrieve request may include data such as a request identifier, a node identifier, a time window, a timestamp, and/or the like. In one embodiment, the virtualization service server may provide the following example node workload classification retrieve request, substantially in the form of a HTTP(S) POST message including XML-formatted data, as provided below:

```
POST /node_workload_classification_retrieve_request.php HTTP/1.1
Host: www.server.com
Content-Type: Application/XML
Content-Length: 667
<?XML version = "1.0" encoding = "UTF-8"?>
<node_workload_classification_retrieve_request>
   <request_identifier>ID_request_63</request_identifier>
   <node_identifier>ID_node_1</node_identifier>
   <time_window>business hours</time_window>
   <timestamp>2021-11-12 00:01:01</timestamp>
</node_workload_classification_retrieve_request>
```

The repository 2110 may send a node workload classification retrieve response 2137 to the virtualization service server 2106 with the requested node workload classification label(s) for the node. In one implementation, the node workload classification retrieve response may include data such as a response identifier, the requested node workload classification label(s) for the node, and/or the like. In one embodiment, the repository may provide the following example node workload classification retrieve response, substantially in the form of a HTTP(S) POST message including XML-formatted data, as provided below:
POST/node_workload_classification_retrieve_response.php HTTP/1.1

```
Host: www.server.com
Content-Type: Application/XML
Content-Length: 667
<?XML version = "1.0" encoding = "UTF-8"?>
<node_workload_classification_retrieve_response>
    <response_identifier>ID_response_63</response_identifier>
    <node_workload_classification_labels>
        Network-HOT
    </node_workload_classification_labels>
</node_workload_classification_retrieve_response>
```

An asset virtualization processing (AVP) component 2141 may utilize the retrieved asset workload classification label(s) and/or the retrieved node workload classification label(s) to virtualize the asset specified in the asset virtualization request on a compute node selected in a way that load balances virtualized assets instantiated on nodes (e.g., of a compute node farm). See FIG. 22 for additional details regarding the AVP component.

The virtualization service server 2106 may send an asset instantiation request 2145 to a compute node farm 2114 to instantiate the asset specified in the asset virtualization request on the selected compute node. In one implementation, the asset instantiation request may include data such as a request identifier, an asset identifier, a snapshot identifier, a node identifier, and/or the like. In one embodiment, the virtualization service server may provide the following example asset instantiation request, substantially in the form of a HTTP(S) POST message including XML-formatted data, as provided below:

```
POST /asset_instantiation_request.php HTTP/1.1
Host: www.server.com
Content-Type: Application/XML
Content-Length: 667
<?XML version = "1.0" encoding = "UTF-8"?>
<asset_instantiation_request>
    <request_identifier>ID_request_64</request_identifier>
    <asset_identifier>ID_asset_1</asset_identifier>
    <snapshot_identifier>ID_snapshot_1</snapshot_identifier>
    <node_identifier>ID_node_2</node_identifier>
</asset_instantiation_request>
```

The compute node farm 2114 may send an asset instantiation response 2149 to the virtualization service server 2106 confirm that the asset specified in the asset virtualization request was instantiated on the selected compute node successfully. In one implementation, the asset instantiation response may include data such as a response identifier, a status, and/or the like. In one embodiment, the compute node farm may provide the following example asset instantiation response, substantially in the form of a HTTP(S) POST message including XML-formatted data, as provided below:

```
POST /asset_instantiation_response.php HTTP/1.1
Host: www.server.com
Content-Type: Application/XML
Content-Length: 667
<?XML version = "1.0" encoding = "UTF-8"?>
<asset_instantiation_response>
    <response_identifier>ID_response_64</response_identifier>
    <status>OK</status>
</asset_instantiation_response>
```

The virtualization service server 2106 may send an asset virtualization response 2153 to the client 2102 to inform the user that the asset specified in the asset virtualization request was virtualized successfully and/or to provide the user with access to the virtualized asset (e.g., system input/output (e.g., display, audio, peripherals), IP address, etc. of the virtualized asset). In one implementation, the asset virtualization response may include data such as a response identifier, a status, and/or the like. In one embodiment, the virtualization service server may provide the following example asset virtualization response, substantially in the form of a HTTP(S) POST message including XML-formatted data, as provided below:

```
POST /asset_virtualization_response.php HTTP/1.1
Host: www.server.com
Content-Type: Application/XML
Content-Length: 667
<?XML version = "1.0" encoding = "UTF-8"?>
<asset_virtualization_response>
    <response_identifier>ID_response_61</response_identifier>
    <status>OK</status>
</asset_virtualization_response>
```

Figure 22:
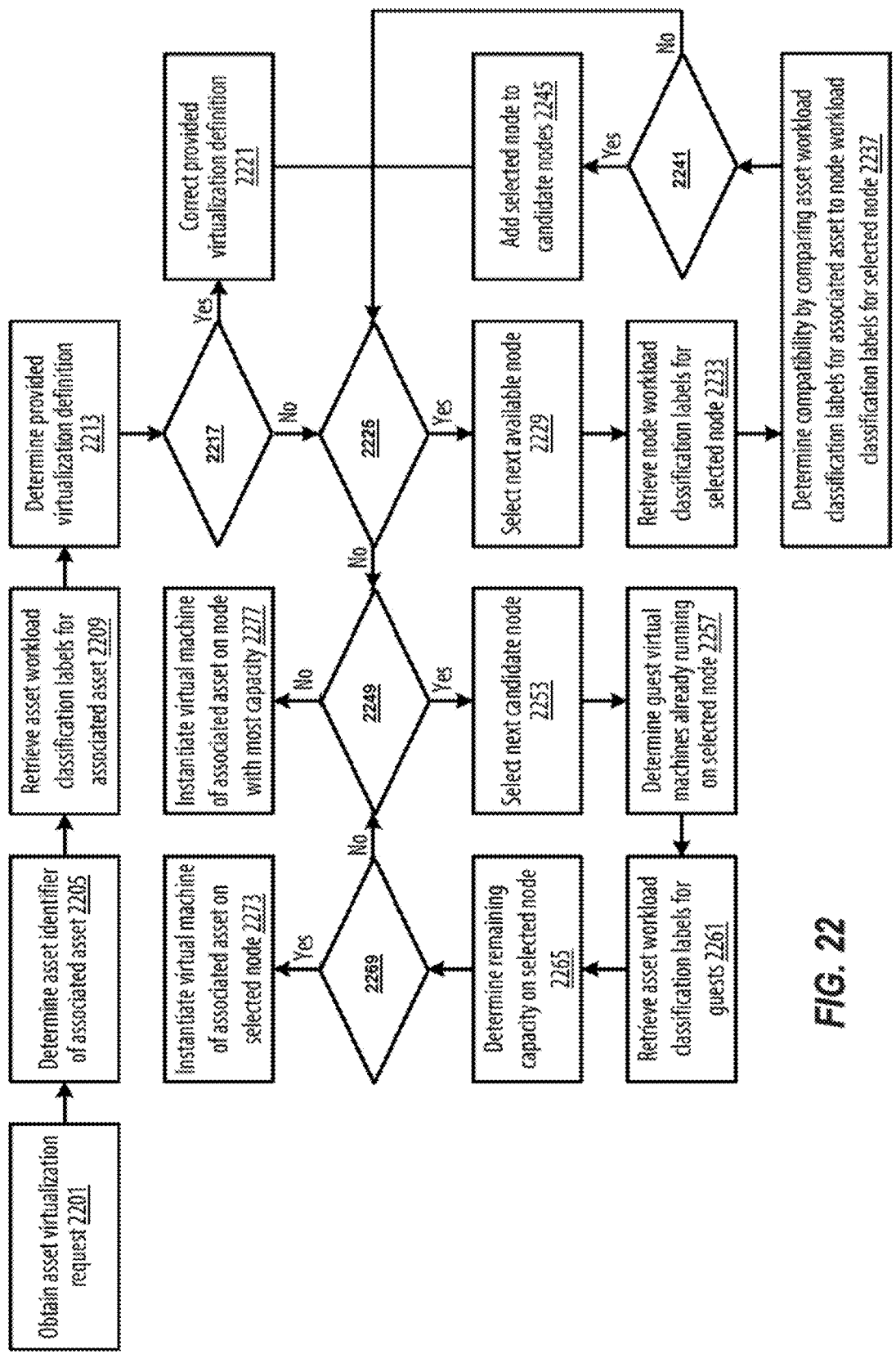
FIG. 22 shows a logic flow illustrating embodiments of an asset virtualization processing (AVP) component for the MLLB.

FIG. 22 shows a logic flow illustrating embodiments of an asset virtualization processing (AVP) component for the MLLB. In FIG. 22, an asset virtualization request may be obtained at 2201. For example, the asset virtualization request may be obtained as a result of a user request to virtualize an asset on a compute node (e.g., in a DR scenario).

An asset identifier of the asset associated with the asset virtualization request may be determined at 2205. In one implementation, the asset virtualization request may be parsed (e.g., using PHP commands) to determine the asset identifier of the asset (e.g., based on the value of the asset_identifier field).

Asset workload classification label(s) for the associated asset may be retrieved at 2209. In one embodiment, asset workload classification label(s) for a specified timestamp (e.g., the latest timestamp) may be retrieved. For example, using the record in the asset classification table 2719*n* with the latest timestamp may provide the latest assessment of the expected workload. In another embodiment, asset workload classification label(s) for a specified snapshot may be retrieved. In one implementation, the asset may be periodically backed up by taking a snapshot of the asset's data to create a restore point (e.g., creating a ZFS snapshot) to be used in a DR scenario. Asset workload classification label(s) may be associated with these snapshots (e.g., the record in the asset classification table 2719*n* created as part of taking a snapshot, the record in the asset classification table 2719*n* with the closest timestamp to a snapshot), and the associated record may be used when virtualizing the asset. For example, using asset workload classification label(s) determined at the time of the snapshot may help assess the expected workload for a specific snapshot more accurately. In some embodiments, different asset workload classification label(s) may be specified for different time windows (e.g., 1 hour, 1 day, 1 week, business hours, off business hours). In one implementation, a time window corresponding to the expected workload timeframe associated with the asset virtualization request may be determined and used to retrieve asset workload classification label(s) associated with the best matching time window size. For example, if the asset is expected to be virtualized during business hours, the record in the asset classification table 2719*n* associated with the business hours time window may be used. In another example, if the asset is expected to be virtualized during the next 16 hours, the record in the asset classification table 2719*n* associated with the 1-day time window may be used.

In some implementations, the asset workload classification label(s) for the associated asset may be retrieved via a MySQL database command similar to the following:

```
SELECT assetWorkloadClassificationLabels
FROM Assetclassification
WHERE assetID = ID_asset_1 AND
   associatedSnapshotIdentifier = ID_snapshot_1 AND
   timeWindowSize = "business hours",
```

A virtualization definition associated with the asset virtualization request may be determined at 2213. In one embodiment, the virtualization definition may be provided in the asset virtualization request. In one implementation, the asset virtualization request may be parsed (e.g., using PHP commands) to determine the virtualization definition (e.g., based on the value of the virtualization_definition field). In another embodiment, the virtualization definition may be stored (e.g., along with the asset workload classification label(s)). For example, the virtualization definition may be determined (e.g., based on the observed workload) as part of determining the asset workload classification label(s). In one implementation, the asset classification table 2719n may be queried to determine the virtualization definition.

A determination may be made at 2217 whether the virtualization definition is under-provisioned (e.g., for some resources) and/or over-provisioned (e.g., for some other resources) for the asset. In one implementation, the virtualization definition provided in the asset virtualization request may be compared with the virtualization definition stored with the asset workload classification label(s) to determine whether there is under/over provisioning. For example, if a resource amount (e.g., GBs of RAM) specified in the virtualization definition provided in the asset virtualization request differs from the observed workload resource amount specified in the virtualization definition stored with the asset workload classification label(s) by more than a threshold amount (e.g., 25%), the virtualization definition may be under/over-provisioned.

If the virtualization definition is under/over-provisioned, the virtualization definition provided in the asset virtualization request may be corrected at 2221. In one implementation, the virtualization definition may be corrected by modifying an under/over-provisioned resource amount specified in the virtualization definition provided in the asset virtualization request to be the resource amount specified in the virtualization definition stored with the asset workload classification label(s). In another implementation, the virtualization definition may be corrected by modifying an under/over-provisioned resource amount to be the minimum/maximum resource amount specified for the workload footprint associated with the asset (e.g., an asset with medium asset workload classification label may have a minimum of 16 GB (e.g., if under-provisioned) and a maximum of 32 GB (e.g., if over-provisioned) of RAM).

A determination may be made at 2225 whether there remain available nodes to analyze. In one implementation, each of the compute nodes available on a compute node farm may be analyzed. If there remain available nodes to analyze, the next available node may be selected for analysis at 2229.

Node workload classification labels for the selected node may be retrieved at 2233. In one embodiment, node workload classification label(s) for a specified timestamp (e.g., the latest timestamp) may be retrieved. For example, using the record in the node classification table 2719o with the latest timestamp may provide the latest assessment of the expected workload. In some embodiments, different node workload classification label(s) may be specified for different time windows (e.g., 1 hour, 1 day, 1 week, business hours, off business hours). In one implementation, a time window corresponding to the expected workload timeframe associated with the asset virtualization request may be determined and used to retrieve node workload classification label(s) associated with the best matching time window size. For example, if the asset is expected to be virtualized during business hours, the record in the node classification table 2719o associated with the business hours time window may be used. In another example, if the asset is expected to be virtualized during the next 1 week, the record in the node classification table 2719o associated with the 1 week time window may be used. In some implementations, the node workload classification labels for the selected node may be retrieved via a MySQL database command similar to the following:

```
SELECT nodeWorkloadClassificationLabels
FROM Nodeclassification
WHERE nodeID = ID_node_1 AND
   timestampOfLabeling = "the Latest timestamp" AND
   timeWindowSize = "business hours",
```

Compatibility of the selected node may be determined by comparing the asset workload classification label(s) for the associated asset with the node workload classification label(s) for the selected node at 2237. In one embodiment, an asset and a node may be compatible if their combined workload footprints (e.g., overall workload footprints, workload footprints of different components) do not exceed a capacity threshold (e.g., specified via a set of capacity threshold rules). For example, a capacity threshold rule may specify that a node with a Network-HOT node workload classification label is incompatible with an asset with a Network-large or Network-medium asset workload classification label, but compatible with an asset with a Network-small asset workload classification label. In another example, a capacity threshold rule may specify that a node with a medium node workload classification label is compatible with an asset with a small or medium asset workload classification label. In one implementation, if the selected node satisfies the set of capacity threshold rules, the selected node may be considered to be compatible with the associated asset. In some implementations, the health of the node and/or reboot schedule and/or decommission schedule of the node may also be considered when evaluation compatibility to avoid virtualizing the asset on a compute node that is in bad health or scheduled to be turned off or decommissioned during the expected workload timeframe.

If it is determined at 2241 that the selected node is compatible with the associated asset, the selected node may be added to a set of candidate nodes at 2245. In one implementation, the identifier of the selected node may be added to a datastructure (e.g., an array) containing node identifiers of candidate nodes.

A determination may be made at 2249 whether there remain candidate nodes to analyze. In one implementation, each of the candidate nodes in the set of candidate nodes may be analyzed. If there remain candidate nodes to analyze, the next candidate node may be selected for analysis at 2253.

Guest virtual machines already running on the selected candidate node may be determined at 2257. For example, the selected candidate node may have no other guest virtual machines already running or may have one or more other guest virtual machines already running with each guest virtual machine corresponding to a virtualized asset. In one implementation, asset identifiers of the virtualized assets corresponding to the guest virtual machines already running on the selected candidate node may be determined.

Asset workload classification labels for the virtualized assets corresponding to the guest virtual machines already running on the selected candidate node may be retrieved at 2261. In one implementation, the asset workload classification label(s) for each of the virtualized assets corresponding to the guest virtual machines already running on the selected candidate node may be retrieved in a similar manner as discussed with regard to 2209 using data for the respective virtualized asset.

Remaining capacity on the selected candidate node may be determined at 2265. In one embodiment, each node may have a capacity metric (e.g., expressed as the maximum number of small/medium/large workloads that a node can handle; expressed as the maximum operations per second, transfers per second, etc. that a node can handle), and remaining capacity of a node may be determined by subtracting capacity used by the node's workload and/or capacity used by the guest virtual machines running on the node from the capacity metric. In one implementation, a set of capacity threshold rules may be used to determine the remaining capacity on the selected candidate node. For example, a capacity threshold rule may specify that a node may handle up to 4 workloads with small asset workload classification label or small node workload classification label, up to 2 workloads with medium asset workload classification label or medium node workload classification label, and up to 1 workload with large asset workload classification label or large node workload classification label. Accordingly, if the node already has 1 medium workload, the node may have remaining capacity for 1 medium workload or for 2 small workloads. In another implementation, workload classification labels may be numeric values that may be subtracted from the selected candidate node's capacity metric to determine the remaining capacity on the selected candidate node.

If it is determined at 2269 that there is capacity available for the associated asset on the selected candidate node (e.g., the remaining capacity on the selected candidate node is enough to handle the workload footprint specified by the asset workload classification label(s) for the associated asset, the remaining capacity on the selected candidate node is enough to handle the workload footprint specified by the virtualization definition for the associated asset), a virtual machine corresponding to the associated asset may be instantiated on the selected candidate node at 2273. In one implementation, the virtual machine corresponding to the associated asset may be instantiated on the selected candidate node via an asset instantiation request.

If none of the candidate nodes have enough remaining capacity available for the associated asset, a virtual machine corresponding to the associated asset may be instantiated on the candidate node with the most remaining capacity at 2277. In one implementation, the virtual machine corresponding to the associated asset may be instantiated on the candidate node with the most remaining capacity via an asset instantiation request.

Figure 23:
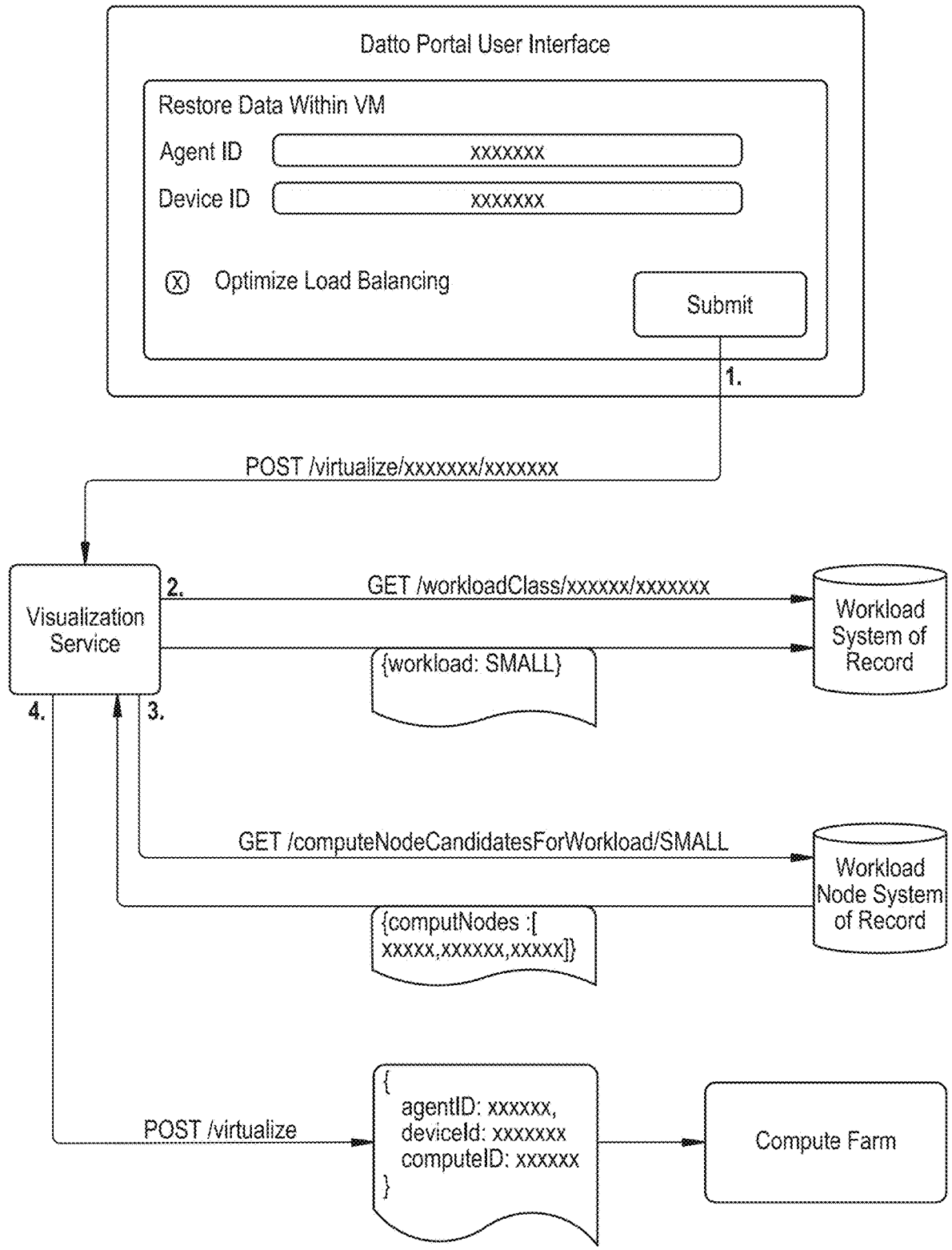
FIG. 23 shows implementation case(s) for the MLLB.

FIG. 23 shows implementation case(s) for the MLLB. In FIG. 23, an exemplary virtualization load balancing is illustrated. In one implementation, a Virtualization Request Processor may validate that the provided virtualization definition is not under/over provisioned by comparing against the observed virtualization manifest. Appropriate corrections may be made to the definition if warranted before launching the definition.

In one implementation, a Load Balancer may receive the virtualization manifest for processing and algorithmically determine which node is appropriate for the virtualization of the asset by inspecting the classification label and features and comparing it to the classification labels and features for available compute nodes. The algorithm ensures that high concentration of high weight labeled (e.g., Large, X-Large) virtual machines do not make up a significant number of instances on a single compute node. Virtualization of the asset may commence once a suitable compute node has been identified.

Additional Alternative Embodiment Examples

The following alternative example embodiments provide a number of variations of some of the already discussed principles for expanded color on the abilities of the MLLB.

Figure 24:
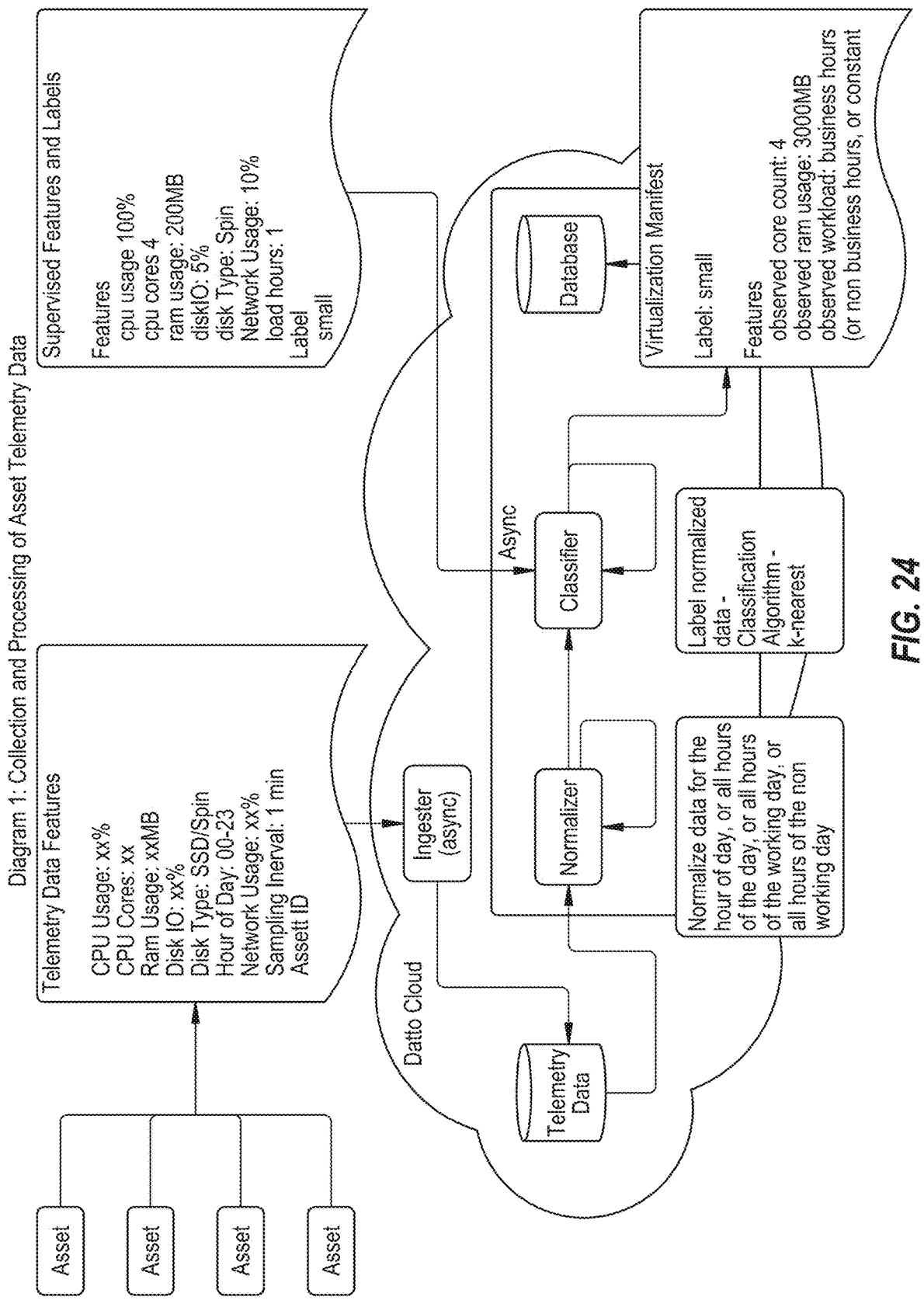
FIG. 24 shows implementation case(s) for the MLLB.

FIG. 24 shows implementation case(s) for the MLLB. In FIG. 24, exemplary asset telemetry data generation is illustrated. In one implementation, a backup agent may be modified to emit observed CPU/Network/RAM/Disk/etc. usage on a continual basis (e.g., 1 minute interval) and transmit asynchronously to a DR provider on a defined interval (e.g., every 1 hour).

A supervised learning model may be utilized that contains a set of features labeled in a way that identifies the workload of the protected asset. For example, the following set of features may be used:

CPU Cores: int
CPU Usage: double
RAM: long
RAM Usage: double
Disk IO: double
Network IO: double
Network Speed: int A label may be associated with each feature set to classify the asset workload impact (e.g., small, medium, large, X-large, etc.).

In one implementation, a normalizer, which may be an async processor that obtains a set of telemetry data for an asset for a window of time (e.g., 1 hour, 1 day, etc.) may be utilized. This processor reduces the telemetry data to a smaller statistically relevant set of data that is then provided to the classifier.

In one implementation, the classifier may apply the supervised model in conjunction with a k-nearest neighbors method against the provided telemetry data. The result of this operation is a normalized label that represents the workload of the provided telemetry data.

The telemetry data may be further normalized to one feature set, augmented with the classification label, and stored along with the asset record. This block of data may be used during the time of virtualization for the purpose of load balancing the virtualized asset for optimal performance. This data may also be used to protect against under/over provisioning of the virtualized asset.

Figure 25:
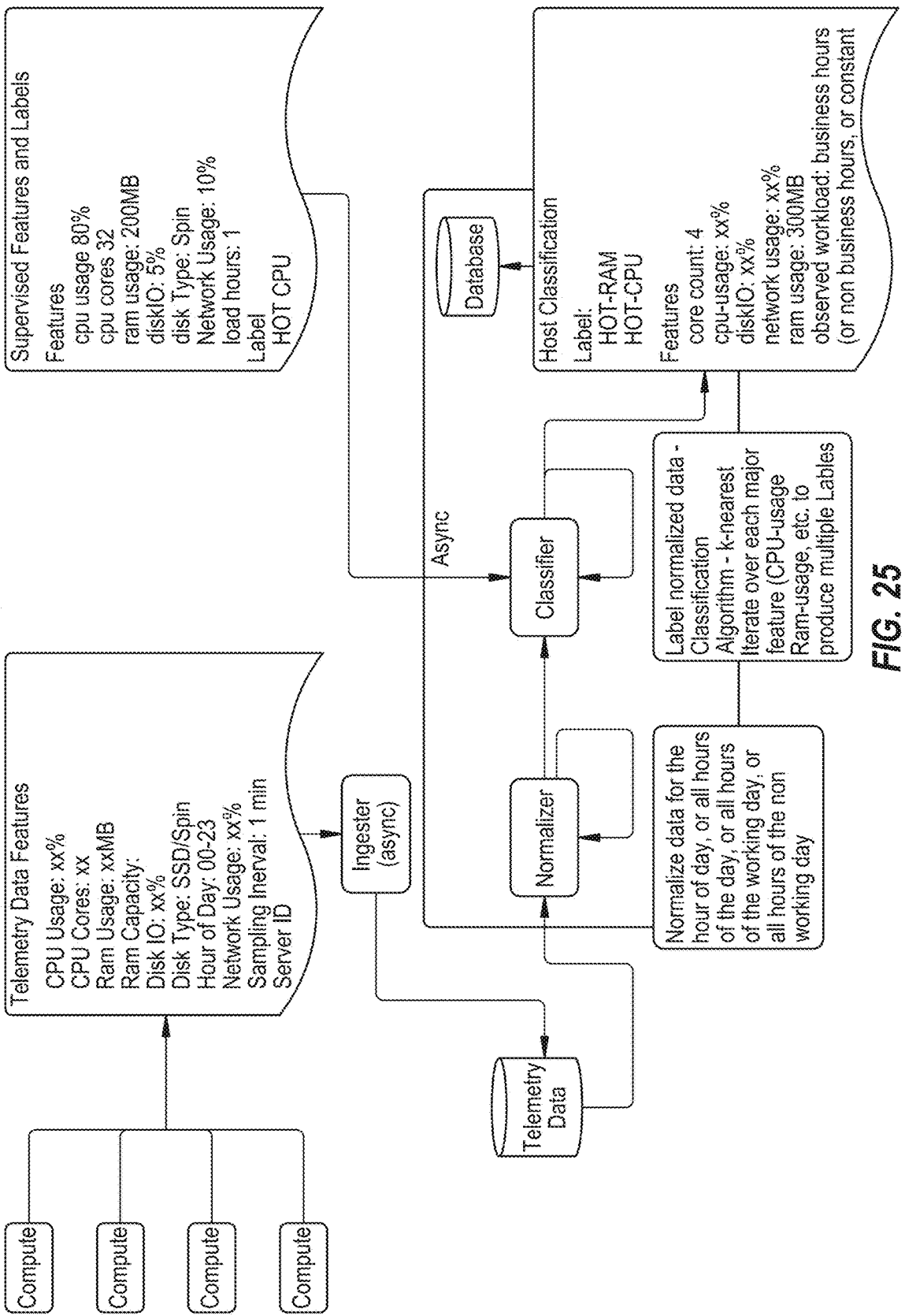
FIG. 25 shows implementation case(s) for the MLLB.

FIG. 25 shows implementation case(s) for the MLLB. In FIG. 25, an exemplary compute node telemetry data generation is illustrated. In one implementation, a compute node may be modified to emit observed CPU/Network/RAM/

Disk/etc. usage on a continual basis (e.g., 1 minute interval) and transmit asynchronously to an ingesting routine for processing.

A supervised learning model may be utilized that contains a set of features labeled in a way that identifies the workload of the node. For example, the following set of features may be used:

```
CPU Cores: int
CPU Usage: double
RAM: long
RAM Usage: double
Disk IO: double
Network IO: double
Network Speed: int
```

A label may be associated with each feature set to classify the node workload impact (e.g., HOT-CPU, HOT-IO, HOT-RAM, etc.).

In one implementation, a normalizer, which may be an async processor that obtains a set of telemetry data for a node for a window of time (e.g., 1 hour, 1 day, etc.) may be utilized. This processor reduces the telemetry data to a smaller statistically relevant set of data that is then provided to the classifier.

In one implementation, the classifier may apply the supervised model in conjunction with a k-nearest neighbors method against the provided telemetry data. The result of this operation is a normalized label that represents the workload of the provided telemetry data.

In one implementation, various manipulations of the features fed into the classifier may be performed to get more discrete labels for a subset of features (e.g., Core Count and CPU Usage to determine if the compute node is CPU-HOT).

The telemetry data may be further normalized to one feature set, augmented with one or more classification labels, and stored along with the server record. This block of data may be used during the time of virtualization for the purpose of load balancing virtualized assets instantiated on the node for optimal performance.

Figure 26:
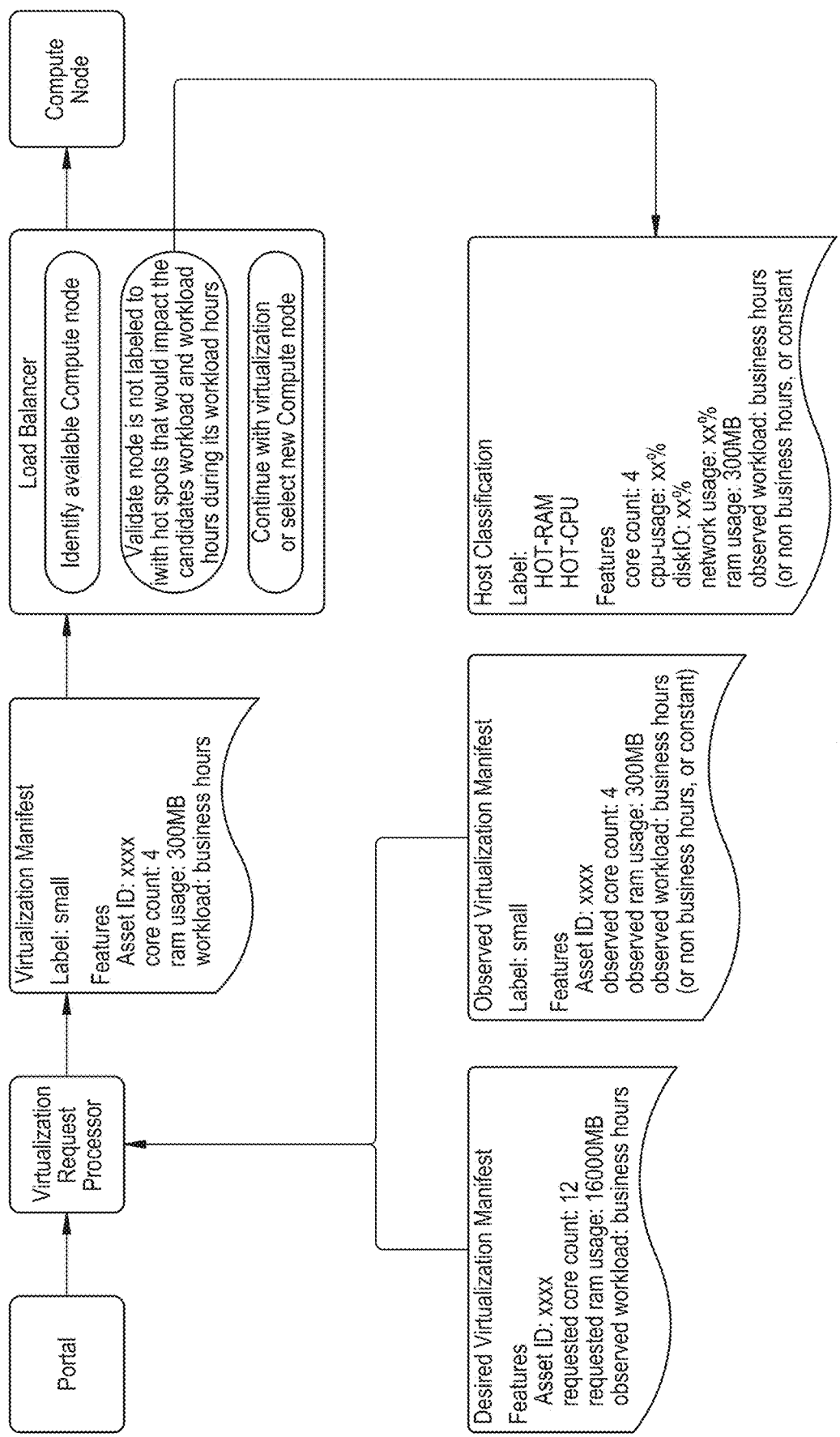
FIG. 26 shows implementation case(s) for the MLLB.

FIG. 26 shows implementation case(s) for the MLLB. In FIG. 26, an exemplary virtualization load balancing is illustrated. In one implementation, a Virtualization Request Processor may validate that the provided virtualization definition is not under/over provisioned by comparing against the observed virtualization manifest. Appropriate corrections may be made to the definition if warranted before launching the definition.

In one implementation, a Load Balancer may receive the virtualization manifest for processing and algorithmically determine which node is appropriate for the virtualization of the asset by inspecting the classification label and features and comparing it to the classification labels and features for available compute nodes. The algorithm ensures that high concentration of high weight labeled (e.g., Large, X-Large) VMs do not make up a significant number of instances on a single compute node. Virtualization of the asset may commence once a suitable compute node has been identified.

Additional embodiments may include:

1. A load balancing asset virtualizing apparatus, comprising:
   at least one memory;
   a component collection stored in the at least one memory;
   at least one processor disposed in communication with the at least one memory, the at least one processor executing processor-executable instructions from the component collection, the component collection structured with processor-executable instructions, comprising:
   obtain, via the at least one processor, an asset virtualization request datastructure, the asset virtualization request datastructure structured to include a data field for identifying an asset;
   retrieve, via the at least one processor, a set of asset workload classification labels for the asset, the set of asset workload classification labels determined using an asset workload classification datastructure trained using a machine learning method;
   retrieve, via the at least one processor, a set of node workload classification labels for each node in a set of available compute nodes, each set of node workload classification labels determined using a node workload classification datastructure trained using a machine learning method;
   determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;
   select, via the at least one processor, a candidate compute node from the set of candidate compute nodes; and
   instantiate, via the at least one processor, a virtual machine corresponding to the asset on the selected candidate compute node.

2. The apparatus of embodiment 1, in which the asset is one of: a desktop, a workstation, a laptop, a mobile device, a server.

3. The apparatus of embodiment 1, in which the asset is structured to execute backup software that is structured to utilize a kernel-resident agent to periodically collect workload info data regarding the asset.

4. The apparatus of embodiment 1, in which the asset virtualization request datastructure is structured to include a data field for identifying a snapshot, in which the set of asset workload classification labels for the asset is associated with the snapshot.

5. The apparatus of embodiment 1, in which the asset virtualization request datastructure is structured to include a data field for specifying an expected workload timeframe, in which the set of asset workload classification labels for the asset is associated with a time window matching the expected workload timeframe.

6. The apparatus of embodiment 1, in which the asset virtualization request datastructure is structured to include a data field for specifying a virtualization definition, the virtualization definition specifying a set of resources requested for the virtual machine.

7. The apparatus of embodiment 6, in which the component collection storage is further structured with processor-executable instructions, comprising:
   determine, via the at least one processor, that the virtualization definition is under-provisioned or over-provisioned for a resource; and
   modify, via the at least one processor, the virtualization definition to use a resource amount for the resource that corresponds to observed workload for the asset.

8. The apparatus of embodiment 6, in which a resource is one of: CPU, RAM, disk, network, energy, time of day.

9. The apparatus of embodiment 1, in which the set of asset workload classification labels for the asset comprises at least one of: a label indicating an overall workload footprint of the asset, a plurality of labels indicating workload footprints of the asset for different resources, one or more labels indicating resources heavily utilized by the asset.

10. The apparatus of embodiment 1, in which the machine learning method is one of: logistic regression, k-nearest neighbors, random forest, a neural-network-based learning method.

11. The apparatus of embodiment 1, in which the asset workload classification datastructure and the node workload classification datastructure are the same datastructure.

12. The apparatus of embodiment 1, in which the candidate compute node is selected randomly.

13. The apparatus of embodiment 1, in which the instructions to select a candidate compute node are structured as:
   determine, via the at least one processor, virtualized assets corresponding to guest virtual machines already running on a respective candidate compute node from the set of candidate compute nodes;
   determine, via the at least one processor, a set of asset workload classification labels for each of the virtualized assets;
   determine, via the at least one processor, remaining capacity of the respective candidate compute node based on: a capacity metric associated with the respective candidate compute node, the set of node workload classification labels for the respective candidate compute node, and the set of asset workload classification labels for each of the virtualized assets;
   determine, via the at least one processor, that the remaining capacity of the respective candidate compute node meets capacity requirements of the asset; and
   select, via the at least one processor, the respective candidate compute node.

14. The apparatus of embodiment 13, in which the capacity requirements of the asset are determined based on the set of asset workload classification labels for the asset.

15. The apparatus of embodiment 13, in which the capacity requirements of the asset are determined based on a virtualization definition for the asset.

16. A load balancing asset virtualizing processor-readable, non-transient medium, the medium storing a component collection, the component collection structured with processor-executable instructions comprising:
   obtain, via at least one processor, an asset virtualization request datastructure, the asset virtualization request datastructure structured to include a data field for identifying an asset;
   retrieve, via the at least one processor, a set of asset workload classification labels for the asset, the set of asset workload classification labels determined using an asset workload classification datastructure trained using a machine learning method;
   retrieve, via the at least one processor, a set of node workload classification labels for each node in a set of available compute nodes, each set of node workload classification labels determined using a node workload classification datastructure trained using a machine learning method;
   determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;
   select, via the at least one processor, a candidate compute node from the set of candidate compute nodes; and
   instantiate, via the at least one processor, a virtual machine corresponding to the asset on the selected candidate compute node.

17. The medium of embodiment 16, in which the asset is one of: a desktop, a workstation, a laptop, a mobile device, a server.

18. The medium of embodiment 16, in which the asset is structured to execute backup software that is structured to utilize a kernel-resident agent to periodically collect workload info data regarding the asset.

19. The medium of embodiment 16, in which the asset virtualization request datastructure is structured to include a data field for identifying a snapshot, in which the set of asset workload classification labels for the asset is associated with the snapshot.

20. The medium of embodiment 16, in which the asset virtualization request datastructure is structured to include a data field for specifying an expected workload timeframe, in which the set of asset workload classification labels for the asset is associated with a time window matching the expected workload timeframe.

21. The medium of embodiment 16, in which the asset virtualization request datastructure is structured to include a data field for specifying a virtualization definition, the virtualization definition specifying a set of resources requested for the virtual machine.

22. The medium of embodiment 21, in which the component collection storage is further structured with processor-executable instructions, comprising:
   determine, via the at least one processor, that the virtualization definition is under-provisioned or over-provisioned for a resource; and
   modify, via the at least one processor, the virtualization definition to use a resource amount for the resource that corresponds to observed workload for the asset.

23. The medium of embodiment 21, in which a resource is one of: CPU, RAM, disk, network, energy, time of day.

24. The medium of embodiment 16, in which the set of asset workload classification labels for the asset comprises at least one of: a label indicating the asset's overall workload footprint, a plurality of labels indicating the asset's workload footprints for different resources, one or more labels indicating resources heavily utilized by the asset.

25. The medium of embodiment 16, in which the machine learning method is one of: logistic regression, k-nearest neighbors, random forest, a neural-network-based learning method.

26. The medium of embodiment 16, in which the asset workload classification datastructure and the node workload classification datastructure are the same datastructure.

27. The medium of embodiment 16, in which the candidate compute node is selected randomly.

28. The medium of embodiment 16, in which the instructions to select a candidate compute node are structured as:
  determine, via the at least one processor, virtualized assets corresponding to guest virtual machines already running on a respective candidate compute node from the set of candidate compute nodes;
  determine, via the at least one processor, a set of asset workload classification labels for each of the virtualized assets;
  determine, via the at least one processor, remaining capacity of the respective candidate compute node based on: a capacity metric associated with the respective candidate compute node, the set of node workload classification labels for the respective candidate compute node, and the set of asset workload classification labels for each of the virtualized assets;
  determine, via the at least one processor, that the remaining capacity of the respective candidate compute node meets capacity requirements of the asset; and
  select, via the at least one processor, the respective candidate compute node.

29. The medium of embodiment 28, in which the capacity requirements of the asset are determined based on the set of asset workload classification labels for the asset.

30. The medium of embodiment 28, in which the capacity requirements of the asset are determined based on a virtualization definition for the asset.

31. A load balancing asset virtualizing processor-implemented system, comprising:
  means to store a component collection;
  means to process processor-executable instructions from the component collection, the component collection storage structured with processor-executable instructions including:
    obtain, via the at least one processor, an asset virtualization request datastructure, the asset virtualization request datastructure structured to include a data field for identifying an asset;
    retrieve, via the at least one processor, a set of asset workload classification labels for the asset, the set of asset workload classification labels determined using an asset workload classification datastructure trained using a machine learning method;
    retrieve, via the at least one processor, a set of node workload classification labels for each node in a set of available compute nodes, each set of node workload classification labels determined using a node workload classification datastructure trained using a machine learning method;
    determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;
    select, via the at least one processor, a candidate compute node from the set of candidate compute nodes; and
    instantiate, via the at least one processor, a virtual machine corresponding to the asset on the selected candidate compute node.

32. The system of embodiment 31, in which the asset is one of: a desktop, a workstation, a laptop, a mobile device, a server.

33. The system of embodiment 31, in which the asset is structured to execute backup software that is structured to utilize a kernel-resident agent to periodically collect workload info data regarding the asset.

34. The system of embodiment 31, in which the asset virtualization request datastructure is structured to include a data field for identifying a snapshot, in which the set of asset workload classification labels for the asset is associated with the snapshot.

35. The system of embodiment 31, in which the asset virtualization request datastructure is structured to include a data field for specifying an expected workload timeframe, in which the set of asset workload classification labels for the asset is associated with a time window matching the expected workload timeframe.

36. The system of embodiment 31, in which the asset virtualization request datastructure is structured to include a data field for specifying a virtualization definition, the virtualization definition specifying a set of resources requested for the virtual machine.

37. The system of embodiment 36, in which the component collection storage is further structured with processor-executable instructions, comprising:
  determine, via the at least one processor, that the virtualization definition is under-provisioned or over-provisioned for a resource; and
  modify, via the at least one processor, the virtualization definition to use a resource amount for the resource that corresponds to observed workload for the asset.

38. The system of embodiment 36, in which a resource is one of: CPU, RAM, disk, network, energy, time of day.

39. The system of embodiment 31, in which the set of asset workload classification labels for the asset comprises at least one of: a label indicating the asset's overall workload footprint, a plurality of labels indicating the asset's workload footprints for different resources, one or more labels indicating resources heavily utilized by the asset.

40. The system of embodiment 31, in which the machine learning method is one of: logistic regression, k-nearest neighbors, random forest, a neural-network-based learning method.

41. The system of embodiment 31, in which the asset workload classification datastructure and the node workload classification datastructure are the same datastructure.

42. The system of embodiment 31, in which the candidate compute node is selected randomly.

43. The system of embodiment 31, in which the instructions to select a candidate compute node are structured as:
  determine, via the at least one processor, virtualized assets corresponding to guest virtual machines already running on a respective candidate compute node from the set of candidate compute nodes;
  determine, via the at least one processor, a set of asset workload classification labels for each of the virtualized assets;
  determine, via the at least one processor, remaining capacity of the respective candidate compute node based on: a capacity metric associated with the respective candidate compute node, the set of node workload classification labels for the respective candidate compute node, and the set of asset workload classification labels for each of the virtualized assets;

determine, via the at least one processor, that the remaining capacity of the respective candidate compute node meets capacity requirements of the asset; and select, via the at least one processor, the respective candidate compute node.

44. The system of embodiment 43, in which the capacity requirements of the asset are determined based on the set of asset workload classification labels for the asset.

45. The system of embodiment 43, in which the capacity requirements of the asset are determined based on a virtualization definition for the asset.

46. A load balancing asset virtualizing processor-implemented process, including processing processor-executable instructions via at least one processor from a component collection stored in at least one memory, the component collection storage structured with processor-executable instructions comprising:

obtain, via the at least one processor, an asset virtualization request datastructure, the asset virtualization request datastructure structured to include a data field for identifying an asset;

retrieve, via the at least one processor, a set of asset workload classification labels for the asset, the set of asset workload classification labels determined using an asset workload classification datastructure trained using a machine learning method;

retrieve, via the at least one processor, a set of node workload classification labels for each node in a set of available compute nodes, each set of node workload classification labels determined using a node workload classification datastructure trained using a machine learning method;

determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;

select, via the at least one processor, a candidate compute node from the set of candidate compute nodes; and instantiate, via the at least one processor, a virtual machine corresponding to the asset on the selected candidate compute node.

47. The process of embodiment 46, in which the asset is one of: a desktop, a workstation, a laptop, a mobile device, a server.

48. The process of embodiment 46, in which the asset is structured to execute backup software that is structured to utilize a kernel-resident agent to periodically collect workload info data regarding the asset.

49. The process of embodiment 46, in which the asset virtualization request datastructure is structured to include a data field for identifying a snapshot, in which the set of asset workload classification labels for the asset is associated with the snapshot.

50. The process of embodiment 46, in which the asset virtualization request datastructure is structured to include a data field for specifying an expected workload timeframe, in which the set of asset workload classification labels for the asset is associated with a time window matching the expected workload timeframe.

51. The process of embodiment 46, in which the asset virtualization request datastructure is structured to include a data field for specifying a virtualization definition, the virtualization definition specifying a set of resources requested for the virtual machine.

52. The process of embodiment 51, in which the component collection storage is further structured with processor-executable instructions, comprising:

determine, via the at least one processor, that the virtualization definition is under-provisioned or over-provisioned for a resource; and modify, via the at least one processor, the virtualization definition to use a resource amount for the resource that corresponds to observed workload for the asset.

53. The process of embodiment 51, in which a resource is one of: CPU, RAM, disk, network, energy, time of day.

54. The process of embodiment 46, in which the set of asset workload classification labels for the asset comprises at least one of: a label indicating the asset's overall workload footprint, a plurality of labels indicating the asset's workload footprints for different resources, one or more labels indicating resources heavily utilized by the asset.

55. The process of embodiment 46, in which the machine learning method is one of: logistic regression, k-nearest neighbors, random forest, a neural-network-based learning method.

56. The process of embodiment 46, in which the asset workload classification datastructure and the node workload classification datastructure are the same datastructure.

57. The process of embodiment 46, in which the candidate compute node is selected randomly.

58. The process of embodiment 46, in which the instructions to select a candidate compute node are structured as:

determine, via the at least one processor, virtualized assets corresponding to guest virtual machines already running on a respective candidate compute node from the set of candidate compute nodes;

determine, via the at least one processor, a set of asset workload classification labels for each of the virtualized assets;

determine, via the at least one processor, remaining capacity of the respective candidate compute node based on: a capacity metric associated with the respective candidate compute node, the set of node workload classification labels for the respective candidate compute node, and the set of asset workload classification labels for each of the virtualized assets;

determine, via the at least one processor, that the remaining capacity of the respective candidate compute node meets capacity requirements of the asset; and select, via the at least one processor, the respective candidate compute node.

59. The process of embodiment 58, in which the capacity requirements of the asset are determined based on the set of asset workload classification labels for the asset.

60. The process of embodiment 58, in which the capacity requirements of the asset are determined based on a virtualization definition for the asset.

MLLB Controller

FIG. 27 shows a block diagram illustrating embodiments of a MLLB controller. In this embodiment, the MLLB controller 2701 may serve to aggregate, process, store, search, serve, identify, instruct, generate, match, and/or facilitate interactions with a computer through machine learning and backup systems technologies, and/or other related data.

Users, which may be people and/or other systems, may engage information technology systems (e.g., computers) to facilitate information processing. In turn, computers employ processors to process information; such processors 2703 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 2729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MLLB controller 2701 may be connected to and/or communicate with entities such as, but not limited to: one or more users from peripheral devices 2712 (e.g., user input devices 2711); an optional cryptographic processor device 2728; and/or a communications network 2713.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The MLLB controller 2701 may be based on computer systems that may comprise, but are not limited to, components such as: a computer systemization 2702 connected to memory 2729.

Computer Systemization

A computer systemization 2702 may comprise a clock 2730, central processing unit ("CPU(s)" and/or "processor(s)" (these terms are used interchangeably throughout the disclosure unless noted to the contrary)) 2703, a memory 2729 (e.g., a read only memory (ROM) 2706, a random access memory (RAM) 2705, etc.), and/or an interface bus 2707, and most frequently, although not necessarily, are all interconnected and/or communicating through a system bus 2704 on one or more (mother)board(s) 2702 having conductive and/or otherwise transportive circuit pathways through which instructions (e.g., binary encoded signals) may travel to effectuate communications, operations, storage, etc. The computer systemization may be connected to a power source 2786; e.g., optionally the power source may be internal. Optionally, a cryptographic processor 2726 may be connected to the system bus. In another embodiment, the cryptographic processor, transceivers (e.g., ICs) 2774, and/or sensor array (e.g., accelerometer, altimeter, ambient light, barometer, global positioning system (GPS) (thereby allowing MLLB controller to determine its location), gyroscope, magnetometer, pedometer, proximity, ultra-violet sensor, etc.) 2773 may be connected as either internal and/or external peripheral devices 2712 via the interface bus I/O 2708 (not pictured) and/or directly via the interface bus 2707. In turn, the transceivers may be connected to antenna(s) 2775, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+ EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2729 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the MLLB controller and beyond through various interfaces. Should processing requirements dictate a greater amount speed and/or capacity, distributed processors (e.g., see Distributed MLLB below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MLLB may be achieved by implementing a microcontroller such as CAST's® R8051XC2 microcontroller; Intel's® MCS 51 (i.e., 8051 microcontroller); and/or the like. Also, to implement certain features of the MLLB, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MLLB component collection (distributed or otherwise) and/or features may be implemented via the microprocessor and/or via embedded components; e.g., via ASIC, coprocessor, DSP, FPGA, and/or the like. Alternately, some implementations of the MLLB may be implemented with embedded components that are configured and used to achieve a variety of features or signal processing.

Depending on the particular implementation, the embedded components may include software solutions, hardware solutions, and/or some combination of both hardware/software solutions. For example, MLLB features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the MLLB features. A hierarchy of programmable interconnects allow logic blocks to be interconnected as needed by the MLLB system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MLLB may be developed on FPGAs and then migrated into a fixed version that more resembles ASIC implementations. Alternate or coordinating implementations may migrate MLLB controller features to a final ASIC instead of or in addition to FPGAs. Depending on the implementation all of the aforementioned embedded components and microprocessors may be considered the "CPU" and/or "processor" for the MLLB.

Power Source

The power source 2786 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2786 is connected to at least one of the interconnected subsequent components of the MLLB thereby providing an electric current to all subsequent components. In one example, the power source 2786 is connected to the system bus component 2704. In an alternative embodiment, an outside power source 2786 is provided through a connection across the I/O 2708 interface. For example, Ethernet (with power on Ethernet), IEEE 1394, USB and/or the like connections carry both data and power across the connection and is therefore a suitable source of power.

Interface Adapters

Interface bus(ses) 2707 may accept, connect, and/or communicate to a number of interface adapters, variously although not necessarily in the form of adapter cards, such as but not limited to: input output interfaces (I/O) 2708, storage interfaces 2709, network interfaces 2710, and/or the like. Optionally, cryptographic processor interfaces 2727 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2709 may accept, communicate, and/or connect to a number of storage devices such as, but not limited to: (removable) storage devices 2714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 2710 may accept, communicate, and/or connect to a communications network 2713. Through a communications network 2713, the MLLB controller is accessible through remote clients 2733b (e.g., computers with web browsers) by users 2733a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MLLB below), architectures may similarly be employed to pool, load balance, and/or otherwise decrease/increase the communicative bandwidth required by the MLLB controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2710 may be used to engage with various communications network types 2713. For example, multiple network interfaces may be employed to allow for the communication over broadcast, multicast, and/or unicast networks.

Input Output interfaces (I/O) 2708 may accept, communicate, and/or connect to user, peripheral devices 2712 (e.g., input devices 2711), cryptographic processor devices 2728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 2712 may be connected and/or communicate to I/O and/or other facilities of the like such as network interfaces, storage interfaces, directly to the interface bus, system bus, the CPU, and/or the like. Peripheral devices may be external, internal and/or part of the MLLB controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2711 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the MLLB controller may be embodied as an embedded, dedicated, and/or monitor-less (i.e., headless) device, and access may be provided over a network interface connection.

Cryptographic units such as, but not limited to, microcontrollers, processors 2726, interfaces 2727, and/or devices 2728 may be attached, and/or communicate with the MLLB controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 2729. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the MLLB controller and/or a computer systemization may employ various forms of memory 2729. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 2729 will include ROM 2706, RAM 2705, and a storage device 2714. A storage device 2714 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 2729 may contain a collection of processor-executable application/library/program and/or database components (e.g., including processor-executable instructions) and/or data such as, but not limited to: operating system component(s) 2715 (operating system); information server component(s) 2716 (information server); user interface component(s) 2717 (user interface); Web browser component(s) 2718 (Web browser); database(s) 2719; mail server component(s) 2721; mail client component(s) 2722; cryptographic server component(s) 2720 (cryptographic server); the MLLB component(s) 2735 (e.g., which may include AWCO, ATP, NWCO, NTP, AWCDT, NWCDT, AWCL, NWCL, AVP 2741-2749, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 2714, they may also be loaded and/or stored in memory such as: cache, peripheral devices, processor registers, RAM, remote storage facilities through a communications network, ROM, various forms of memory, and/or the like.

Operating System

The operating system component 2715 is an executable program component facilitating the operation of the MLLB controller. The operating system may facilitate access of I/O, network interfaces, peripheral devices, storage devices, and/ or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the MLLB controller to communicate with other entities through a communications network 2713. Various communication protocols may be used by the MLLB controller as a subcarrier transport mechanism for interaction, such as, but not limited to: multicast, TCP/IP, UDP, unicast, and/or the like.

Information Server

An information server component 2716 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MLLB controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MLLB database 2719, operating systems, other program components, user interfaces, Web browsers, and/or the like.

Access to the MLLB database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MLLB. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the MLLB as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud-based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 2717 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2718 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MLLB enabled nodes. The combined application may be nugatory on systems employing Web browsers.

Mail Server

A mail server component 2721 is a stored program component that is executed by a CPU 2703. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MLLB. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the MLLB mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2722 is a stored program component that is executed by a CPU 2703. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2720 is a stored program component that is executed by a CPU 2703, cryptographic processor 2726, cryptographic processor interface 2727, cryptographic processor device 2728, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MLLB may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the MLLB component to engage in secure transactions if so desired. The cryptographic component facilitates the secure accessing of resources on the MLLB and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MLLB Database

The MLLB database component 2719 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MLLB database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MLLB database is implemented as a data-structure, the use of the MLLB database 2719 may be integrated into another component such as the MLLB component 2735. Also, the database may be implemented as a mix of data structures, objects, programs, relational structures, scripts, and/or the like. Databases may be consolidated and/or distributed in countless variations (e.g., see Distributed MLLB below). Portions of databases, e.g., tables, may be exported and/or imported and thus decentralized and/or integrated.

In one embodiment, the database component 2719 includes several tables representative of the schema, tables, structures, keys, entities and relationships of the described database 2719a-o:

An accounts table 2719a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2719b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MLLB);

An devices table 2719c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_ location, sensor_value, pin_reading, data length, channel_requirement, sensor_name, sensor_model_no, sensor_manufacturer, sensor_type, sensor_serial_number, sensor_power_requirement, device_power_requirement, location, sensor_associated_tool, sensor_ dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2719d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2719e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccess- Privileges, assetPreferences, assetRestrictions, assetAPI, assetAPIconnectionAddress, and/or the like;

A payments table 2719*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2719*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2719*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 2719*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An asset telemetry table 2719*j* includes fields such as, but not limited to: assetID, associatedAccountID, timeWindowSize, timestampOfSampling, coreCount, cpuUsage, physicalRamMB, ramUsageMB, physicalDiskCount, physicalDiskIOPS, socketConnections, label, and/or the like;

A node telemetry table 2719*k* includes fields such as, but not limited to: nodeID, timeWindowSize, timestampOfSampling, coreCount, cpuUsage, physicalRamMB, ramUsageMB, physicalDiskCount, physicalDiskIOPS, socketConnections, label, and/or the like:

An AWCD table 2719*l* includes fields such as, but not limited to: AWCD_ID, AWCD_version, AWCD_associatedTimeWindowSize, AWCD_associatedAccountID, AWCD_associatedAssetType, AWCD_machineLearningMethod, AWCD_performanceMetric, AWCD_parameters, and/or the like;

An NWCD table 2719*m* includes fields such as, but not limited to: NWCD_ID, NWCD_version, NWCD_associatedTimeWindowSize, NWCD_associatedNodeType, NWCD_machineLearningMethod, NWCD_performanceMetric, NWCD_parameters, and/or the like;

An asset classification table 2719*n* includes fields such as, but not limited to: assetID, assetWorkloadClassificationLabels, timeWindowSize, timestampOfLabeling, associatedSnapshotIdentifier, assetVirtualizationDefinition, and/or the like;

A node classification table 2719*o* includes fields such as, but not limited to: nodeID, nodeWorkloadClassificationLabels, timeWindowSize, timestampOfLabeling, and/or the like.

In one embodiment, the MLLB database may interact with other database systems. For example, employing a distributed database system, queries and data access by search MLLB component may treat the combination of the MLLB database, an integrated data security layer database as a single database entity (e.g., see Distributed MLLB below).

In one embodiment, user programs may contain various user interface primitives, which may serve to update the MLLB. Also, various accounts may require custom database tables depending upon the environments and the types of clients the MLLB may need to serve. It should be noted that any unique fields may be designated as a key field throughout. In an alternative embodiment, these tables have been decentralized into their own databases and their respective database controllers (i.e., individual database controllers for each of the above tables). The MLLB may also be configured to distribute the databases over several computer systemizations and/or storage devices. Similarly, configurations of the decentralized database controllers may be varied by consolidating and/or distributing the various database components 2719*a-o*. The MLLB may be configured to keep track of various settings, inputs, and parameters via database controllers.

The MLLB database may communicate to and/or with other components in a component collection, including itself, and/or facilities of the like. Most frequently, the MLLB database communicates with the MLLB component, other program components, and/or the like. The database may contain, retain, and provide information regarding other nodes and data.

The MLLBs

The MLLB component 2735 is a stored program component that is executed by a CPU via stored instruction code configured to engage signals across conductive pathways of the CPU and ISICI controller components. In one embodiment, the MLLB component incorporates any and/or all combinations of the aspects of the MLLB that were discussed in the previous figures. As such, the MLLB affects accessing, obtaining and the provision of information, services, transactions, and/or the like across various communications networks. The features and embodiments of the MLLB discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MLLB's features and facilities, and in many cases reduce the costs, energy consumption/requirements, and extend the life of MLLB's underlying infrastructure; this has the added benefit of making the MLLB more reliable. Similarly, many of the features and mechanisms are designed to be easier for users to use and access, thereby broadening the audience that may enjoy/employ and exploit the feature sets of the MLLB; such ease of use also helps to increase the reliability of the MLLB. In addition, the feature sets include heightened security as noted via the Cryptographic components 2720, 2726, 2728 and throughout, making access to the features and data more reliable and secure.

The MLLB transforms workload agent installation request, AWCD training request, NWCD training request, asset workload classification request, node workload classification request, asset virtualization request inputs, via MLLB components (e.g., AWCO, ATP, NWCO, NTP, AWCDT, NWCDT, AWCL, NWCL, AVP), into workload agent installation response, AWCD training response, NWCD training response, asset workload classification response, node workload classification response, asset virtualization response outputs.

The MLLB component facilitates access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the MLLB server employs a cryptographic server to encrypt and decrypt communications. The MLLB component may communicate to and/or with other components in a component collection, including itself, and/or facilities of the like. Most frequently, the MLLB component communicates with the MLLB database, operating systems, other program components, and/or the like. The MLLB may contain, communicate, generate, obtain, and/or provide program component, system, user, and/or data communications, requests, and/or responses.

Distributed MLLBs

The structure and/or operation of any of the MLLB node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the MLLB controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for MLLB controller and/or MLLB component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data.

Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MLLB controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Machine-Learning-Based Load Balancing for Cloud-Based Disaster Recovery Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MLLB individual and/or enterprise user, database configuration and/or relational model, data type, data transmission and/or network framework, library, syntax structure, and/or the like, various embodiments of the MLLB, may be implemented that allow a great deal of flexibility and customization. For example, aspects of the MLLB may be adapted for monitoring for energy usage load balancing. While various embodiments and discussions of the MLLB have included machine learning and backup systems, however, it is to be understood that the embodiments described herein may be readily configured and/or customized for a wide variety of other applications and/or implementations.

What is claimed is:

1. A load balancing asset virtualizing apparatus, comprising:
at least one memory;
a component collection stored in the at least one memory;
at least one processor disposed in communication with the at least one memory, the at least one processor executing processor-executable instructions from the component collection, the component collection structured with processor-executable instructions, comprising:
obtain, via the at least one processor, an asset virtualization request datastructure, the asset virtualization request datastructure structured to include a first data field for identifying an asset and a second data field for specifying an expected workload timeframe corresponding to the expected workload timeframe associated with the asset virtualization request datastructure;
retrieve, via the at least one processor, a set of asset workload classification labels for the asset, the set of asset workload classification labels determined using an asset workload classification datastructure, the asset workload classification datastructure trained using a machine learning method and asset telemetry training data;

retrieve, via the at least one processor, a set of node workload classification labels for each node in a set of available compute nodes, each set of node workload classification labels determined using a node workload classification datastructure, the node workload classification datastructure trained using a machine learning method and node telemetry training data from a repository, the node telemetry training data including labeled training records over a certain period of time;

determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;

select, via the at least one processor, a candidate compute node from the set of candidate compute nodes; and instantiate, via the at least one processor, a virtual machine corresponding to the asset on the selected candidate compute node.

2. The apparatus of claim 1, in which the asset is one of: a desktop, a workstation, a laptop, a mobile device, a server.

3. The apparatus of claim 1, in which the asset is structured to execute backup software that is structured to utilize a kernel-resident agent to periodically collect workload info data regarding the asset.

4. The apparatus of claim 1, in which the asset virtualization request datastructure is structured to include a data field for identifying a snapshot, in which the set of asset workload classification labels for the asset is associated with the snapshot.

5. The apparatus of claim 1, in which the set of asset workload classification labels for the asset is associated with a time window matching the expected workload timeframe.

6. The apparatus of claim 1, in which the asset virtualization request datastructure is structured to include a data field for specifying a virtualization definition, the virtualization definition specifying a set of resources requested for the virtual machine.

7. The apparatus of claim 6, in which the component collection is further structured with processor-executable instructions, comprising:

determine, via the at least one processor, that the virtualization definition is under-provisioned or over-provisioned for a resource; and modify, via the at least one processor, the virtualization definition to use a resource amount for the resource that corresponds to observed workload for the asset.

8. The apparatus of claim 6, in which a resource is one of: CPU, RAM, disk, network, energy, time of day.

9. The apparatus of claim 1, in which the set of asset workload classification labels for the asset comprises at least one of: a label indicating an overall workload footprint of the asset, a plurality of labels indicating workload footprints of the asset for different resources, one or more labels indicating resources heavily utilized by the asset.

10. The apparatus of claim 1, in which the machine learning method is one of: logistic regression, k-nearest neighbors, random forest, a neural-network-based learning method.

11. The apparatus of claim 1, in which the asset workload classification datastructure and the node workload classification datastructure are the same datastructure.

12. The apparatus of claim 1, in which the candidate compute node is selected randomly.

13. The apparatus of claim 1, in which the instructions to select a candidate compute node are structured as:

determine, via the at least one processor, virtualized assets corresponding to guest virtual machines already running on a respective candidate compute node from the set of candidate compute nodes;

determine, via the at least one processor, a set of asset workload classification labels for each of the virtualized assets;

determine, via the at least one processor, remaining capacity of the respective candidate compute node based on: a capacity metric associated with the respective candidate compute node, the set of node workload classification labels for the respective candidate compute node, and the set of asset workload classification labels for each of the virtualized assets;

determine, via the at least one processor, that the remaining capacity of the respective candidate compute node meets capacity requirements of the asset; and select, via the at least one processor, the respective candidate compute node.

14. The apparatus of claim 13, in which the capacity requirements of the asset are determined based on the set of asset workload classification labels for the asset.

15. The apparatus of claim 13, in which the capacity requirements of the asset are determined based on a virtualization definition for the asset.

16. A load balancing asset virtualizing processor-readable, non-transient medium, the medium storing a component collection, the component collection structured with processor-executable instructions comprising:

obtain, via at least one processor, an asset virtualization request datastructure, the asset virtualization request datastructure structured to include a first data field for identifying an asset and a second data field for specifying an expected workload timeframe corresponding to the expected workload timeframe associated with the asset virtualization request datastructure;

retrieve, via the at least one processor, a set of asset workload classification labels for the asset, the set of asset workload classification labels determined using an asset workload classification datastructure, the asset workload classification datastructure trained using a machine learning method and asset telemetry training data;

retrieve, via the at least one processor, a set of node workload classification labels for each node in a set of available compute nodes, set of node workload classification labels determined using a node workload classification datastructure, the node workload classification datastructure trained using a machine learning method and node telemetry training data from a repository, the node telemetry training data including labeled training records over a certain period of time;

determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;

select, via the at least one processor, a candidate compute node from the set of candidate compute nodes; and instantiate, via the at least one processor, a virtual machine corresponding to the asset on the selected candidate compute node.

17. A load balancing asset virtualizing processor-implemented system, comprising:

means to store a component collection;

means to process processor-executable instructions from the component collection, the component collection structured with processor-executable instructions including:

obtain, via at least one processor, an asset virtualization request datastructure, the asset virtualization request datastructure structured to include a first data field for identifying an asset and a second data field for specifying an expected workload timeframe corresponding to the expected workload timeframe associated with the asset virtualization request datastructure;

retrieve, via the at least one processor, a set of asset workload classification labels for the asset, the set of asset workload classification labels determined using an asset workload classification datastructure, the asset workload classification datastructure trained using a machine learning method and asset telemetry training data;

retrieve, via the at least one processor, a set of node workload classification labels for each node in a set of available compute nodes, set of node workload classification labels determined using a node workload classification datastructure, the node workload classification datastructure trained using a machine learning method and node telemetry training data from a repository, the node telemetry training data including labeled training records over a certain period of time;

determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;

select, via the at least one processor, a candidate compute node from the set of candidate compute nodes; and instantiate, via the at least one processor, a virtual machine corresponding to the asset on the selected candidate compute node.

18. A load balancing asset virtualizing processor-implemented process, including processing processor-executable instructions via at least one processor from a component collection stored in at least one memory, the component collection structured with processor-executable instructions comprising:

obtain, via the at least one processor, an asset virtualization request datastructure, the asset virtualization request datastructure structured to include a first data field for identifying an asset and a second data field for specifying an expected workload timeframe corresponding to the expected workload timeframe associated with the asset virtualization request datastructure;

retrieve, via the at least one processor, a set of asset workload classification labels for the asset, the set of asset workload classification labels determined using an asset workload classification datastructure, the asset workload classification datastructure trained using a machine learning method and asset telemetry training data;

retrieve, via the at least one processor, a set of node workload classification labels for each node in a set of available compute nodes, set of node workload classification labels determined using a node workload classification datastructure, the node workload classification datastructure trained using a machine learning method and node telemetry training data from a repository, the node telemetry training data including labeled training records over a certain period of time;

determine, via the at least one processor, a set of candidate compute nodes from the set of available compute nodes, in which the set of node workload classification labels for a candidate compute node is determined to be compatible with the set of asset workload classification labels for the asset, in which compatibility is determined using a set of capacity threshold rules;

select, via the at least one processor, a candidate compute node from the set of candidate compute nodes; and instantiate, via the at least one processor, a virtual machine corresponding to the asset on the selected candidate compute node.

\* \* \* \* \*